(12) United States Patent
Hyde et al.

(10) Patent No.: US 9,123,049 B2
(45) Date of Patent: *Sep. 1, 2015

(54) PROMOTIONAL CORRELATION WITH SELECTIVE VEHICLE MODES

(75) Inventors: Roderick A. Hyde, Redmond, WA (US); Muriel Y. Ishikawa, Livermore, CA (US); Jordin T. Kare, Seattle, WA (US); Thomas J. Nugent, Jr., Bellevue, WA (US); Clarence T. Tegreene, Bellevue, WA (US); Charles Whitmer, North Bend, WA (US); Lowell L. Wood, Jr., Bellevue, WA (US); Victoria Y. H. Wood, Livermore, CA (US)

(73) Assignee: THE INVENTION SCIENCE FUND I, LLC, Bellevue, WA (US)

(*) Notice: Subject to any disclaimer, the term of this patent is extended or adjusted under 35 U.S.C. 154(b) by 936 days.

This patent is subject to a terminal disclaimer.

(21) Appl. No.: 12/592,974

(22) Filed: Dec. 4, 2009

(65) Prior Publication Data

US 2011/0029187 A1 Feb. 3, 2011

Related U.S. Application Data

(63) Continuation of application No. 12/587,703, filed on Oct. 9, 2009, and a continuation-in-part of application No. 12/587,237, filed on Oct. 2, 2009, and a continuation-in-part of application No. 12/587,129, (Continued)

(51) Int. Cl.
*G06Q 30/00* (2012.01)
*G06Q 30/02* (2012.01)

(52) U.S. Cl.
CPC ............ *G06Q 30/02* (2013.01); *G06Q 30/0224* (2013.01)

(58) Field of Classification Search
CPC .................................................. G06Q 30/0208
USPC ............ 701/29.3, 29.6, 33.4; 705/4, 13, 14.1, 705/14.11
See application file for complete search history.

(56) References Cited

U.S. PATENT DOCUMENTS 5,790,976 A 8/1998 Boll et al.
5,815,824 A 9/1998 Saga et al.
(Continued)

FOREIGN PATENT DOCUMENTS

CN 1941024 A 4/2007
EP 1 354 735 A1 4/2003
(Continued)

OTHER PUBLICATIONS

Carpico, M. (May 28, 2003). Police Reward Teen Drivers for Safe Driving. Pittsburgh Post—Gazette.*
(Continued)

*Primary Examiner* — Thomas G Black
*Assistant Examiner* — Peter D Nolan

(57) ABSTRACT

Exemplary methods, systems and components enable selective control of an operational mode for a vehicle that is subject to an administrative standard. In some instances a qualified person or entity may attain a possible consequential result related to a user-selected vehicle operation mode that may involve a vehicle operation paradigm and/or a vehicle travel route and/or a vehicle travel destination. In some embodiments, implementation of the selected vehicle operation mode may modify a conformity status of the vehicle relative to the administrative standard. Various accessible records may be maintained regarding administrative compliance states and their respective benefits, as well as regarding certification of preferable consequential results available to qualified recipients based on a correlated vehicle operational mode.

58 Claims, 61 Drawing Sheets

Related U.S. Application Data filed on Sep. 30, 2009, and a continuation-in-part of application No. 12/587,017, filed on Sep. 29, 2009, and a continuation-in-part of application No. 12/462,207, filed on Jul. 29, 2009.

(56) References Cited

U.S. PATENT DOCUMENTS

| | | | |
|---|---|---|---|
| 5,954,617 A | 9/1999 | Horgan et al. | |
| 6,026,784 A * | 2/2000 | Weisman et al. | 123/436 |
| 6,081,042 A | 6/2000 | Tabata et al. | |
| 6,112,151 A | 8/2000 | Kruse | |
| 6,647,328 B2 | 11/2003 | Walker | |
| 6,694,247 B2 | 2/2004 | Hameleers et al. | |
| 6,701,234 B1 * | 3/2004 | Vogelsang | 701/32.4 |
| 6,792,348 B2 | 9/2004 | Hameleers et al. | |
| 6,850,824 B2 | 2/2005 | Breed | |
| 6,881,170 B2 | 4/2005 | Onoyama et al. | |
| 7,013,205 B1 | 3/2006 | Hafner et al. | |
| 7,215,255 B2 | 5/2007 | Grush | |
| 7,228,226 B1 | 6/2007 | Munro et al. | |
| 7,365,633 B2 | 4/2008 | Inoue et al. | |
| 7,469,171 B2 | 12/2008 | Tefft et al. | |
| 7,715,961 B1 * | 5/2010 | Kargupta | 701/29.3 |
| 7,844,370 B2 | 11/2010 | Pollack et al. | |
| 7,899,591 B2 * | 3/2011 | Shah et al. | 701/29.4 |
| 7,925,399 B2 | 4/2011 | Comeau et al. | |
| 7,949,435 B2 | 5/2011 | Pollack et al. | |
| 7,965,325 B2 | 6/2011 | Imamura | |
| 7,966,221 B1 | 6/2011 | Givoly et al. | |
| 7,979,292 B2 | 7/2011 | Hamilton, II et al. | |
| 7,991,665 B2 | 8/2011 | Hafner et al. | |
| 8,055,534 B2 | 11/2011 | Ashby et al. | |
| 8,068,974 B2 * | 11/2011 | Newhouse et al. | 701/123 |
| 8,090,598 B2 * | 1/2012 | Bauer et al. | 705/4 |
| 8,103,391 B2 | 1/2012 | Ferro et al. | |
| 8,200,529 B2 | 6/2012 | Hamilton, II et al. | |
| 8,255,146 B2 * | 8/2012 | Srinivasan et al. | 701/118 |
| 8,498,763 B2 | 7/2013 | Hafner et al. | |
| 8,531,162 B2 | 9/2013 | Hafner et al. | |
| 2002/0046144 A1 | 4/2002 | Graff | |
| 2002/0080048 A1 | 6/2002 | Choi | |
| 2003/0014342 A1 | 1/2003 | Vande Pol | |
| 2003/0065560 A1 | 4/2003 | Brown et al. | |
| 2003/0065630 A1 | 4/2003 | Brown et al. | |
| 2003/0182026 A1 | 9/2003 | Awada et al. | |
| 2003/0216847 A1 | 11/2003 | Bellinger | |
| 2004/0004539 A1 | 1/2004 | Collins | |
| 2004/0059500 A1 | 3/2004 | Nakano | |
| 2004/0117217 A1 | 6/2004 | Reber et al. | |
| 2004/0199403 A1 | 10/2004 | Ananda | |
| 2005/0015203 A1 | 1/2005 | Nishira | |
| 2005/0031100 A1 | 2/2005 | Iggulden et al. | |
| 2005/0055140 A1 | 3/2005 | Brigham et al. | |
| 2005/0086100 A1 | 4/2005 | Yanagisawa et al. | |
| 2005/0165537 A1 | 7/2005 | Dort | |
| 2005/0173523 A1 * | 8/2005 | Yushio et al. | 235/384 |
| 2005/0174217 A1 * | 8/2005 | Basir et al. | 340/425.5 |
| 2005/0203782 A1 | 9/2005 | Smith | |
| 2006/0095175 A1 * | 5/2006 | deWaal et al. | 701/33 |
| 2006/0129313 A1 | 6/2006 | Becker et al. | |
| 2006/0255967 A1 | 11/2006 | Woo et al. | |
| 2006/0287783 A1 | 12/2006 | Walker | |
| 2007/0010942 A1 | 1/2007 | Bill | |
| 2007/0018830 A1 | 1/2007 | Inoue et al. | |
| 2007/0027726 A1 * | 2/2007 | Warren et al. | 705/4 |
| 2007/0073455 A1 | 3/2007 | Oyobe et al. | |
| 2007/0112631 A1 | 5/2007 | Voltmer et al. | |
| 2007/0143007 A1 | 6/2007 | Durand | |
| 2007/0152804 A1 | 7/2007 | Breed et al. | |
| 2007/0173993 A1 * | 7/2007 | Nielsen et al. | 701/35 |
| 2007/0174004 A1 | 7/2007 | Tenzer et al. | |
| 2007/0203625 A1 | 8/2007 | Quigley et al. | |
| 2007/0239992 A1 | 10/2007 | White et al. | |
| 2008/0015744 A1 | 1/2008 | Lund | |
| 2008/0059035 A1 | 3/2008 | Siddiqui et al. | |
| 2008/0091309 A1 | 4/2008 | Walker | |
| 2008/0097857 A1 | 4/2008 | Walker et al. | |
| 2008/0136674 A1 | 6/2008 | Jang et al. | |
| 2008/0175438 A1 | 7/2008 | Alves | |
| 2008/0180280 A1 | 7/2008 | Breed et al. | |
| 2008/0238678 A1 | 10/2008 | De Castro et al. | |
| 2008/0243558 A1 * | 10/2008 | Gupte | 705/4 |
| 2008/0249667 A1 | 10/2008 | Horvitz et al. | |
| 2008/0249916 A1 | 10/2008 | Kirch et al. | |
| 2008/0255722 A1 | 10/2008 | McClellan et al. | |
| 2008/0258936 A1 | 10/2008 | Chitor et al. | |
| 2008/0300776 A1 | 12/2008 | Petrisor et al. | |
| 2008/0308628 A1 | 12/2008 | Payne et al. | |
| 2009/0005973 A1 | 1/2009 | Salo et al. | |
| 2009/0018761 A1 | 1/2009 | Petrisor | |
| 2009/0018902 A1 | 1/2009 | Miller et al. | |
| 2009/0030712 A1 | 1/2009 | Bogolea et al. | |
| 2009/0076835 A1 | 3/2009 | Carter et al. | |
| 2009/0083118 A1 | 3/2009 | Kallery et al. | |
| 2009/0109037 A1 | 4/2009 | Farmer | |
| 2009/0125173 A1 | 5/2009 | Komatsu et al. | |
| 2009/0140887 A1 | 6/2009 | Breed et al. | |
| 2009/0171548 A1 | 7/2009 | Hyde et al. | |
| 2009/0210302 A1 | 8/2009 | Tashev et al. | |
| 2009/0216424 A1 | 8/2009 | Kolnes | |
| 2009/0219172 A1 | 9/2009 | Wilbrod | |
| 2009/0222338 A1 * | 9/2009 | Hamilton et al. | 705/14 |
| 2009/0259549 A1 | 10/2009 | Winand et al. | |
| 2009/0265199 A1 | 10/2009 | Moerdler et al. | |
| 2009/0287408 A1 | 11/2009 | Gerdes et al. | |
| 2009/0313103 A1 | 12/2009 | Ambrosio et al. | |
| 2009/0313104 A1 | 12/2009 | Hafner et al. | |
| 2009/0313174 A1 * | 12/2009 | Hafner et al. | 705/80 |
| 2009/0319312 A1 | 12/2009 | Moerdler et al. | |
| 2010/0030582 A1 | 2/2010 | Rippel et al. | |
| 2010/0045451 A1 * | 2/2010 | Periwal | 340/439 |
| 2010/0052946 A1 | 3/2010 | Levine et al. | |
| 2010/0063697 A1 | 3/2010 | Lindgren et al. | |
| 2010/0076835 A1 | 3/2010 | Silverman | |
| 2010/0076878 A1 | 3/2010 | Burr et al. | |
| 2010/0131300 A1 | 5/2010 | Collopy et al. | |
| 2010/0131308 A1 | 5/2010 | Collopy et al. | |
| 2010/0153191 A1 | 6/2010 | Hamilton, II et al. | |
| 2010/0179856 A1 | 7/2010 | Paretti et al. | |
| 2010/0205012 A1 * | 8/2010 | McClellan | 705/4 |
| 2010/0222073 A1 | 9/2010 | Aninye et al. | |
| 2010/0228415 A1 | 9/2010 | Paul | |
| 2010/0280884 A1 | 11/2010 | Levine et al. | |
| 2010/0280956 A1 * | 11/2010 | Chutorash et al. | 705/64 |
| 2010/0332313 A1 | 12/2010 | Miller et al. | |
| 2011/0029170 A1 | 2/2011 | Hyde et al. | |
| 2011/0029171 A1 | 2/2011 | Hyde et al. | |
| 2011/0029173 A1 | 2/2011 | Hyde et al. | |
| 2011/0029182 A1 | 2/2011 | Hyde et al. | |
| 2011/0029358 A1 | 2/2011 | Hyde et al. | |
| 2011/0029365 A1 | 2/2011 | Alhadeff et al. | |
| 2011/0040579 A1 * | 2/2011 | Havens | 705/4 |
| 2011/0077805 A1 | 3/2011 | Hyde et al. | |
| 2011/0077806 A1 | 3/2011 | Hyde et al. | |
| 2011/0077807 A1 | 3/2011 | Hyde et al. | |
| 2011/0077808 A1 | 3/2011 | Hyde et al. | |
| 2011/0106370 A1 * | 5/2011 | Duddle et al. | 701/33 |
| 2011/0231182 A1 | 9/2011 | Weider et al. | |
| 2011/0273568 A1 | 11/2011 | Lagassey | |
| 2011/0282723 A1 | 11/2011 | Phillips et al. | |

FOREIGN PATENT DOCUMENTS

| | | |
|---|---|---|
| JP | 2002163756 | 6/2002 |
| JP | 2004-145673 | 5/2004 |
| WO | WO 2006/032625 A1 | 3/2006 |
| WO | WO 2008/032075 A2 | 3/2008 |
| WO | WO 2011/062620 A1 | 5/2011 |

OTHER PUBLICATIONS

More-Efficient Driving Is Safer, Economical. (Sep. 8, 2005). Columbus Dispatch.*

(56) References Cited

OTHER PUBLICATIONS

"BioFuel Africa Introduces Emission Lock™—Helps Encourage and Reward Use of Low-Emission Fuels and Vehicles"; Newswire Today; bearing a date of Mar. 17, 2009; p. 1.

"Company Introduces Three Advanced Electric-drive Vehicle Prototypes"; Chrysler Media Services; bearing a date of Sep. 23, 2008; pp. 1-4.

"Four-Seater Electric Car Unveiled"; BBC News; bearing a date of Apr. 30, 2009; p. 1; located at http://newsvote.bbc.co.uk.mpapps/pagetools/print/news.bbc.co.uk/2/hi; printed on May 13, 2009; BBC MMIX.

Gunther, Marc; "Buffett Takes Charge"; Fortune; bearing a date of Apr. 27, 2009; pp. 45-50; vol. 159, No. 8.

Jensen, Derek P.; "SLC May Plug in to Electric-Car Revolution"; The Salt Lake Tribune; bearing a date of Mar. 28, 2009; pp. 1-2; printed on Mar. 30, 2009.

Kaho, Todd; "Fisker Plug-in Hybrid Coming in 2009"; bearing a date of Dec. 8, 2008; pp. 1-3.

Keegan, Paul; "Recharging Detroit"; Fortune; bearing a date of Apr. 27, 2009; pp. 55-60; vol. 159, No. 8.

LaGesse, David; "Top 10 in New Car Tech"; U.S. News & World Report; bearing a date of Friday, Apr. 24, 2009; pp. 1-3.

LaMonica, Martin; "Plotting the Long Road to One Million Electric Cars"; CBS Interactive Inc.—CNET; bearing a date of Feb. 2, 2009; pp. 1-2.

Locker, Jonathan I.; "OnStar: Big Brother's Eye in the Sky"; bearing a date of Feb. 14, 2008; pp. 1-2.

Madslien, Jorn; "Electric Bikemaker Woos Commuters"; BBC News; bearing a date of May 12, 2009; pp. 1-3; BBC MMIX; located at http://news.bbc.co.uk/2/hi/business/8017014.stm; printed on May 13, 2009.

Madslien, Jorn; "Mini Points to Electric Car Future"; BBC News; bearing a date of May 12, 2009; pp. 1-3; BBC MMIX; located at http://news.bbc.co.uk/go/pr/fr/-/2/hi/business/7760787.stm; printed on Apr. 16, 2009.

"OVERHEADCAM9000"; bearing a date of Feb. 14, 2008; p. 1.

"Plan to Boost Electric Car Sales"; bearing a date of Apr. 16, 2009; pp. 1-5.

"Plan to Boost Electric Car Sales"; BBC News; bearing a date of Apr. 16, 2009; pp. 1-3; BBC MMI; located at http://news.bbc.co.uk/go/pr/fr/-/2/hi/business/8001254.stm; printed on May 13, 2009.

Rogers, Paul; "Reversing Bush, Obama Allows California's Greenhouse Gas Rules to Take Effect"; The Mercury News; bearing a date of Jun. 30, 2009; pp. 1-3; located at http://www.mercurynews.com/fdcp?1246404783966; printed on Jun. 30, 2009.

"SF Bay Charged Up for Electric Car Stations"; KIROTV.com; bearing a date of Friday, Nov. 21, 2008; pp. 1-2; located at http://www.kirotv.com/print/18032522/detail.html; printed on Dec. 11, 2008.

Siuru, Bill; "Hyundai Lithium Polymer Hybrids Coming to the U.S."; bearing a date of Dec. 8, 2008; pp. 1-4.

Siuru, Bill; "Korean E-Zone Neighborhood Electric Car"; bearing a date of Dec. 8, 2008; pp. 1-3.

Taylor III, Alex; "The Great Electric Car Race"; Fortune; bearing a date of Apr. 27, 2009; pp. 38-42; vol. 159, No. 8.

Thomas, Ken; "Obama's Plug-In Cars Goal Hard to Hit"; Deseret News; bearing a date of Apr. 15, 2009; pp. 1-2; Desert News Publishing Company; located at http://www.deseretnews.com/article/0,5143,705297683,00.html; printed on Apr. 16, 2009.

Tollefson, Jeff; "Charging Up the Future"; Nature; bearing a date of Nov. 27, 2008; pp. 436-440; vol. 456; MacMillan Publishers Limited.

Vlasic, Bill; "Stars Align for Maker of Electric Car Infrastructure"; International Herald Tribune; bearing a date of Monday, Feb. 9, 2009; pp. 1-3; The International Herald Tribune.

Voelcker, John; "Top 10 Tech Cars"; IEEE Spectrum; pp. 1-19; located at http://www.spectrum.ieee.org/print/6078; printed on Apr. 30, 2009.

Voelcker, John; "Top 10 Tech Cars of 2009"; IEEE Spectrum; pp. 1-17; located at http://ww.spectrum.ieee.org/print/8327; printed on Apr. 30, 2009.

Walton, Marsha; "Hybrids Trick Out, Plug In"; CNN.com; pp. 1-3; located at http://cnn.site.printthis.clickability.com/pt/cpt?action=Hybr; printed on Sep. 30, 2008.

Yuasa, Shino; "Nissan to Mass Produce Electric Cars in 2012"; Yahoo Finance; bearing a date of Tuesday, Jun. 23, 2009; located at http://finance.yahoo.com/news/Nissan-to-mass-produce-apf-27088937; Yahoo.

PCT International Search Report; International App. No. PCT/US2010/002993; Jan. 24, 2011; pp. 1-2.

U.S. Appl. No. 12/653,770, Hyde et al.
U.S. Appl. No. 12/653,769, Hyde et al.
U.S. Appl. No. 12/653,178, Hyde et al.
U.S. Appl. No. 12/653,177, Hyde et al.
U.S. Appl. No. 12/592,975, Hyde et al.
U.S. Appl. No. 12/592,719, Hyde et al.
U.S. Appl. No. 12/592,716, Hyde et al.
U.S. Appl. No. 12/592,549, Hyde et al.
U.S. Appl. No. 12/592,546, Hyde et al.
U.S. Appl. No. 12/592,438, Hyde et al.
U.S. Appl. No. 12/592,276, Hyde et al.
U.S. Appl. No. 12/587,703, Hyde et al.
U.S. Appl. No. 12/587,237, Hyde et al.
U.S. Appl. No. 12/587,129, Hyde et al.
U.S. Appl. No. 12/587,017, Hyde et al.
U.S. Appl. No. 12/586,918, Hyde et al.
U.S. Appl. No. 12/462,207, Hyde et al.

"Congestion pricing takes a new twist with technology in I-15 HOV lane"; ksl.com; bearing a date of Oct. 22, 2009; 1 page; located at http://www.ksl.com/index.php.?nid=481&sid=8401873.

Henderson, Peter; "Electric car future may power a charging industry"; Thomson Reuters; bearing a date of Aug. 10, 2009; pp. 1-4; © Thomson Reuters 2009.

Lowy, Joan; "Airlines seek to boost market for biofuels"; Yahoo! News; printed on Dec. 15, 2009; 1 page; © 2009 Yahoo! Inc.

Wang, Shie-Yuan et al.; "Evaluating and Improving the TCP/UDP Performances of IEEE 802.11(p)/1609 Networks"; IEEE; bearing at date of 2008; pp. 163-168.

Yubo, MA et al.; "Study on the application strategies and process design of BTO: A bus manufacturing case in China"; IEEE; bearing at date of 2007; pp. 4257-4260.

Liu et al.; "Empirical Study of Railway Bureaus Portals in China"; Service Operations and Logistics, and Informatics, 2008. IEEE/SOLI 2008. IEEE International Conference On; bearing a date of 2008 (Conference Dates: Oct. 12-15, 2008); pp. 1470-1475; vol. 1; Digital Object Identifier: 10.1109/SOLI.2008.4686633; IEEE.

Chinese State Intellectual Property Office, Office Action and Search Report, Application No. 201080061514.8 ; Sep. 17, 2014; 5 pages (no translation available).

Baltimore Commission on Sustainability; "The Baltimore Sustainability Plan"; published Apr. 2009; 134 pages.

Bieker et al.; "Evaluation of opening Bus Lanes for private Traffic triggered via V2X Communication"; 2011 IEEE Forum on Integrated and Sustainable Transportation Systems, Vienna, Austria; Jun. 29-Jul. 1, 2011; pp. 48-53; IEEE.

Braegas, Peter; "Function, Equipment, and Field Testing of a Route Guidance and Information System for Drivers (ALI)"; IEEE Transactions on Vehicular Technology, May 1980; pp. 216-225; vol. VT-29, No. 2; IEEE.

Lim et al; "Automated Detection of All Kinds of Violations at A Street Intersection Using Real Time Individual Vehicle Tracking"; Fifth IEEE Southwest Symposium on Image Analysis and Interpretation (SSIAI'02); bearing a date of 2002; pp. 126-129; IEEE.

Rakha et al.; "Modeling Framework for the Evaluation of Alternative Truck Lane Management Strategies"; 2010 13$^{th}$ International IEEE Annual Conference on Intelligent Transportation Systems, Madeira Island, Portugal; Sep. 19-22, 2010; pp. 1025-1032; IEEE.

Robinson et al.; "Examining the Delay and Environmental Impacts of Toll Plaza Characteristics"; Vehicle Navigation and Info. Systems

(56) References Cited

OTHER PUBLICATIONS

Conf., 1995 Proceedings, in conjunction with the Pacific Rim TransTech Conf. 6$^{th}$ Inter. VNIS, 'A Ride into the Future'; bearing a date of 1995; pp. 259-266; IEEE.

Yu et al.; "Discussion About Evaluation Method of Traffic Efficiency Adaptability of Bus Lane"; 2009 Second International Conference on Intelligent Computation Technology and Automation; bearing a date of 2009; pp. 566-570; IEEE.

Zhang et al.; "Longitudinal Control of Heavy Trucks in Mixed Traffic: Environmental and Fuel Economy Considerations"; IEEE Transactions on Intelligent Transportation Systems; bearing a date of Mar. 2006; pp. 92-104; vol. 7, No. 1; IEEE.

* cited by examiner

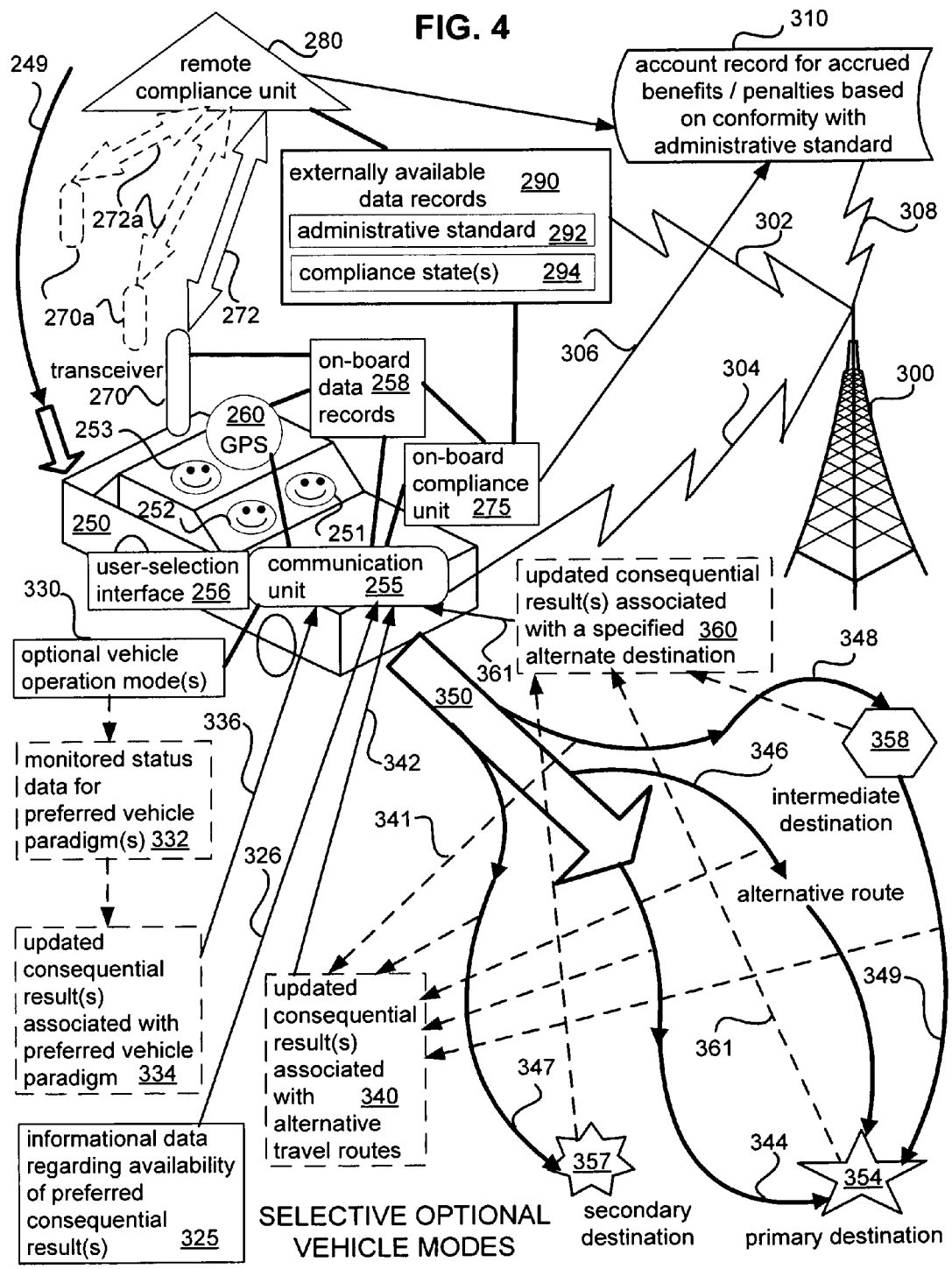

FIG. 5

ADMINISTRATIVE STANDARDS DATA TABLE FOR VARIED COMPLIANCE STATES 385

6-9 am & 4-7pm DESIGNATED COMMUTER TIME
8 am to 8 pm SPECIAL DAILY AIR QUALITY ALERTS 390

| VARIED VEHICLE COMPLIANCE STATE(S) 395 DURING DESIGNATED TIME PERIOD | DAILY FEE 430 | APPLICABLE PRIVATE & PUBLIC LOCALES (e.g., Areas and Travel Routes) |
|---|---|---|
| | | TRI-CITY FREEWAY'S HIGH SPEED THRU LANE 402 |
| BATTERY- POWERED VEHICLE 432 | $ -0- | MEMORIAL TOLL ROAD 404 |
| HYBRID / ELECTRIC POWER MODE ONLY 436 | $ 2 | EVERGREEN PARKWAY 406 |
| HYBRID / OVER 50% ELECTRIC MODE 436 | $ 6 | ROOSEVELT TUNNEL 408 |
| HYBRID / OVER 50% COMBUSTION MODE | $ 8 | PIONEER VIADUCT 410 |
| | | CASCADE RIVER BRIDGE 412 |
| PURE BIO-FUEL COMBUSTION MODE 440 | $ 4 | WASHINGTON LAKE FERRY 414 |
| CERTIFIED BIO-FUEL BLEND ONLY 442 | $ 8 | STATE HIGHWAY 25 – HOV/DIAMOND LANES 416 |
| COMPRESSED NATURAL GAS FUEL 444 | $ 4 | GRIZZLY BEAR FOREST STATE PARK 418 |
| CONVENTIONAL GAS/DIESEL FUEL 446 | $ 15 | REDWOOD MOUNTAIN NATIONAL PARK 420 |
| DIESEL W/LOW-EMISSION MODE "ON" 448 | $ 10 | NATURE'S HABITAT PRIVATE RESORT 422 |
| GAS W/CATALYTIC CONVERTER "ON" 449 | $ 10 | EMERALD CITY URBAN CENTER BETWEEN CENTRAL AVE / RIVER RD / ASPEN DR / STATE ST 424 |
| DRIVER ONLY – ZERO PASSENGERS 450 | extra $ 9 | ALL ROADS & STREETS IN SUNSET VILLAGE 426 |
| AT LEAST ONE PASSENGER 452 | extra $ 7 | FORD COLLEGE CAMPUS & RESEARCH PARK 427 |
| AT LEAST TWO PASSENGERS 454 | extra $ 3 | NOTTINGHAM RETIREMENT COMMUNITY 428 |
| AT LEAST THREE PASSENGERS 456 | extra $-0- | |
| PREPAID ALL-DAY EXEMPTION TICKET 460 | total $ 20 | |

380
434
438

FIG. 6    DATA TABLE FOR VARIED ALTERNATIVE ROUTES

470

475 LINCOLN BRIDGE (CHARGE FOR EACH TRIP) 500 503 510

| OPERATION MODE CATEGORY 480 490 COMPLIANCE STATE | | PAYMENT STATUS | | FEE |
|---|---|---|---|---|
| SHARE 482 | AT LEAST ONE PASSENGER 492 | PASSENGER SHARE BASIS 502 | | $ 10 |
| | | COMBO SHARE W/BATTERY or BIO-FUEL | | $ 5 |
| BATTERY 484 | SOLELY ELECTRIC POWER 494 | BATTERY POWER BASIS 504 | | $ 8 |
| BIO-FUEL 486 | SOLELY BIO-FUEL COMBUSTION 496 | BIO-FUEL BASIS 506 | | $ 8 |
| EXEMPTION 488 | AUTHORIZED PRE-PAYMENT 498 | EXEMPTION BASIS 508 | | $ 20 |

515 MADISON BRIDGE (ALL-DAY PASS) 510a

530 CONVENTIONAL HIGHWAY or FRONTAGE ROAD

| OPERATION MODE CATEGORY 480a | COMPLIANCE STATE 490a | FEE |
|---|---|---|
| SOLO 514 | NO PASSENGER 522 | $ 30 |
| POOL 516 | ONE/TWO PASSENGERS 524 | $ 20 |
| GROUP 518 | THREE OR MORE PASSENGERS 526 | $ 10 |

| ADMINISTRATIVE STANDARD NOT APPLICABLE 532 |
|---|

535

LAKE TOLL ROAD (PERIODIC EXIT TOLL STATIONS) 490b 510b

| OPERATION MODE CATEGORY 480b | COMPLIANCE STATE | | FEE |
|---|---|---|---|
| ZERO EMISSIONS 544 | ELECTRIC POWER VEHICLE, or SOLELY ELECTRIC MODE (HYBRID ENGINE), or CERTIFIED LOW COMBUSTION EMISSION 552 | | ZERO |
| HIGH OCCUPANCY (HOV) 546 | 556  AT LEAST 2 PASSENGERS 545 | | ZERO |
| CASH/CREDIT EXEMPTION 548 | DAILY/WEEKLY/MONTHLY RATE | $25/DAILY $100/WEEKLY $350/MONTHLY | 558 |

FIG. 7  DATA TABLE FOR VARIED SPECIFIED DESTINATIONS  570

575 CAFE-TYPE DESTINATION(S)

| 580 NAME | 590 PARTICULAR ROUTE | 600 POSSIBLE AWARD OR VALUE OR ADVANTAGE | 610 CORRELATED VEHICLE MODE |
|---|---|---|---|
| SIZZLE 582 | PARKWAY 592 | FOOD DISCOUNT, HIGH-VOLTAGE RECHARGE 602 | ELECTRIC POWER 612 |
| LAKE-VU 584 | STATE ST 594 | FOOD DISCOUNT & BIO-FUEL DISCOUNT 604 | LOW EMISSION 614 |
| DAN'S 585 | TRI-TUNNEL 595 | FOOD DISCOUNT & GAS / DIESEL DISCOUNT 605 | MULTI-PASSENGER 615 |
| MID-LAKE MALL 586 | PARKWAY 596 or TOLL ROAD | FOOD & PRODUCT PURCHASE DISCOUNTS & ACCESS TO LOW-VOLTAGE RECHARGE 606 | MULTI-PASSENGER or ELECTRIC POWER } 616 |
| EATERY BUFFET 588 | HIGHWAY WITH HOV LANE 598 | FOOD DISCOUNT PLUS FREE MOVIE TICKETS FOR ALL VEHICLE OCCUPANTS 608 | QUALIFIED HOV USE |

620 RETAIL / WHOLESALE STORE & MALL-TYPE DESTINATION(S)

| 580a NAME | 590a PARTICULAR ROUTE | 600a POSSIBLE AWARD OR VALUE OR ADVANTAGE | 610a CORRELATED VEHICLE MODE |
|---|---|---|---|
| IMPORT WOW 622 | SUNSET VILLAGE | DISCOUNT FOR DRIVER & OWNER 642 | QUALIFIED HOV USE 652 |
| PRICE-PLUS 624 | VIADUCT 634 | BATTERY REPLACEMENT & DISCOUNT RECHARGE & DISCOUNT GAS/DIESEL 644 | MULTI-PASSENGER 654 |
| U-BUY SERVICE CENTER 626 | HOV LANE OF U.S.HIGHWAY 636 | DISCOUNTED CAR ACCESSORIES / REPAIR & DISCOUNTED HIGH-V or LOW-V RECHARGE & DISCOUNTED BIO-FUEL 646 | LOW EMISSION or ELECTRIC POWER or BIO-FUEL 656 |
| FASHION MALL, 628 TRIPLEX THEATERS, PARKING TERRACE | MULTIPLE ROUTES 638 & AREAS | VARIABLE DISCOUNTS FOR PARKING & 648 PURCHASES & MOVIE TICKETS & FUEL & BATTERY RECHARGE & MEALS & GROCERIES | DIVERSE VEHICLE MODE QUALIFICATIONS FOR EACH ENTITY 658 |

FIG. 8   DATA TABLE FOR VARIED SPECIFIED DESTINATIONS

680 →

685 PARKING DESTINATION(S) 600b

| 580b NAME | 590b PARTICULAR ROUTE | 702 POSSIBLE AWARD OR VALUE OR ADVANTAGE | 610b 714 CORRELATED VEHICLE MODE |
|---|---|---|---|
| EARLY BIRD 682 | PARKWAY 692 | LOW-V RECHARGE, Pre-8 am DISCOUNT 704 | ELECTRIC POWER 712 |
| SELF-PARK 684 | VIADUCT 694 | DAILY / WEEKLY DISCOUNT RATE 704 | LOW EMISSION, BIO-FUEL 716 |
| MUNI-PARK 686 | ANY HOV LANE 696 | FREE SHUTTLE TO OFFICE BUILDING(S) 706 | MULTI-PASSENGER 716 |

720 OVERNIGHT ACCOMODATIONS 600c

| 580c NAME | 590c PARTICULAR ROUTE | 744 POSSIBLE AWARD OR VALUE OR ADVANTAGE | 610c 754 CORRELATED VEHICLE MODE |
|---|---|---|---|
| WHIZ MOTEL | PARKWAY 732 | ROOM & RECHARGE DISCOUNTS 742 | ELECTRIC POWER 752 |
| NU-INN 724 | VIADUCT 734 | FREE BREAKFAST, DISCOUNTED BIO-FUEL | LOW EMISSION, BIO-FUEL |
| MARQUIS HOTEL 726 | ANY HOV LANE or PARKWAY or TOLL ROAD 736 | DISCOUNTED ROOMS, FREE PARKING WITH LOW-V or HIGH-V RECHARGE 746 | QUALIFICATION RECEIPT FROM HOV LANE OR PARKWAY or TOLL ROAD 756 |

722

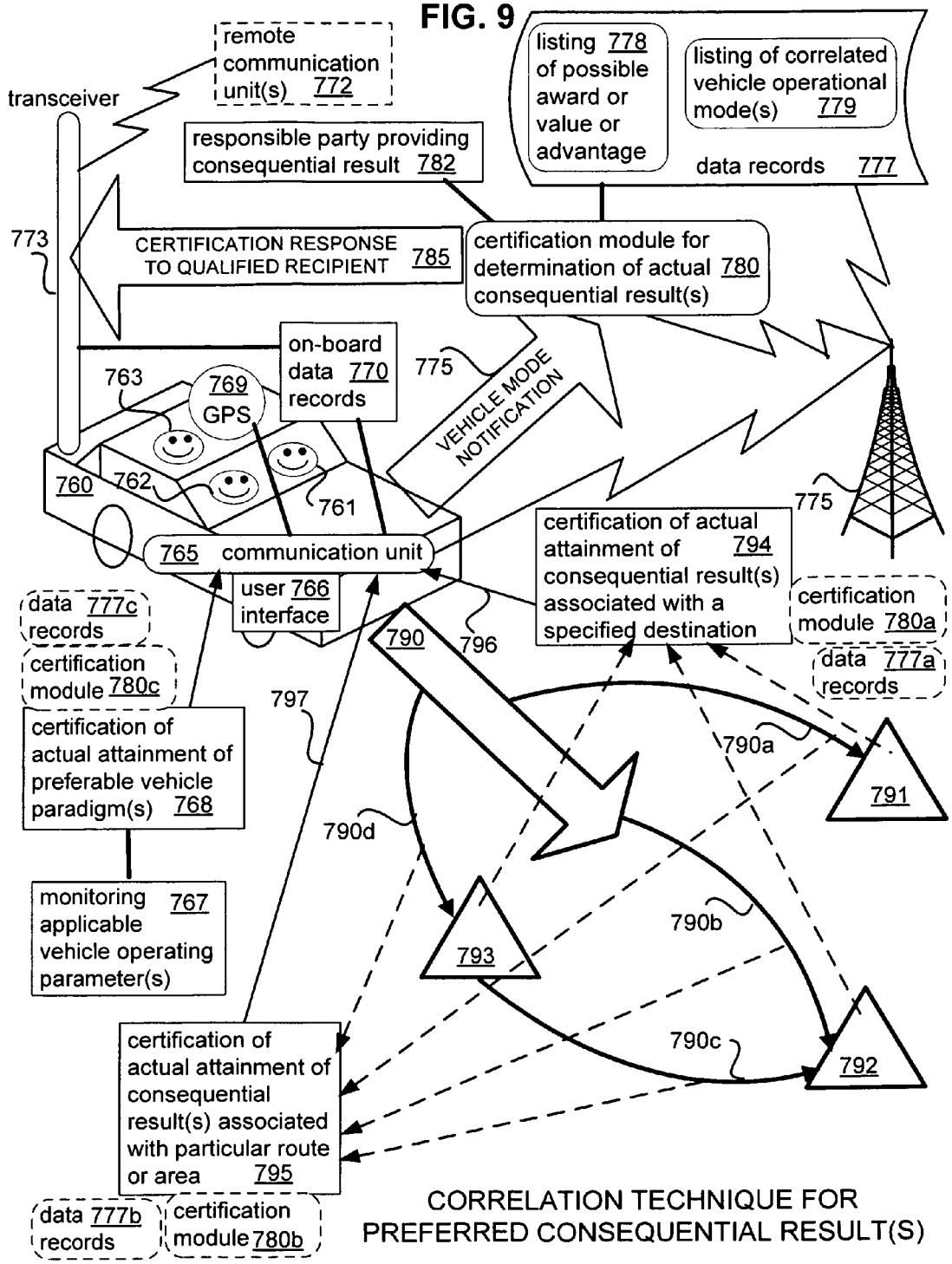

802: obtaining information regarding a compliance state relative to a given administrative standard defining a predetermined vehicle operation mode of a vehicle traveling via a particular route or area

803: wherein the compliance state corresponds to a first benefit that accrues based on conformity with the given administrative standard

804: identifying a preferred consequential result that is different from the first benefit, which preferred consequential result correlates with one or more optional vehicle operational modes

807: wherein the implemented vehicle operational mode modifies a conformity status of the given administrative standard

806: making a user-selection to implement the one or more optional vehicle operational mode in a manner to attain the preferred consequential result

811: making a user-selection to implement the one or more optional vehicle operational modes prevents full conformity with the given administrative standard by the vehicle

812: responsive to the implementation of the one or more optional vehicle operation modes, forfeiting all or part of the first benefit due to the modified conformity status regarding the given administrative standard, wherein the modified conformity status does not prevent attainment of the identified preferred consequential result

813: responsive to the implementation of the one or more optional vehicle operation modes, obtaining a second benefit that accrues due to the modified conformity status, which second benefit is based on a qualification with another compliance state applicable to the vehicle, wherein the modified conformity status does not prevent attainment of the identified preferred consequential result

814: obtaining the second accrued benefit based on a qualification with two or more compliance states applicable to the vehicle

816: obtaining the second accrued benefit based on an exemption from the predetermined vehicle operation mode, which exemption requires additional payment or other consideration to qualify for the exemption

FIG. 27 PROCESSED MATRIX DATA TABLE FOR COMPARATIVE VEHICLE MODES

PROMOTIONAL CORRELATION WITH SELECTIVE VEHICLE MODES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/587,703 entitled PROMOTIONAL CORRELATION WITH SELECTIVE VEHICLE MODES, naming Roderick A. Hyde, Muriel Y. Ishikawa, Jordin T. Kare, Thomas J. Nugent. Jr., Clarence T. Tegreene, Charles Whitmer, Lowell L. Wood, Jr., Victoria Y. H. Wood as inventors, filed 9 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,237 entitled REMOTE PROCESSING OF SELECTED VEHICLE OPERATING PARAMETERS, naming Roderick A. Hyde, Muriel Y. Ishikawa, Jordin T. Kare, Thomas J. Nugent, Jr., Clarence T. Tegreene, Charles Whitmer, Lowell L. Wood, Jr., Victoria Y. H. Wood as inventors, filed 2 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,129 entitled VEHICLE SYSTEM FOR VARIED COMPLIANCE BENEFITS, naming Roderick A. Hyde, Muriel Y. Ishikawa, Jordin T. Kare, Thomas J. Nugent, Jr., Clarence T. Tegreene, Charles Whitmer, Lowell L. Wood, Jr., Victoria Y. H. Wood as inventors, filed 30 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/587,017 entitled SELECTIVE IMPLEMENTATION OF AN OPTIONAL VEHICLE MODE, naming Roderick A. Hyde, Muriel Y. Ishikawa, Jordin T. Kare, Thomas J. Nugent, Jr., Clarence T. Tegreene, Charles Whitmer, Lowell L. Wood, Jr., Victoria Y. H. Wood as inventors, filed 29 Sep. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/462,207 entitled SELECTIVE CONTROL OF AN OPTIONAL VEHICLE MODE, naming Roderick A. Hyde, Muriel Y. Ishikawa, Jordin T. Kare, Thomas J. Nugent, Jr., Clarence T. Tegreene, Charles Whitmer, Lowell L. Wood, Jr., Victoria Y. H. Wood as inventors, filed 29 Jul. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

The present application relates to vehicle monitoring and control devices and related methods, systems, components, computerized apparatus, software program products, and communication techniques.

SUMMARY

In one aspect, an exemplary method embodiment for promotional correlation with selective vehicle modes may include identifying a compliance state relative to a given administrative standard defining one or more predetermined vehicle operation modes of a vehicle traveling via a particular route or area, the compliance state corresponding to a first benefit that accrues based on conformity with the given administrative standard; establishing a preferred promotional result that is different from the first benefit, which preferred promotional result correlates with at least one type of vehicle operation mode implemented during an applicable travel period via the particular route or area subject to the given administrative standard; providing user-accessible information regarding the preferred promotional result: and receiving a notification confirming a conformity status of the vehicle based on the implemented vehicle operation mode that is sufficient to qualify for the preferred promotional result.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In another aspect, an exemplary system embodiment may include but is not limited to computerized components for remote processing of selected vehicle operating parameters, which system has the capability to implement the various process features disclosed herein. Various exemplary system aspects are described in the claims, drawings, and text forming a part of the present disclosure.

In an additional aspect, an exemplary system for promotional correlation with selective vehicle modes may include a vehicle identifier record for an identified vehicle traveling via a particular route or area that is subject to a given administrative standard that includes a first data record indicative of one or more compliance states corresponding to respective benefits available to a qualified recipient; a second data record listing one or more preferred promotional results that correlate with one or more optional vehicle operational modes; a computerized processing unit operably coupled to the second data record and having a link to one or more monitoring or detection devices on the vehicle, wherein the computerized processing unit is configured to determine qualification for the one or more preferred promotional results based on a selected vehicle operational mode detected during an applicable travel period by the one or more vehicle monitoring or detection devices.

In a further aspect, a computer program product embodiment may include computer-readable media having encoded instructions for executing an exemplary method for promotional correlation with selective vehicle modes, including identifying a compliance state relative to a given administrative standard defining one or more predetermined vehicle operation modes of a vehicle traveling via a particular route or area, the compliance state corresponding to a first benefit that accrues based on conformity with the given administrative standard; establishing criteria for a preferred promotional result that correlates with at least one type of vehicle operation mode implemented during an applicable travel period via the particular route or area subject to the given administrative standard; providing user-accessible information regarding the preferred promotional result; and processing a notification confirming a conformity status of the vehicle based on the implemented vehicle operation mode that is sufficient to qualify for the preferred promotional result.

In addition to the foregoing, various other method and/or system and/or program product aspects are set forth and described in the teachings such as text (e.g., claims and/or detailed description) and/or drawings of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 4 is a schematic representation of exemplary communication techniques involving optional vehicle operational modes.

FIG. 5 is a tabular representation showing varied examples of vehicle compliance states.

FIG. 6 is another tabular representation showing additional exemplary vehicle compliance states.

FIGS. 7-8 are further tabular representations showing exemplary vehicle modes associated with varied destinations.

FIG. 9 is a schematic representation of exemplary confirmation techniques for various types of consequential results.

FIGS. 11-24 are more detailed flow charts illustrating further exemplary process features that may be incorporated in vehicle control embodiments.

DETAILED DESCRIPTION

Figure 1:
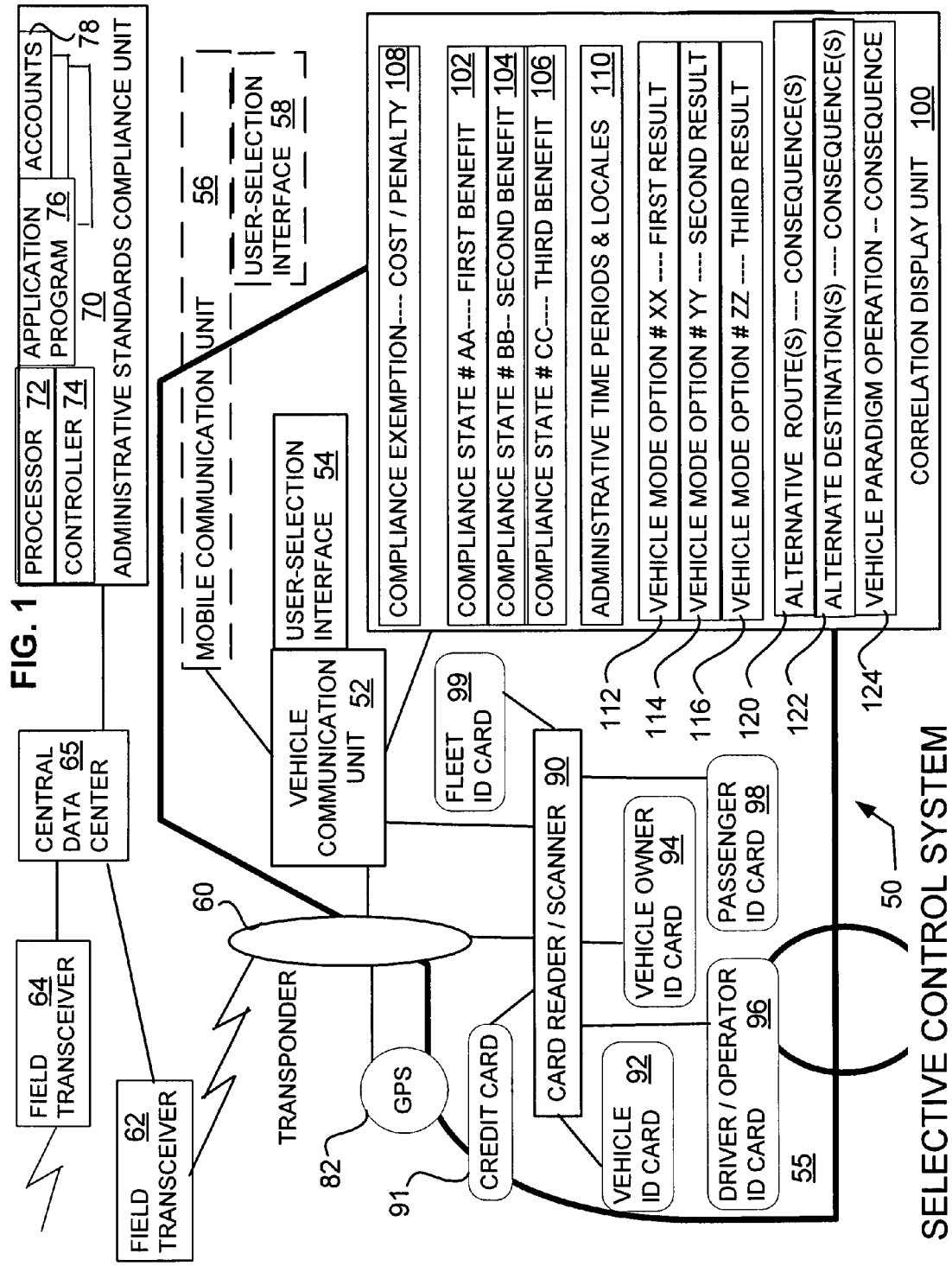
FIG. 1 is a schematic block diagram illustrating an exemplary embodiment for a selective vehicle control system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences.

In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

As used herein, the term "vehicle" encompasses devices for conveying persons or objects, including without limitation automobiles, trucks, motorcycles, buses, trains, and other land conveyances, boats, ferries, ships, and other watergoing vessels, and aircraft.

FIG. 1 is a schematic block diagram illustrating an exemplary embodiment 50 for a selective vehicle control system regarding vehicle 55. A vehicle communication unit 52 having user-selection interface 54 may in some instances be remotely accessed by a mobile communication unit 56 having user-selection interface 58. The vehicle communication unit 54 may also be operably connected via transponder 60 and via field transceiver 62 with a central data center 65 to facilitate determination of a conformity status of the vehicle 50 with respect to an applicable vehicle administrative standard. The central data center 65 may be linked to an administrative standards compliance unit 70 that is configured to include processor 72, controller 74, and application program 76 in order to make such a conformity status determination for vehicle 55 as well as for other vehicles. A periodically updated record of accounts 78 regarding the conformity status may be maintained by the administrative standards compliance unit 70.

It will be understood that a record of accounts 78 may relate to various persons or entities associated with vehicle 50. In some embodiments the vehicle communication unit 52 may be linked to an on-board card reader/scanner 90 that is capable of transferring relevant account data to and/or receiving data from a vehicle identification (ID) card 92, vehicle owner ID card 94, driver/operator ID card 94, passenger ID card 98, and/or fleet ID card 99. In certain embodiments the card reader/scanner 90 may also be able to transfer data to and/or receive data from a credit card 91 for non-cash transactions regarding a compliance state relative to the applicable administrative standard as well as for a non-cash transaction regarding a preferred consequential result correlated with one or more optional vehicle operational modes.

A correlation display unit 100 may be linked to the vehicle communication unit 52 to provide pertinent informational data for various compliance states relative to the administrative standard that is applicable to vehicle 55. For example, a compliance exemption category may have a related cost/penalty 108, a compliance state #AA may have a related first benefit 102; a different compliance state #BB may have a related second benefit 104; and another different compliance state #CC may have a related third benefit 104. The correlation display unit 100 may also provide data indicative of varied administrative time periods and/or varied administrative locales 110 associated with the various compliance states.

The correlation display unit 100 may be linked to the vehicle communication unit 52 to provide pertinent informational data indicative of various vehicle operational modes and their correlated consequential results. This enables a user-selected implementation of chosen vehicle operational mode which in some instances may modify a vehicle conformity status of a given administrative standard. For example, a selective vehicle mode option #XX may qualify for a first result 112; a different selective vehicle mode option #YY may qualify for a second result 114; and another different selective vehicle mode option #ZZ may qualify for a third result. As further examples, a choice of alternative travel routes for vehicle 55 may result in different respective consequences 120; a choice of alternate destinations for vehicle 55 may result in different respective consequences 122; and a choice of a vehicle paradigm operation may result in a particular type of consequence 124.

Figure 2:
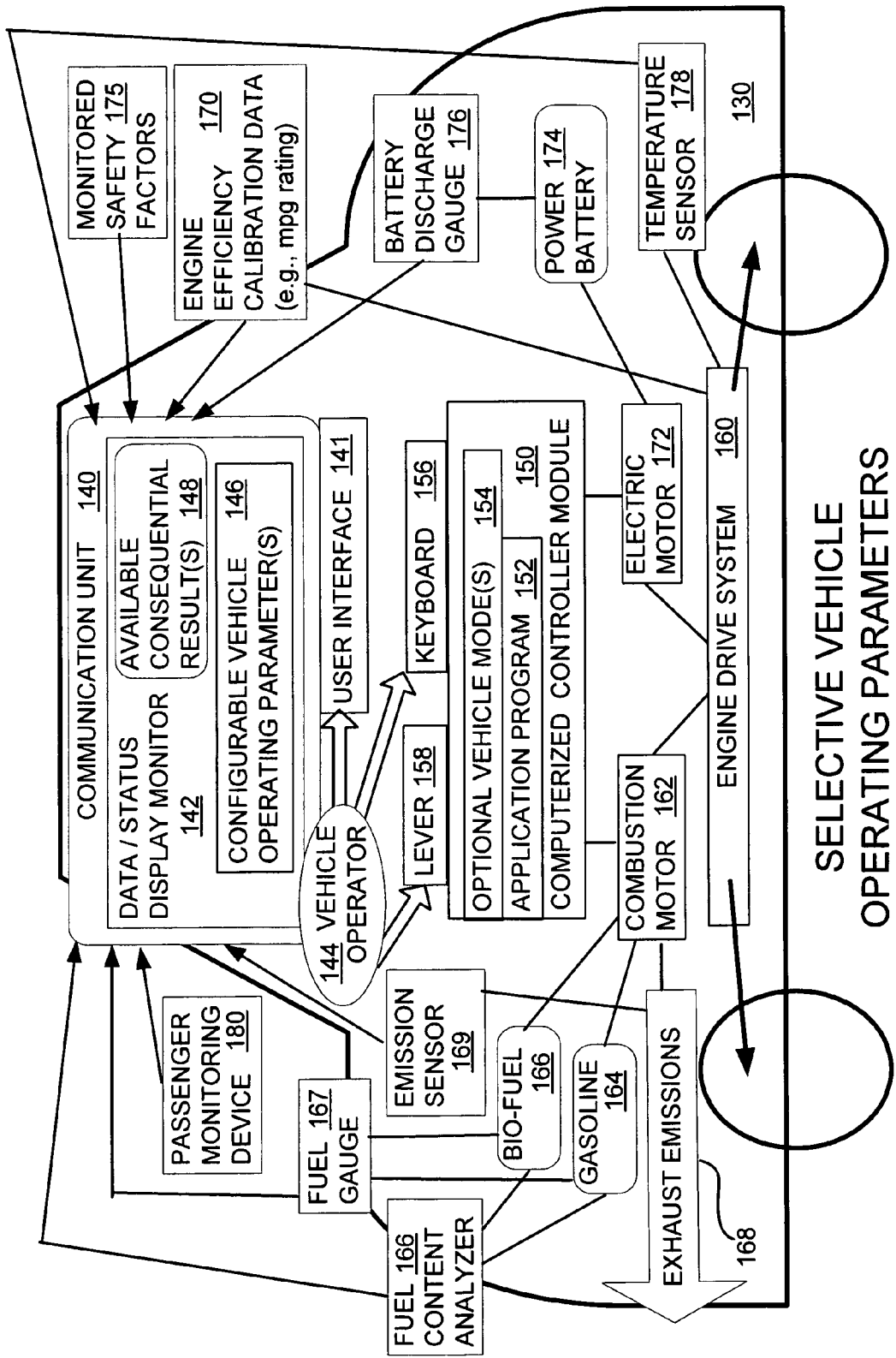
FIG. 2 is a schematic block diagram depicting exemplary vehicle operating parameters.

FIG. 2 is a schematic block diagram depicting exemplary vehicle operating parameters regarding vehicle 130. In some embodiments the vehicle 130 may include an engine drive system 160 that derives power from a combustion motor 162 and/or from an electric motor 172. A vehicle communication unit 140 may include a data/status display 142 for indicating various pertinent data regarding one or more configurable vehicle operating parameters 146 as well as pertinent data regarding available consequential results 148 respectively associated with the configurable vehicle operating parameters 146. The vehicle communication unit 140 having user interface 141 may be accessed by a vehicle operator 144 (e.g., in some instances by another vehicle occupant) to monitor such configurable vehicle operating parameters 146.

For example, vehicle operating parameters involving the combustion motor 162 may include various data aspects related to exhaust emissions 168, wherein monitored and/or processed output data obtained by emission sensor 169 may be transmitted to communication unit 140. As another example, vehicle operating parameters involving combustion fuels may include various data aspects related to gasoline 164 and/or bio-fuel 166, wherein monitored and/or processed output data obtained by fuel content analyzer 166 as well as obtained by fuel gauge 167 may be transmitted to communication unit 140.

As additional examples, vehicle operating parameters involving the electric motor 172 may include various data aspects related to a power battery 174, wherein monitored and/or processed output data obtained by battery discharge gauge 176 may be transmitted to communication unit 140. As a further example, monitored and/or processed output data regarding general vehicle operating parameters involving the engine drive system 160 may include engine efficiency calibration data (e.g., miles-per-gallon rating) 170 transmitted to communication unit 140. As another example, engine operating parameters involving heat monitoring of various vehicle components may be obtained by temperature sensor 178 for transmission to communication unit 140.

More exemplary vehicle operating parameters may be obtained by a passenger monitoring device 180 for transmitting seat-belt usage data, passenger ID data, and occupant counting data to communication unit 140. Further exemplary vehicle operating parameters may involve vehicle data that includes monitored safety factors 175 such as identification of air bags deployed, safety inspection status, prohibited driver activity (e.g., alcohol usage, cell phone usage, text messaging, unlicensed driver, expired driver license, etc.), expired car registration, tire tread wear, tire pressure, engine fluid data (e.g., brake cylinder, automatic transmission, oil, coolant), wherein such vehicle data is transmitted to communication unit 140.

All such output data regarding the vehicle operating parameters that is stored or maintained by communication unit 140 may be accessible on the data/status display monitor 142 for review and/or consideration by the user who selectively implements one or more chosen vehicle operation modes 154. Such selective implementation may be actuated by circuits and/or software included in a computerized controller module 150. It will be understood that a user-selection of certain vehicle operating parameters in order to achieve a preferable vehicle paradigm may cause a modification of the conformity status of the vehicle with respect to a given administrative standard.

Such a computerized controller module 150 may also include implementation components such as an application program 152, lever 158, keyboard 156 or other devices (e.g. button, dial, switch, mouse, pedal, etc.), and may be actuated by various user-initiated control actions (e.g., voice command, tactile touching, gesture, hand manipulation, foot manipulation, etc.). In some instances the implementation components may be actuated from a mobile and/or remote device (e.g., see mobile communication unit 56 in FIG. 1).

Figure 3:
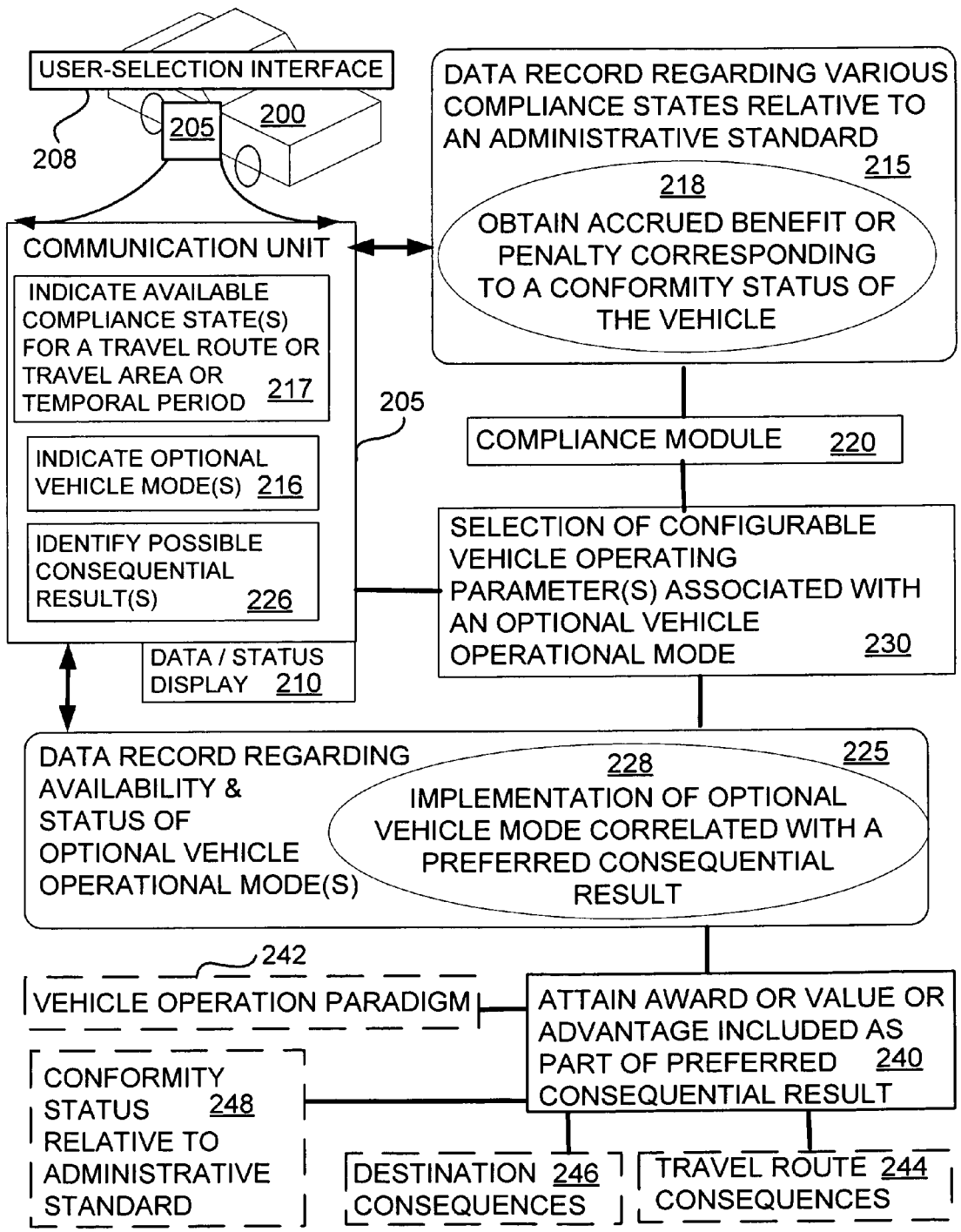
FIG. 3 is a schematic block diagram illustrating exemplary data processing aspects related to optional vehicle operational modes.

FIG. 3 is a schematic block diagram illustrating exemplary data processing aspects related to optional vehicle operation modes for vehicle 200. An on-board communication unit 205 having a user-selection interface 208 may be operably connected with a data record 215 regarding various compliance states relative to an administrative standard. The communication unit 205 includes a data/status display 210 to indicate one or more available compliance states for a travel route or travel area or temporal period 217. The data/status display 210 may further indicate one or more optional vehicle modes 216, and may identify one or more possible consequential results 226 that are respectively correlated with the optional vehicle modes. A compliance module 220 operatively linked to data record 215 and to communication unit 205 may include processing circuits and/or software capable of determining the conformity status as well as the accrued benefit or penalty based on a selection of one or more configurable vehicle operating parameters associated with an optional vehicle operational mode 230.

Accordingly a person or entity associated with vehicle 200 may obtain an accrued benefit or penalty corresponding to the conformity status of the vehicle 218 relative to the administrative standard, which conformity status may be modified due to a user-selected implementation of a chosen vehicle operational mode.

Also depicted in FIG. 3 is a data record regarding availability and status of one or more optional vehicle operational modes 225, which data record is accessible to the communication unit 205 for review by a user. It will be understood that implementation of an optional vehicle mode correlated with a preferred consequential result 228 may qualify an approved recipient to attain an award or value or advantage included as part of the preferred consequential result 240. Of course, such implementation of the optional vehicle mode may involve one or more of the following aspects: a preferred vehicle operation paradigm 242, varied travel route consequences 244, varied destination consequences 246. It will be further understood that such implementation of the optional vehicle mode may also have an effect on the conformity status of the vehicle 205 relative to the administrative standard 248.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

FIG. 4 is a schematic representation of exemplary communication techniques involving optional vehicle operational modes for a vehicle 250 traveling along designated paths 249, 350 toward one or more destinations 354, 357, 358. For example, in some instances a vehicle mode selection that includes traveling toward a primary destination 354 may require a choice between alternative routes 344, 346. A different vehicle mode selection that includes travel along other alternative routes 348, 349 would allow a visit to intermediate destination 358 along the way to primary destination 354. Yet another vehicle mode selection that includes travel toward a secondary destination 357 may require a choice to proceed along alternative route 347. Each travel route as well as each destination may involve varied combinations of trip times and travel velocities and traffic conditions, as well as different compliance states associated with an applicable administrative vehicle standard.

Vehicle 250 may include a driver (e.g., operator) 251 and also passenger occupants 252, 253, and may further include a communication unit 255 having a user-selection interface 256 available to the driver 251 and/or passenger occupants 252, 253. In some implementations the communication unit 255 may be linked to an on-board GPS 260, and also linked to onboard data records 258, and in some instances linked to an on-board compliance unit 275. The on-board compliance unit 275 may include processing circuits and/or software capable of making a determination of a vehicle conformity status with respect to the given administrative standard 292 and its associated compliance states 294 as set forth in externally available data records 290 (or perhaps also available in on-board data records 258). Of course other data record locations may be provided to facilitate easy accessibility and appropriate data integrity and security.

In some embodiments a vehicle-mounted transceiver 270 may provide a bi-directional wireless communication link 272 with a remote compliance unit 280 that may include processing circuits and/or software capable of making a similar determination of the vehicle conformity status. It will be understood that wireless communication links 272a may be maintained between the remote compliance unit 280 and the traveling vehicle-mounted transceiver 270a during a time period prior to and/or during and/or after the vehicle 250 is subject to the given administrative standard. Of course the communication unit 255 as well as individual passenger communication units may have their own respective transceivers depending on the circumstances, and the depicted embodiments features are provided for illustration only and are not intended to be limiting.

An account record 310 may receive an output from the on-board compliance unit 275 or from the remote compliance unit 280. Such an account record 310 may include a cumulative listing of accrued benefits and/or penalties based on conformity of one or more vehicles 250 with the compliance states 294 of various administrative vehicle standards. It will be understood that a transmission tower 300 (or a network satellite) may provide the required wireless communication links 302, 304, 306, 308 with on-board compliance unit 275, remote compliance unit 280, account record 310, and communication unit 255 to facilitate accessibility and storage of historical and/or updated and/or real-time informational data related to the operational modes of vehicle 250 during travel.

When a user identifies and/or receives informational data (e.g., via communication unit 255) regarding availability of a preferred consequential result 325 that is different from an administrative compliance benefit, a decision may be made to selectively implement one or more optional vehicle operation modes 330 in a manner to attain an available preferred consequential result. For example, one or more available (e.g., updated) consequential results associated with a specified alternate destination 360 may be transmitted to communication unit 255 for display and/or review and/or consideration by the user who selectively implements a chosen vehicle operation mode 330. As a further example, one or more available (e.g., updated) consequential results associated with alternative travel routes 340 may be transmitted to communication unit 255 for display and/or review and/or consideration by the user who selectively implements a chosen vehicle operation mode 330. As another example, one or more available (e.g., updated) consequential results associated with a preferred vehicle paradigm 334, as well as monitored status data for the preferred vehicle paradigms 332, may be transmitted to communication unit 255 for display and/or review and/or consideration by the user who selectively implements a chosen vehicle operation mode 330.

FIG. 5 is a tabular representation that includes a data table 380 showing examples of varied vehicle compliance states for applicable private and public locales (e.g., areas and travel routes) 385 that are subject to an administrative vehicle standard during predetermined temporal periods 390. An exemplary temporal period may include a designated weekday commuter time (e.g., 6-9 AM and 4-7 PM), and in some instances may include special daily air quality alerts (e.g., 8 AM to 8 PM).

An exemplary listing of varied vehicle compliance states 395 and their corresponding daily monetary fee 430 during a designated time period is depicted in FIG. 5. For example, an administrative policy that encourages electric powered vehicles may be enacted pursuant to an administrative standard have a graduated daily fee scale as follows: battery-powered vehicle 432 pays no daily fee; hybrid vehicle operating in "power mode only" 434 pays two dollars; hybrid vehicle operating in "over fifty percent electric mode" 436 pays six dollars; and hybrid vehicle operating in "over fifty percent combustion mode" 438 pays eight dollars.

As a further example, an administrative policy that encourages non-petroleum and/or non-polluting engines may be enacted pursuant to an administrative standard having varied compliance states 395 with a graduated fee scale as follows: vehicle operating in "pure bio-fuel combustion mode" 440 pays four dollars; vehicle using "certified bio-fuel blend only" 442 pays eight dollars; vehicle using "compressed natural gas fuel" 444 pays four dollars; vehicle using "conventional gas/diesel fuel" 446 pays fifteen dollars; vehicle using diesel fuel with "low emission mode ON" 448 pays ten dollars; and vehicle using gasoline fuel with "catalytic converter ON" 449 pays ten dollars.

As another example, an administrative policy encouraging ride sharing may be enacted pursuant to an administrative standard having varied compliance states 395 with a graduated fee scale as follows: vehicle with "driver only—zero passengers" 450 pays an extra nine dollar surcharge; vehicle with "at least one passenger" 452 pays an extra seven dollar surcharge; vehicle with "at least two passengers" pays an extra three dollar surcharge; and vehicle with "at least three passengers" pays no extra surcharge.

In contrast, an administrative policy that is based on a "usage tax" for non-compliant vehicles may be enacted pursuant to an administrative standard with a fixed fee scale, such as a "prepaid all-day exemption ticket" costing twenty dollars.

Various types of exemplary locales may become subject to a vehicle administrative standard. For example, such an administrative standard may be enforced against vehicles traveling on high-speed traffic lanes (e.g., Tri-City freeway's high speed thru lane 402, State highway 25-HOV/diamond lanes 416), entire roadways (e.g., Evergreen parkway 406, Memorial toll road 404), strategic routes traversing natural barriers (e.g., Roosevelt tunnel 408, Pioneer viaduct 410, Cascade River bridge 412, Washington lake ferry 414), nature parks (e.g., Grizzly bear forest state park 418, Redwood mountain national park 420), restricted residential developments (e.g., Habitat private resort 422, all roads & streets in Sunset Village 426, Nottingham retirement community 428), and educational and business locations (e.g., Emerald City urban center between Central Ave/River Rd/Aspen Dr/State St 424, Ford College campus & research park 427).

FIG. 6 is a tabular representation that includes data tables 470 showing examples of varied alternative routes 475, 515, 535 and their respective compliance states 490, 490a, 490b and fee schedules 510, 510a, 510b relative to an administrative vehicle standard. For example, an alternate route via Lincoln Bridge 475 requires a separate payment charge for each trip based on its own customized compliance schedule. As another example, an alternative route via Madison Bridge 515 requires an all-day pass payment based on its own customized compliance schedule. As a further example, an alternative route via Lake Toll Road 535 requires a payment at each periodic exit toll station based on its own customized compliance schedule.

It is noted that in some circumstances, a different exemplary alternative route via a conventional highway or frontage road 530 may provide a slower trip for which a vehicle administrative standard is not applicable 532 and therefore no payment is required.

More specifically with respect to the Lincoln Bridge 475, a possible vehicle operation mode category 480 entitled "share" 482 has a compliance state 490 of "at least one passenger" 492 with a dual payment status 500. The dual payment status 500 may include a "passenger share basis" 502 requiring a ten dollar fee, or else a "combo share with battery or bio-fuel basis" 503 requiring a lesser five dollar fee. Another possible vehicle operation mode category 480 entitled "battery" 484 has a compliance state 490 of "solely electric power" 494 with a payment status 500 called "battery power basis" 504 requiring an eight dollar fee. A further possible vehicle operation mode category 480 entitled "bio-fuel" 486 has a compliance state 490 of "solely bio-fuel combustion" 496 with a payment status 500 called "bio-fuel basis" 506 requiring an eight dollar fee. Yet another possible vehicle operation mode category 480 entitled "exemption" 488 has a compliance state 490 of "authorized pre-payment" 498 with a payment status 500 called "exemption basis" 508 requiring a higher twenty dollar fee.

Mores specifically with respect to the Madison Bridge 515, a possible vehicle operation mode category 480a entitled "solo" 514 has a compliance state 490a of "no passenger" 522 requiring a rather high thirty dollar fee. Another possible vehicle operation mode category 480a entitled "pool" 516 has a compliance state 490a of "one/two passengers" 524 requiring a lesser twenty dollar fee. Another possible vehicle operation mode category 480a entitled "group" 518 has a compliance state 490a of "three or more passengers" 526 requiring a lowest ten dollar fee.

More specifically with respect to the Lake Toll Road 535, a possible vehicle operation mode category 480b entitled "zero emissions" 544 has a compliance state 490b of three separate classifications 552, including a first basis of "electric power vehicle", a second basis of "solely electric mode (hybrid engine), and a third basis of "certified low combustion emission", wherein each basis qualifies for waiver of any payment fee. Another possible vehicle operation mode category 480b entitled "high occupancy vehicle (HOV)" 546 has a compliance state 490b of "at least two passengers" 545 that also qualifies for waiver of any payment fee. A further possible vehicle operation mode category 480b entitled "cash/credit exemption" 548 has a compliance state 490b of "daily/weekly/monthly rate" 556 requiring a twenty five dollar daily fee, a one hundred dollar weekly fee, and a three hundred fifty dollar monthly fee.

Of course, it will be understood that the various references herein to an administrative standard that includes payment status based on fees and/or dollar amounts are for purposes of illustration only and are not intended to be limiting. Other types of compliance requirements that are based on non-monetary valuation or qualification may be incorporated as part of the administrative standard, including items or topics or behavior that are deemed to be appropriate with respect to the desired goals and policies of such administrative standard.

FIGS. 7-8 are tabular representations that includes data tables 570, 680 showing examples of varied destinations 575, 620, 685, 720 that provide consequential results 600, 600a, 600b, 600c respectively based on correlated vehicle operation modes 610, 610a, 600b, 600c. It will be understood that the specific type of destinations shown including café-type destinations 575 and retail/wholesale store and mall-type destinations 620 and parking destinations 685 and overnight accommodations 720 are for purposes of illustration only, and are not intended to be limiting.

Although a chain of affiliated product or service entities at different locations may provide identical consequential results associated with identically correlated vehicle operation modes, the individual destinations illustrated in FIGS. 7-8 are depicted with different characteristics to better illustrate a variety of possible choices that may be available to a particular vehicle and/or its occupants.

For example as depicted in FIG. 7, a café-type destination entity entitled Sizzle 582 along the Parkway route 529 may provide to a qualified recipient an award or value or advantage that includes "food discount & high-voltage battery recharge" 602 based on an implemented "electric power" vehicle mode 612; a café-type destination entity entitled Lake-Vu 584 along the State Street route 594 may provide to a qualified recipient an award or value or advantage that includes "food discount & bio-fuel discount" 604 based on an implemented "low emission" vehicle mode 614; a café-type destination entity entitled Dan's 585 along the Tri-Tunnel route 595 may provide to a qualified recipient an award or value or advantage that includes "food discount & gas/diesel discount" based on an implemented "multi-passenger" vehicle mode 615.

As further examples, a café-type destination entity entitled Mid-Lake Mall 586 along the Parkway or Toll Road route 596 may provide to a qualified recipient an award or value or advantage that includes "food & product purchase discounts & access to low-voltage recharge" 606 based on an implemented "multi-passenger or electric power" vehicle mode 616; and a café-type destination entity entitled Eatery Buffet 588 along the Highway with HOV Lane 598 may provide to a qualified recipient an award or value or advantage that includes "food discount plus free movie tickets for all vehicle occupants" 608 based on "qualified HOV use" vehicle mode 618.

As additional examples depicted in FIG. 7, a retail store destination entity entitled Import Wow 624 along the Sunset Village route 632 may provide to a qualified recipient an award or value or advantage that includes a "discount for driver & owner" 642 based on a "qualified HOV use" vehicle mode 654; and a retail store destination entity entitled Price-Plus 624 along the Viaduct route 624 may provide to a qualified recipient an award or value or advantage that includes "battery replacement & discount recharge & discount gas/diesel" 644 based on an implemented "multi-passenger" vehicle mode 654.

As added examples, a wholesale or retail store entity entitled U-Buy Service Center 626 at a mall-type destination near an exit from the HOV lane of U.S. Highway route 636 may provide to a qualified recipient an award or value or advantage that includes "discounted car accessories/repair & discounted high-voltage or low-voltage recharge or discounted bio-fuel" 646 based on an implemented "low emission or electric power or bio-fuel" vehicle mode 656; and a mall-type destination entitled Fashion Mall & Triplex Theaters & Terrace Parking 628 that can be reached via multiple routes and areas 638 may provide to a qualified recipient an award or value or advantage that includes "variable discounts for parking & purchases & movie tickets & fuel & battery recharge & meals & groceries" 648 based on implemented "diverse vehicle mode qualifications for each entity" 658.

Referring to more examples as depicted in FIG. 8, a parking destination entitled Early Bird 682 that can be reached via the Parkway route 692 may provide to a qualified recipient an award or value or advantage that includes "low-voltage recharge & pre-8 am discount" 702 based on an implemented "electric power" vehicle mode 712; a parking destination entitled Self-Park 684 that can be reached via the Viaduct route 694 may provide to a qualified recipient an award or value or advantage that includes "daily or weekly discount rate" based on an implemented "low emission or bio-fuel" vehicle mode 714; and a parking destination entitled Muni-Park 686 that can be reached via any HOV Lane 696 may provide to a qualified recipient an award or value or advantage that includes "free shuttle to office buildings" 706 based on an implemented "multi-passenger" vehicle mode 716.

With reference to more examples, an overnight accommodation destination entitled Whiz Motel 722 along the Parkway route 732 may provide to a qualified recipient an award or value or advantage that includes "room & recharge discounts" 742 based on an implemented "electric power" vehicle mode 752; an overnight accommodation destination entitled Nu-Inn 724 along the Viaduct route 734 may provide to a qualified recipient an award or value or advantage that includes "free breakfast & discounted bio-fuel" 744 based on an implemented "low emissions or bio-fuel" vehicle mode 754; and an overnight accommodation destination entitled Marquis Hotel 726 that can be reached via any HOV Lane or the Parkway or the Toll Road 736 may provide to a qualified recipient an award or value or advantage that includes "discounted rooms, free parking with low-voltage or high-voltage recharge" 746 based on a "qualification receipt from HOV lane or Parkway or Toll Road" 756.

It will be understood that the types of possible award or value or advantage depicted in the exemplary embodiments of FIGS. 7 and 8 are for purposes of illustration and are not intended to be limiting. Many other diverse monetary and non-monetary consequential results may be provided in connection with products and services that may be available at a specified destination to a qualified recipient.

The schematic representation of FIG. 9 illustrates exemplary embodiment features that provide possible certification techniques for various types of consequential results related to vehicle 760 traveling along a designated path 790 toward one or more destinations 791, 792, 723. Vehicle 760 may include a driver (e.g., operator) 761 and passengers 762, 763 and may further include a communication unit 765 having a user interface 766 available to the driver 761 and/or passengers 762, 763. In some implementations the communication unit 765 also may be linked to an on-board GPS (global positioning system) 770, and linked to on-board data records 768, and linked via transceiver 78 to one or more remote communication units 765a. Exemplary informational data sent to and from the communication unit 765 may relate to selected vehicle operation modes that are actually implemented in vehicle 770 during travel via a particular route or area. Other data inputs to and from communication unit 765 may relate to a preferred consequential result that includes certification of an actual award or value or advantage correlated with the selected vehicle operation mode.

For example, a data message from communication unit 765 may constitute a vehicle mode notification 775 sent to certification module 780 for determination of attainment of an actual consequential result, based on data records 777 that include a listing of a possible award or value or advantage 778 and a listing of their respective correlated vehicle operation modes 779. The certification module 780 may include processing circuits and/or software capable of making such a determination, and also configured to send a certification response 785 to a qualified recipient (e.g., vehicle 76, driver 761, passengers 762, 763, etc.) via transceiver 773. A responsible party providing the consequential result 782 may also be linked to certification module 78 to receive updated certification status information.

As a further example, a separate certification module 780a may be configured to make a determination of attainment of an actual award or value or advantage associated with a correlated vehicle operation mode based on related data records 777a. The certification module 780a may include processing circuits and/or software capable of making such a determination regarding a consequential result associated with specified destinations 791, 792, 973. A certification of the actual attainment of such consequential result 794 can be sent to a qualified recipient via communication unit 765 or via a remote communication unit 772.

As another example, a separate certification module 780*b* may be configured to make a determination of attainment of an actual award or value or advantage associated with a correlated vehicle operation mode based on related data records 777*b*. The certification module 780*b* may include processing circuits and/or software capable of making such a determination regarding a consequential result associated with a particular route or area 790*a*, 790*b*, 790*c*. A certification of actual attainment of such consequential result 795 can be sent to a qualified recipient via communication unit 765 or via a remote communication unit 772.

As an additional example, a separate certification module 780*c* may be configured to make a determination of attainment of an award or value or advantage associated with a correlated vehicle operation mode based on related data records 777*c*. The certification module 780*c* may include processing circuits and/or software capable of making such a determination regarding a consequential result that involves monitoring an applicable vehicle operation parameter 767. Such monitoring may be accomplished by various sensors including various types of electro-mechanical devices (e.g., see FIG. 2). A certification of actual attainment of a preferable vehicle paradigm 768 can be sent to a qualified recipient via communication unit 765 or via a remote communication unit 772.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Figure 10:
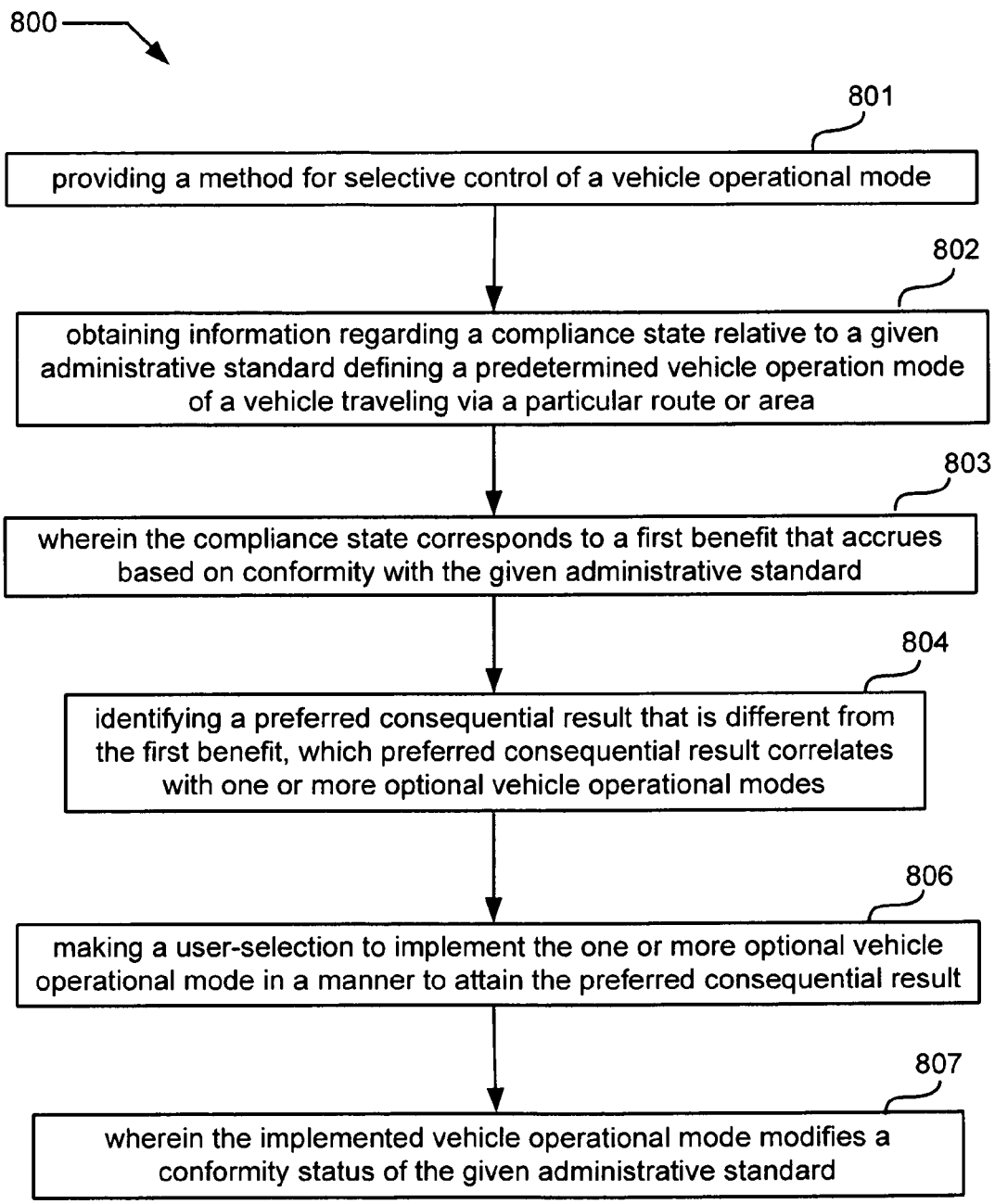
FIG. 10 is a high level flow chart for an exemplary selective vehicle control process.

Referring to the high level flow chart of FIG. 10, an exemplary process embodiment 800 provides a method for selective control of a vehicle operation mode (block 801) that may include obtaining information regarding a compliance state relative to a given administrative standard defining a predetermined vehicle operation mode of a vehicle traveling via a particular route or area (block 802), wherein the compliance state corresponds to a first benefit that accrues based on conformity with the given administrative standard (block 803); and identifying a preferred consequential result that is different from the first benefit, which preferred consequential result correlates with one or more optional vehicle operational modes (block 804). Other possible process components may include making a user-selection to implement the one or more optional vehicle operational modes in a manner to attain the preferred consequential result (block 806), wherein the implemented vehicle operational mode modifies a conformity status of the given administrative standard (block 807).

The process embodiment features 810 illustrated in the more detailed flow chart of FIG. 11 may include previously described features 802, 803, 804, 806, 807, wherein making the user-selection to implement the one or more optional vehicle operational modes prevents full conformity with the given administrative standard by the vehicle (block 811). A further implementation feature may include, responsive to the implementation of the one or more optional vehicle operation modes, forfeiting all or part of the first benefit due to the modified conformity status regarding the given administrative standard, wherein the modified conformity status does not prevent attainment of the identified preferred consequential result (block 812).

Other possible process aspects may include, responsive to the implementation of the one or more optional vehicle operation modes, obtaining a second benefit that accrues due to the modified conformity status, which second benefit is based on a qualification with another compliance state applicable to the vehicle, wherein the modified conformity status does not prevent attainment of the identified preferred consequential result (block 813). Other related aspects may include obtaining the second accrued benefit based on a qualification with two or more compliance states applicable to the vehicle (block 814), and obtaining the second accrued benefit based on an exemption from the predetermined vehicle operation mode, which exemption requires additional payment or other consideration to qualify for the exemption (block 816).

Figure 12:
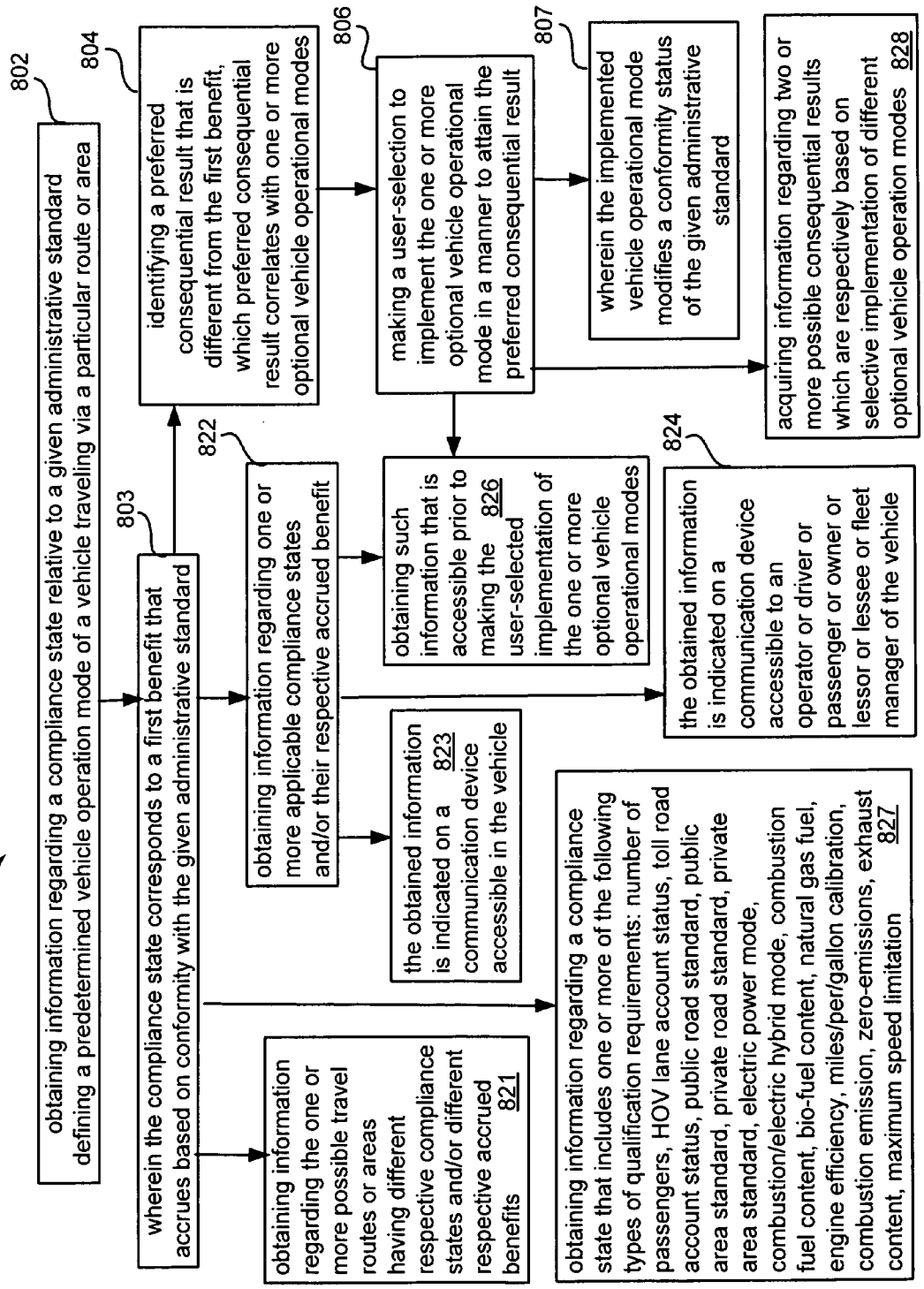

Referring to the various embodiment features 820 illustrated in FIG. 12, a possible process implementation may include previously described operations 802, 803, 804, 806, 807, as well as obtaining information regarding the one or more possible travel routes or areas having different respective compliance states and/or different respective accrued benefits (block 821). In some instances a process embodiment may include obtaining information regarding one or more applicable compliance states and/or their respective accrued benefit (block 822), wherein in some implementations such obtained information may be indicated on a communication device accessible in the vehicle (block 823), or such obtained information may be indicated on a communication device accessible to an operator or driver or passenger or owner or lessor or lessee or fleet manager of the vehicle (block 824). A further related aspect may include obtaining information regarding one or more applicable compliance states and/or their respective accrued benefit (block 822), wherein in some implementations such information is accessible prior to making the user-selected implementation of the one or more optional vehicle operational modes (block 826).

Additional possible process features depicted in FIG. 12 may include obtaining information regarding a compliance state that includes one or more of the following types of qualification requirements: number of passengers, HOV lane account status, toll road account status, public road standard, public area standard, private road standard, private area standard, electric power mode, combustion/electric hybrid mode, combustion fuel content, bio-fuel content, natural gas fuel, engine efficiency, miles/per/gallon calibration, combustion emission, zero-emissions, exhaust content, maximum speed limitation (block 827). Another exemplary process feature may include acquiring information regarding two or more possible consequential results which are respectively based on selective implementation of different optional vehicle operation modes (block 828).

Figure 13:
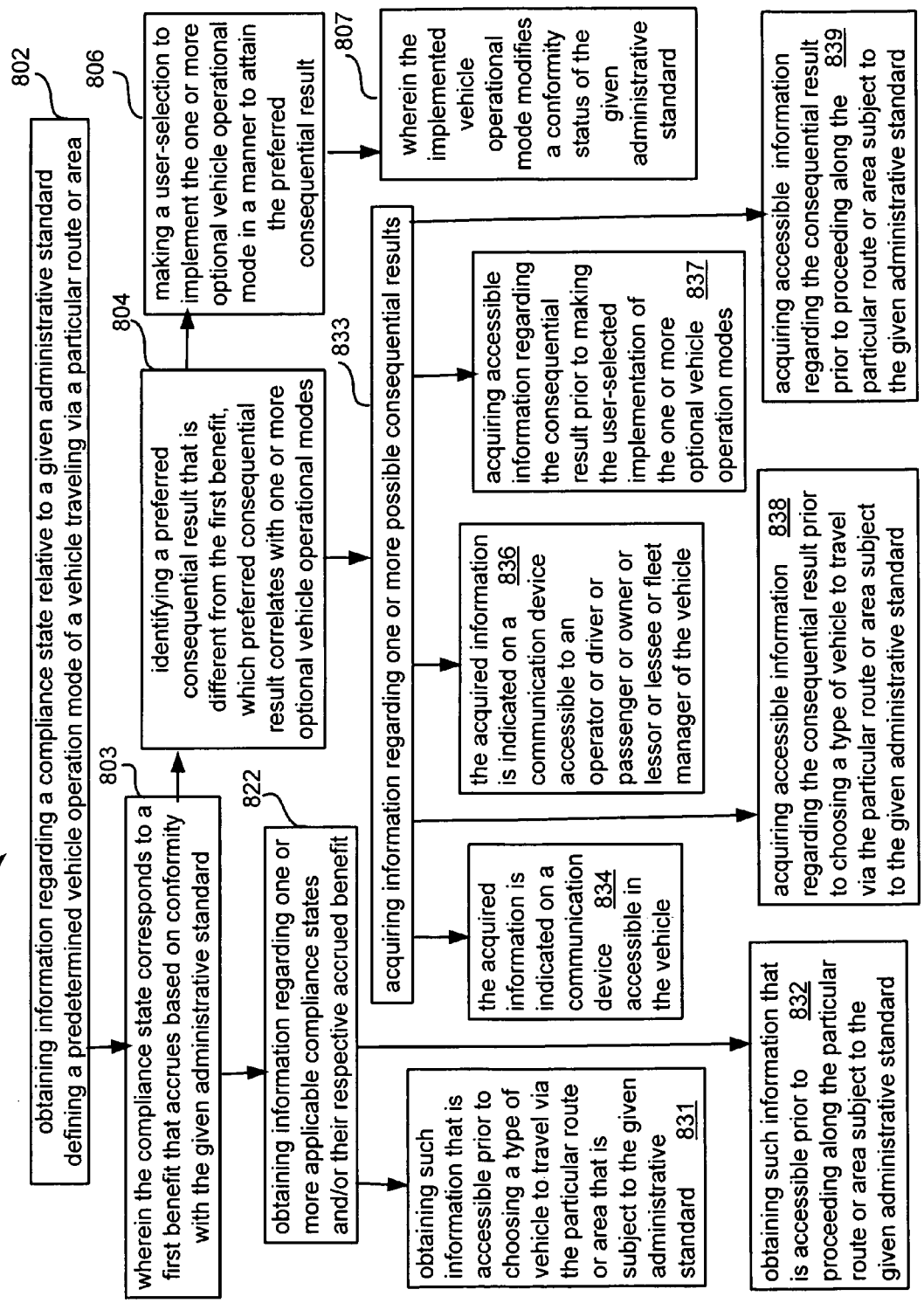

The various exemplary process embodiment features 830 disclosed in the flow chart of FIG. 13 may include previously described components 802, 803, 804, 806, 807 in combination with obtaining information regarding one or more applicable compliance states and/or their respective accrued benefit (block 822). Further related component features may include obtaining such information that is accessible prior to choosing a type of vehicle to travel via the particular route or area subject to the given administrative standard (block 831), or obtaining such information that is accessible prior to proceeding along the particular route or area subject to the given administrative standard (block 832).

In some instances another process feature may include acquiring information regarding one or more possible consequential results (block 833), wherein such acquired information may be indicated on a communication device accessible in the vehicle (block 834) or may be indicated on a communication device accessible to an operator or driver or passenger or owner or lessor or lessee or fleet manager of the vehicle (block 836).

As further illustrated in FIG. 13, some process embodiments may include acquiring information regarding one or more possible consequential results (block 833). Related process component may further include acquiring accessible information regarding the consequential result prior to making the user-selected implementation of the one or more optional vehicle operation modes (block 837), or acquiring accessible information regarding the consequential result prior to choosing a type of vehicle to travel via the particular route or area subject to the given administrative standard (block 838), or acquiring accessible information regarding the consequential result prior to proceeding along the particular route or area subject to the given administrative standard (block 839).

Figure 14:
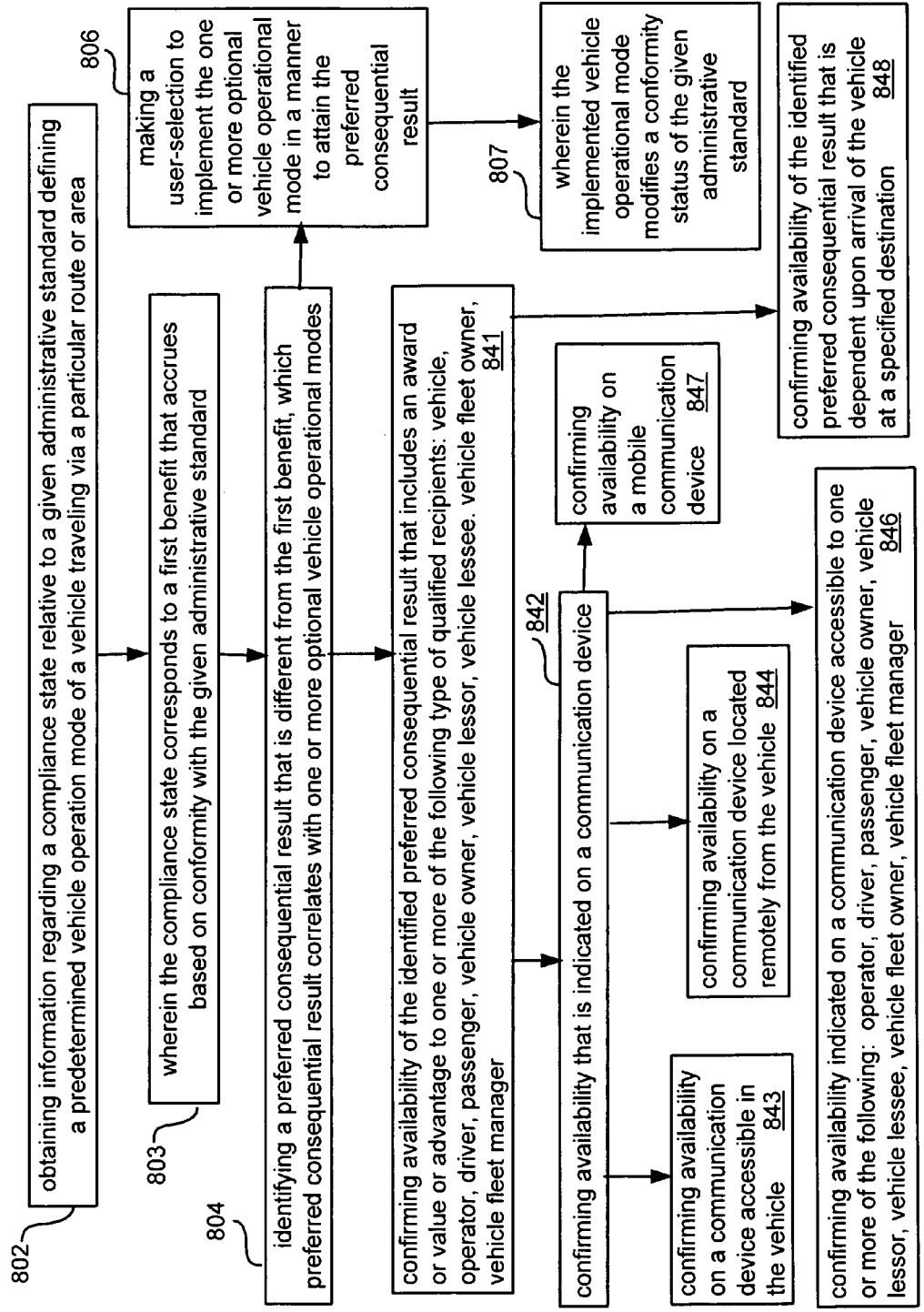

Referring to the detailed flow chart of FIG. 14, exemplary process features 840 may include previously described aspects 802, 803, 804, 806, 807 along with confirming availability of the identified preferred consequential result that includes an award or value or advantage to one or more of the following type of qualified recipients: vehicle, operator, driver, passenger, vehicle owner, vehicle lessor, vehicle lessee, vehicle fleet owner, vehicle fleet manager (block 841). Another possible process aspect may include confirming availability of the identified preferred consequential result that is dependent upon arrival of the vehicle at a specified destination (block 848).

In some exemplary process embodiments, an operational feature may include confirming availability of the identified preferred consequential result indicated on a communication device (block 842). Related features may include confirming availability on a communication device accessible in the vehicle (block 843), or confirming availability on a communication device located remotely from the vehicle (block 844), or confirming availability of the identified preferred consequential result on a mobile communication device (block 847). In some instances a process embodiment may include confirming availability on a communication device that is accessible to one or more of the following: operator, driver, passenger, vehicle owner, vehicle lessor, vehicle lessee, vehicle fleet owner, vehicle fleet manager (block 846).

Figure 15:
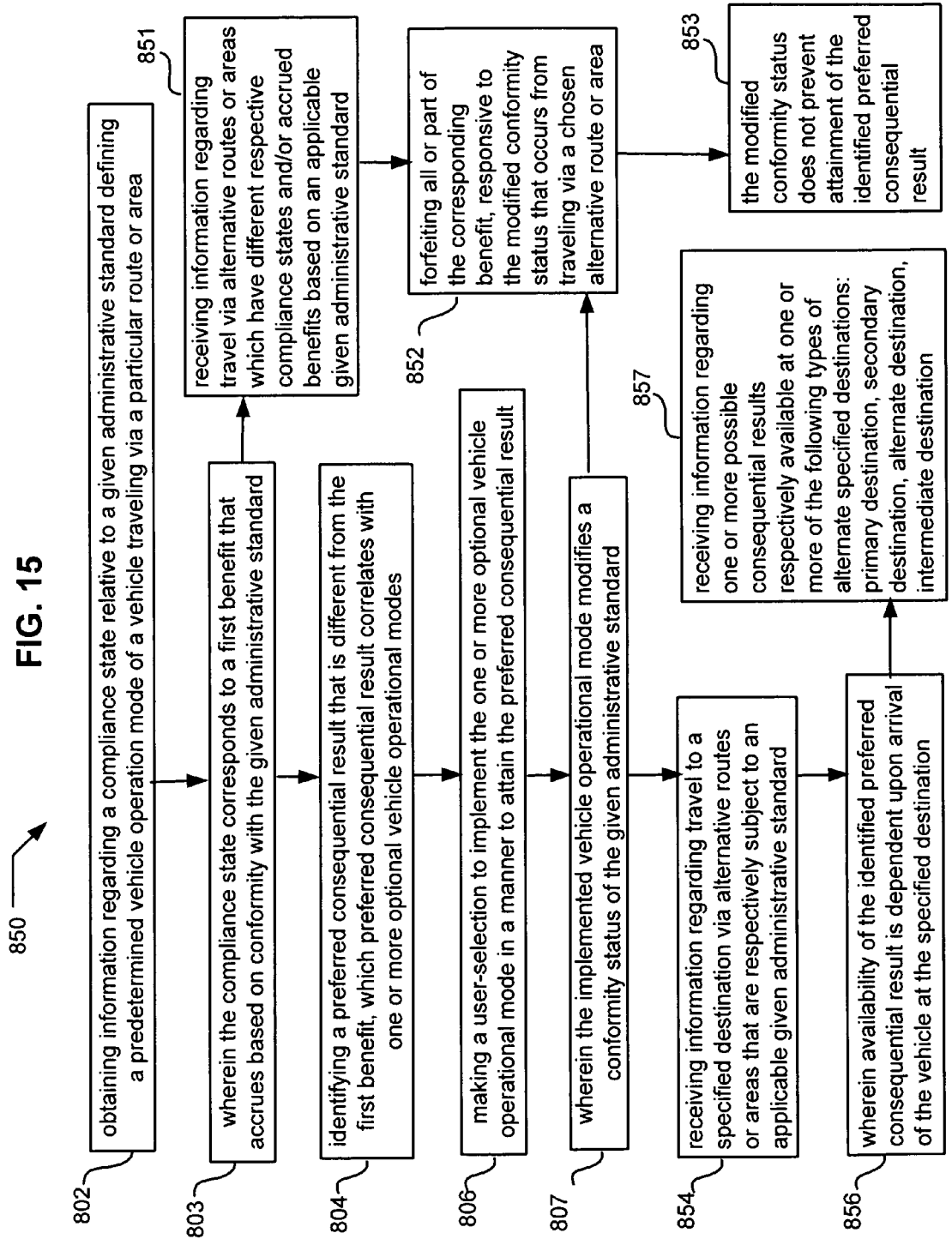

The detailed flow chart of FIG. 15 depicts various exemplary process features 850 including previously described components 802, 803, 804, 806, 807 in combination with receiving information regarding travel via alternative routes or areas which have different respective compliance states and/or accrued benefits based on an applicable given administrative standard (block 851). Other possible process aspects may include forfeiting all or part of the corresponding benefit, responsive to the modified conformity status that occurs from traveling via a chosen alternative route or area (block 852), and wherein in some implementations the modified conformity status does not prevent attainment of the identified preferred consequential result (block 853).

Additional embodiments may include receiving information regarding travel to a specified destination via alternative routes or areas that are respectively subject to an applicable given administrative standard (block 854), wherein in some implementations availability of the identified preferred consequential result is dependent upon arrival of the vehicle at the specified destination (block 856). Further possible aspects may include receiving information regarding one or more possible consequential results respectively available at one or more of the following types of alternate specified destinations: primary destination, secondary destination, alternate destination, intermediate destination (block 857).

Figure 16:
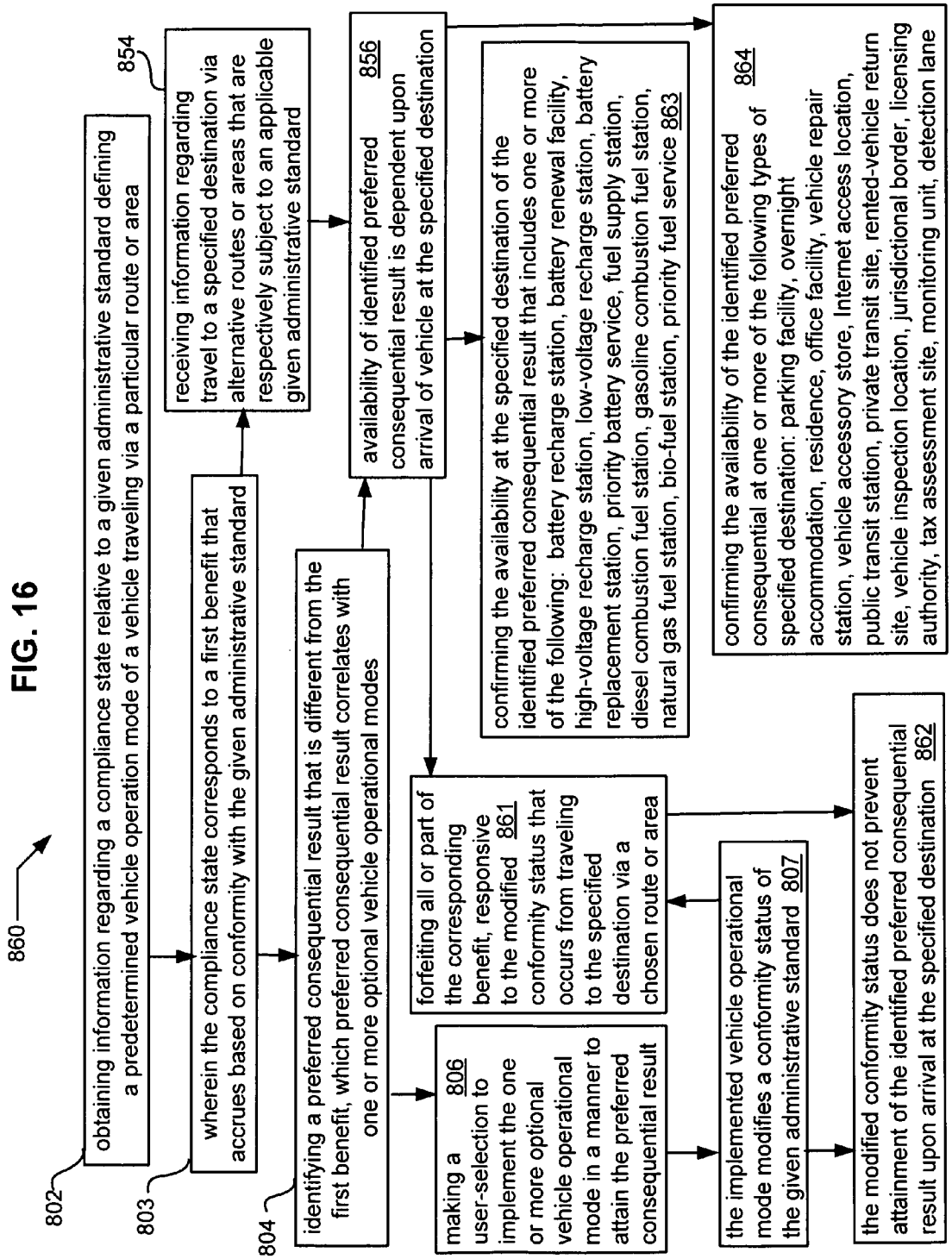

The exemplary process embodiment features 860 of FIG. 16 include previously described operations 802, 803, 804, 806, 807 along with forfeiting all or part of the corresponding benefit, responsive to the modified conformity status that occurs from traveling to the specified destination via a chosen route or area (block 861), wherein in some implementations the modified conformity status does not prevent attainment of the identified preferred consequential result available upon arrival at the specified destination (block 862).

Also depicted in FIG. 16 are previously described operations 854, 856 along with confirming the availability at a specified destination of the identified preferred consequential result that includes one or more of the following: battery recharge station, battery renewal facility, high-voltage recharge station, low-voltage recharge station, battery replacement station, priority battery service, fuel supply station, diesel combustion fuel station, gasoline combustion fuel station, natural gas fuel station, bio-fuel station, priority fuel service (block 863). A further process aspect may include confirming the availability of the identified preferred consequential at one or more of the following types of specified destination: parking facility, overnight accommodation, residence, office facility, vehicle repair station, vehicle accessory store, Internet access location, public transit station, private transit site, rented-vehicle return site, vehicle inspection location, jurisdictional border, licensing authority, tax assessment site, monitoring unit, detection lane (block 864).

Figure 17:
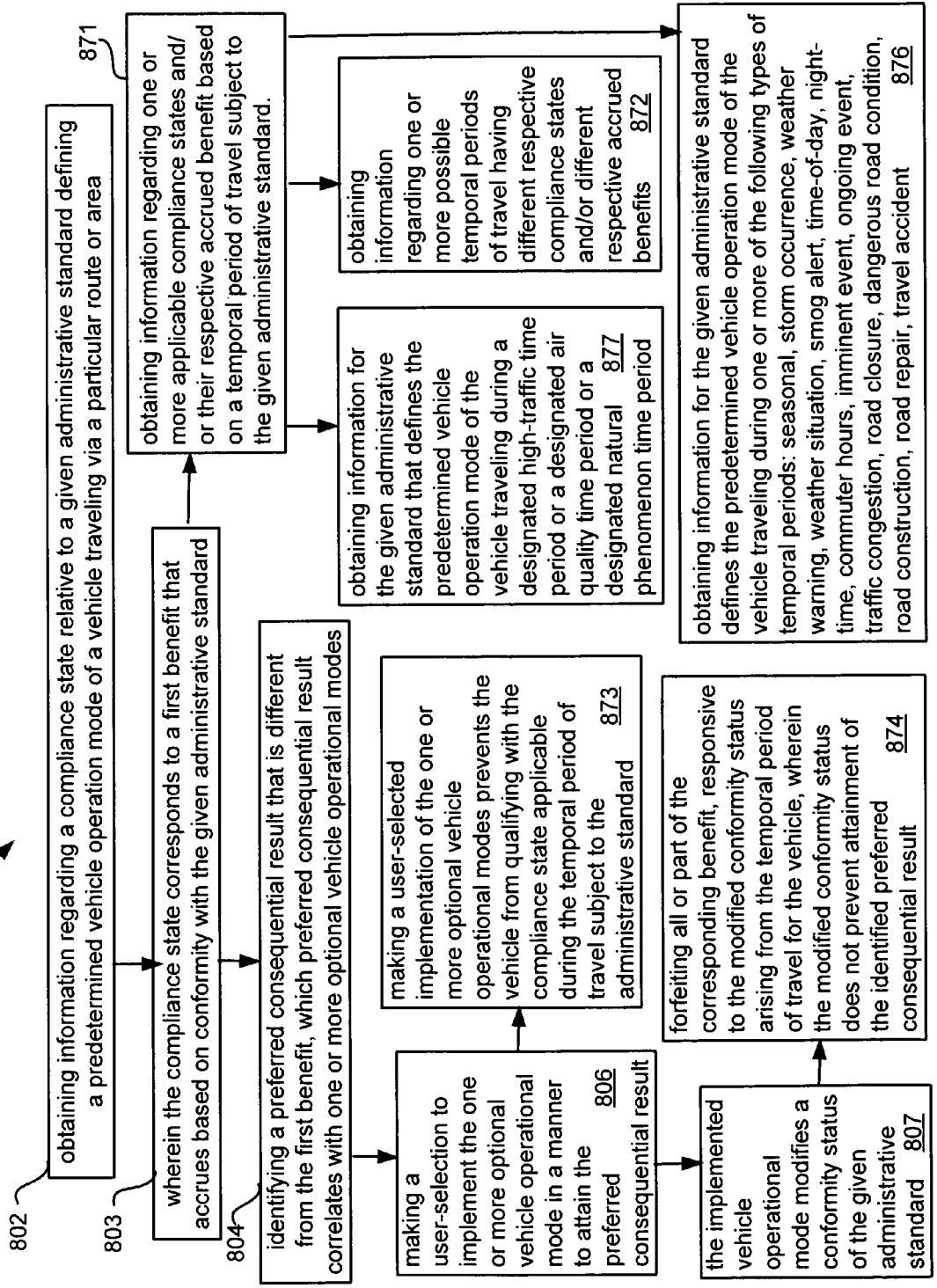

Referring to the detailed flow chart of FIG. 17, variously illustrated embodiment features 870 include previously described process aspects 802, 803, 804, 806, 807 in combination with obtaining information regarding one or more applicable compliance states and/or their respective accrued benefit based on a temporal period of travel subject to the given administrative standard (block 871). Additional related process aspects may include obtaining information regarding one or more possible temporal periods of travel having different respective compliance states and/or different respective accrued benefits (block 872). Other possible implementation features may include making a user-selected implementation of the one or more optional vehicle operational modes which prevents the vehicle from qualifying with the compliance state applicable during the temporal period of travel subject to the administrative standard (block 873).

Additional possible process aspects depicted in FIG. 17 may include forfeiting all or part of the corresponding benefit responsive to the modified conformity status arising from the temporal period of travel for the vehicle, wherein the modified conformity status does not prevent attainment of the identified preferred consequential result (block 874). Some implementations may include obtaining information for the given administrative standard that defines the predetermined vehicle operation mode of the vehicle traveling during one or more of the following types of temporal periods: seasonal, storm occurrence, weather warning, weather situation, smog alert, time-of-day, night-time, commuter hours, imminent event, ongoing event, traffic congestion, road closure, dangerous road condition, road construction, road repair, travel accident (block 876).

Another exemplary process feature may include obtaining information for the given administrative standard that defines the predetermined vehicle operation mode of the vehicle traveling during the temporal time period that includes a designated high-traffic time period or a designated air quality time period or a designated natural phenomenon time period (block 877).

Figure 18:
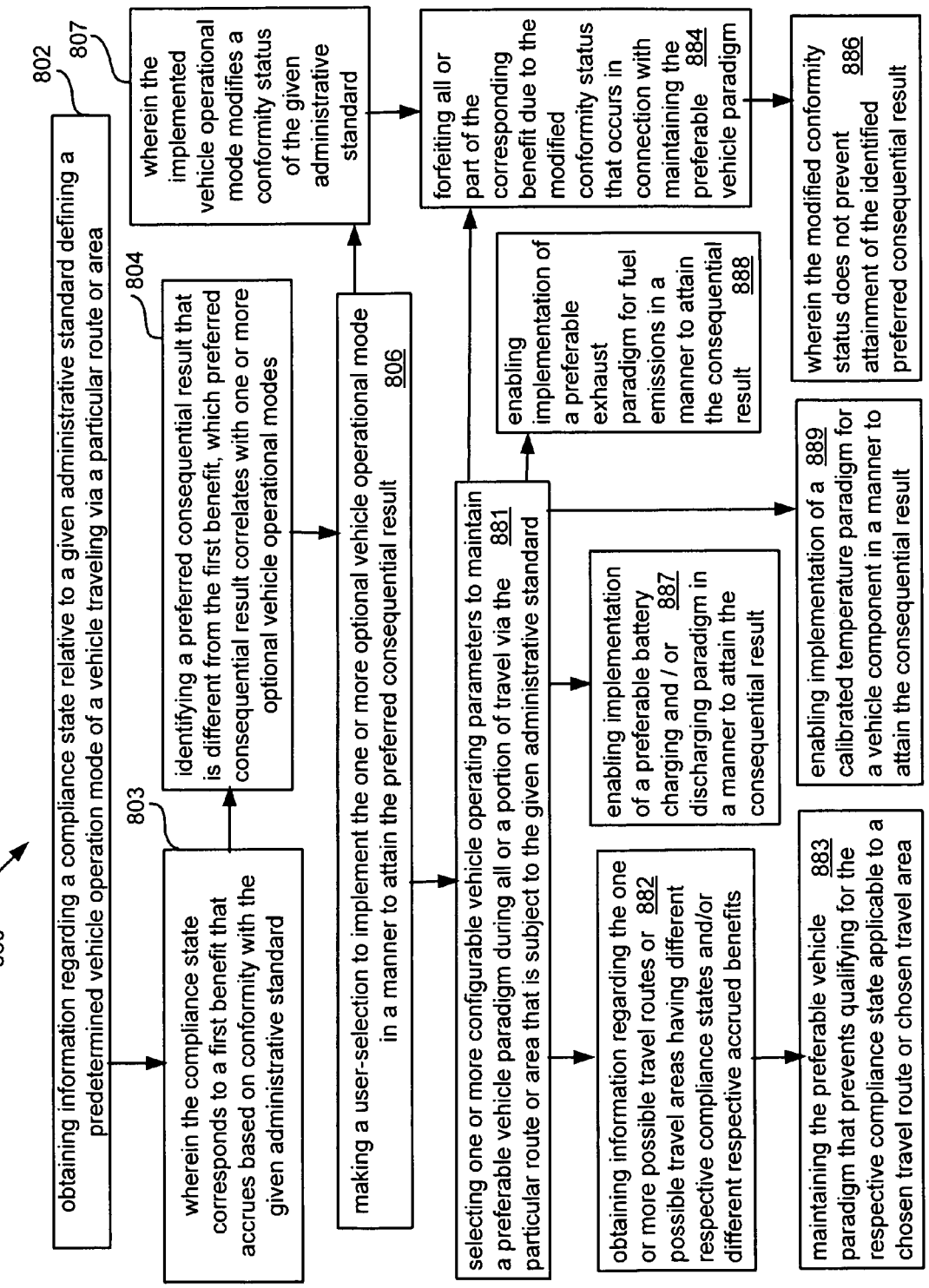

The detailed flow chart of FIG. 18 illustrates further possible process aspects 880 including previously described components 802, 803, 804, 806, 807 in combination with selecting one or more configurable vehicle operating parameters to maintain a preferable vehicle paradigm during all or a portion of travel via the particular route or area that is subject to the given administrative standard (block 881). Additional aspects may include obtaining information regarding the one or more possible travel routes or possible travel areas having different respective compliance states and/or different respective accrued benefits (block 882).

Additional possible aspects related to the preferable vehicle paradigm may include maintaining the preferable vehicle paradigm that prevents qualifying for the respective compliance state applicable to a chosen travel route or chosen travel area (block 883), and may further include forfeiting all or part of the corresponding benefit due to the modified conformity status that occurs in connection with maintaining the preferable vehicle paradigm (block 884). In some instances the modified conformity status caused by the preferable vehicle paradigm does not prevent attainment of the identified preferred consequential result (block 886).

As further depicted in FIG. 18, an exemplary process may include enabling implementation of a preferable battery charging/discharging paradigm in a manner to attain the consequential result (block 887), and may further include enabling implementation of a preferable exhaust paradigm for fuel emissions in a manner to attain the consequential result (block 888). Another possible process feature may include enabling implementation of a calibrated temperature paradigm for a vehicle component in a manner to attain the consequential result (block 889).

Figure 19:
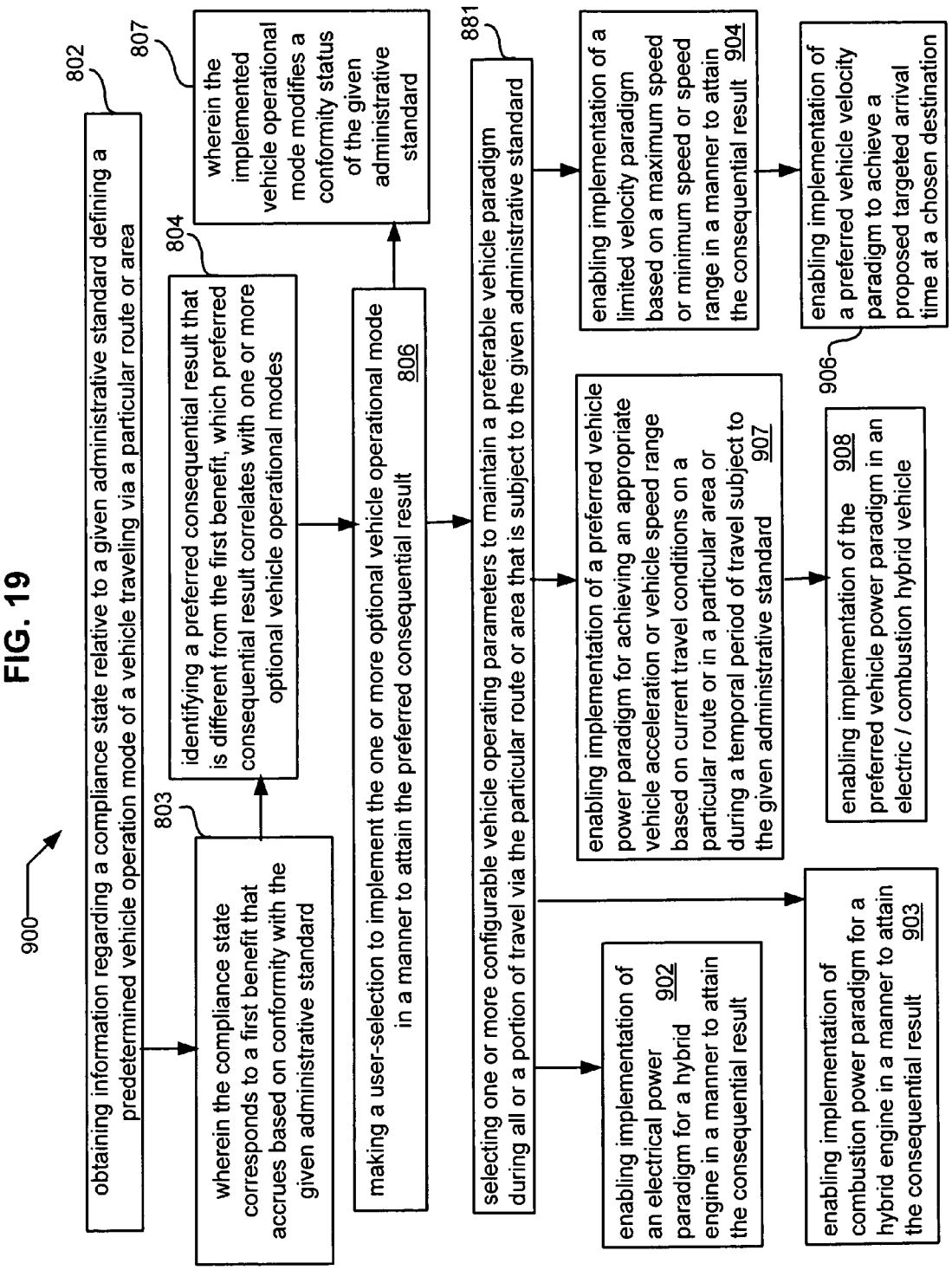

Referring to FIG. 19, additional exemplary process features 900 may include previously described operations 802, 803, 804, 806, 807, 881 along with enabling implementation of an electrical power paradigm for a hybrid engine in a manner to attain the consequential result (block 902). A further related process feature may include enabling implementation of a combustion power paradigm for a hybrid engine in a manner to attain the consequential result (block 903).

Other possible process aspects depicted in FIG. 19 may include enabling implementation of a limited velocity paradigm based on a maximum speed or minimum speed or speed range in a manner to attain the consequential result (block 904). Additional aspects may include enabling implementation of a preferred vehicle velocity paradigm to achieve a proposed targeted arrival time at a chosen destination (block 906). A further exemplary aspect may include enabling implementation of a preferred vehicle power paradigm for achieving an appropriate vehicle acceleration or vehicle speed range based on current travel conditions on a particular route or in a particular area or during a temporal period of travel subject to the given administrative standard (block 907).

Some exemplary process embodiments may also enabling implementation of the preferred vehicle power paradigm in an electric/combustion hybrid vehicle (block 908).

Figure 20:
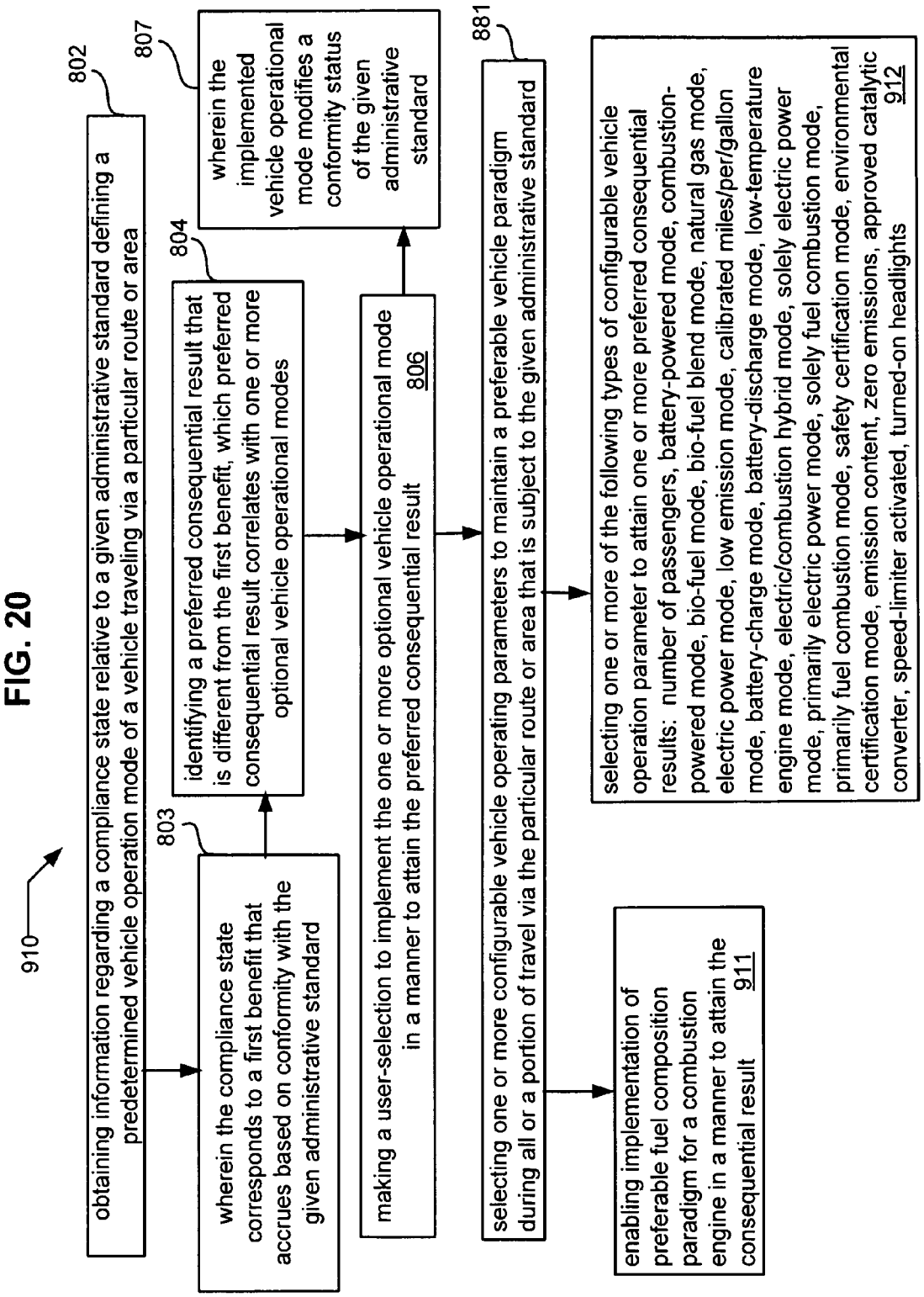

The various exemplary process embodiment features 910 illustrated in FIG. 20 may include previously described components 802, 803, 804, 806, 807, 881 as well as enabling implementation of preferable fuel composition paradigm for a combustion engine in a manner to attain the consequential result (block 911). An additional possible process feature may include selecting one or more of the following types of configurable vehicle operation parameter to attain one or more preferred consequential results: number of passengers, battery-powered mode, combustion-powered mode, bio-fuel mode, bio-fuel blend mode, natural gas mode, electric power mode, low emission mode, calibrated miles/per/gallon mode, battery-charge mode, battery-discharge mode, low-temperature engine mode, electric/combustion hybrid mode, solely electric power mode, primarily electric power mode, solely fuel combustion mode, primarily fuel combustion mode, safety certification mode, environmental certification mode, emission content, zero emissions, approved catalytic converter, speed-limiter activated, turned-on headlights (block 912).

Figure 21:
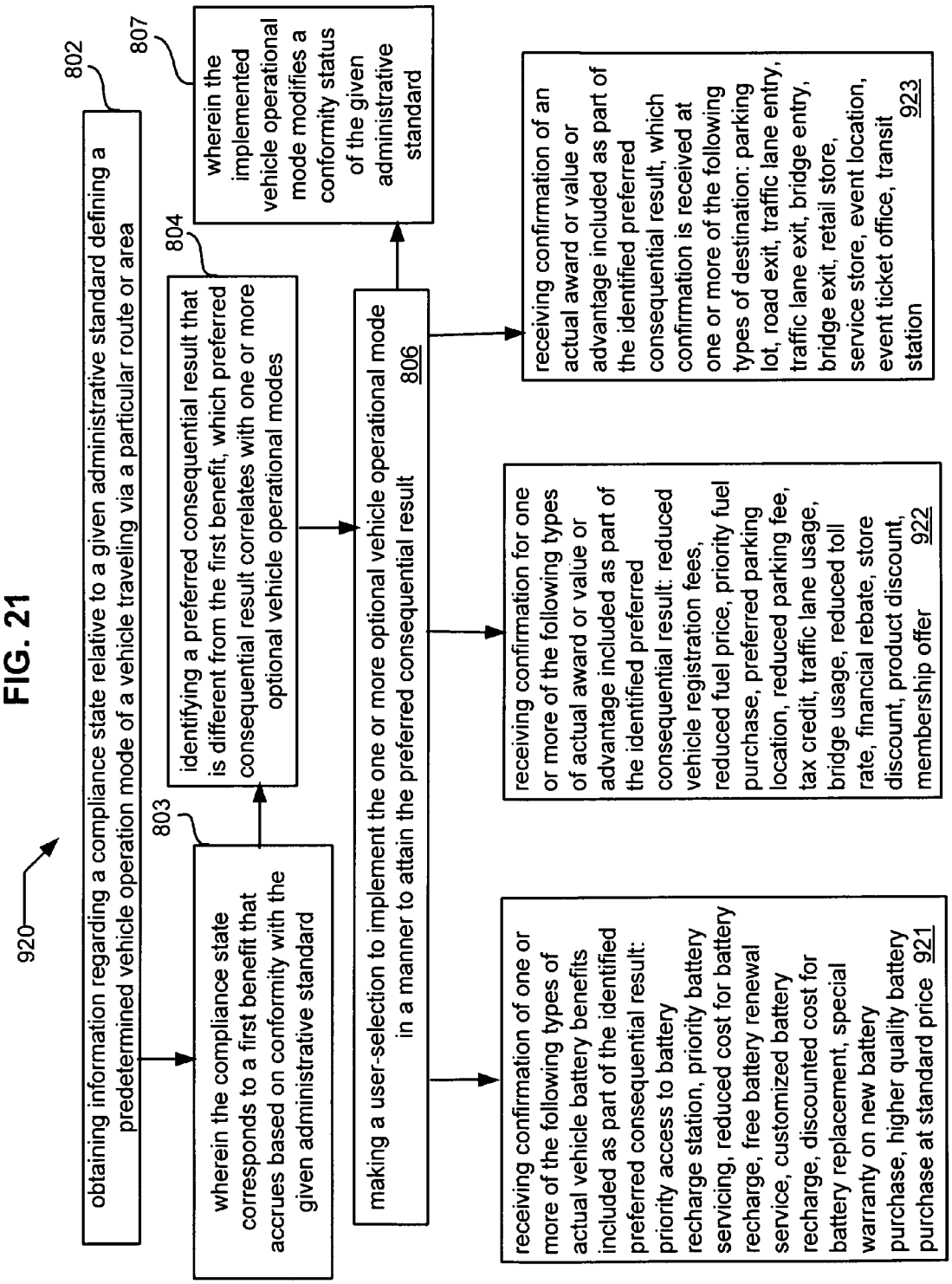

The detailed flow chart of FIG. 21 illustrates various embodiment features 920 including previously described components 802, 803, 804, 806, 807 in combination with various aspects relating to an identified preferred consequential result. For example, in some instances an exemplary process may include receiving confirmation of one or more of the following types of actual vehicle battery benefits included as part of the identified preferred consequential result: priority access to battery recharge station, priority battery servicing, reduced cost for battery recharge, free battery renewal service, customized battery recharge, discounted cost for battery replacement, special warranty on new battery purchase, higher quality battery purchase at standard price (block 921).

Additional exemplary process aspects may include receiving confirmation for one or more of the following types of actual award or value or advantage included as part of the identified preferred consequential result: reduced vehicle registration fees, reduced fuel price, priority fuel purchase, preferred parking location, reduced parking fee, tax credit, traffic lane usage, bridge usage, reduced toll rate, financial rebate, store discount, product discount, membership offer (block 922). In some instances a possible process aspect may include receiving confirmation of an actual award or value or advantage included as part of the identified preferred consequential result, which confirmation is received at one or more of the following types of destination: parking lot, road exit, traffic lane entry, traffic lane exit, bridge entry, bridge exit, retail store, service store, event location, event ticket office, transit station (block 923).

Figure 22:
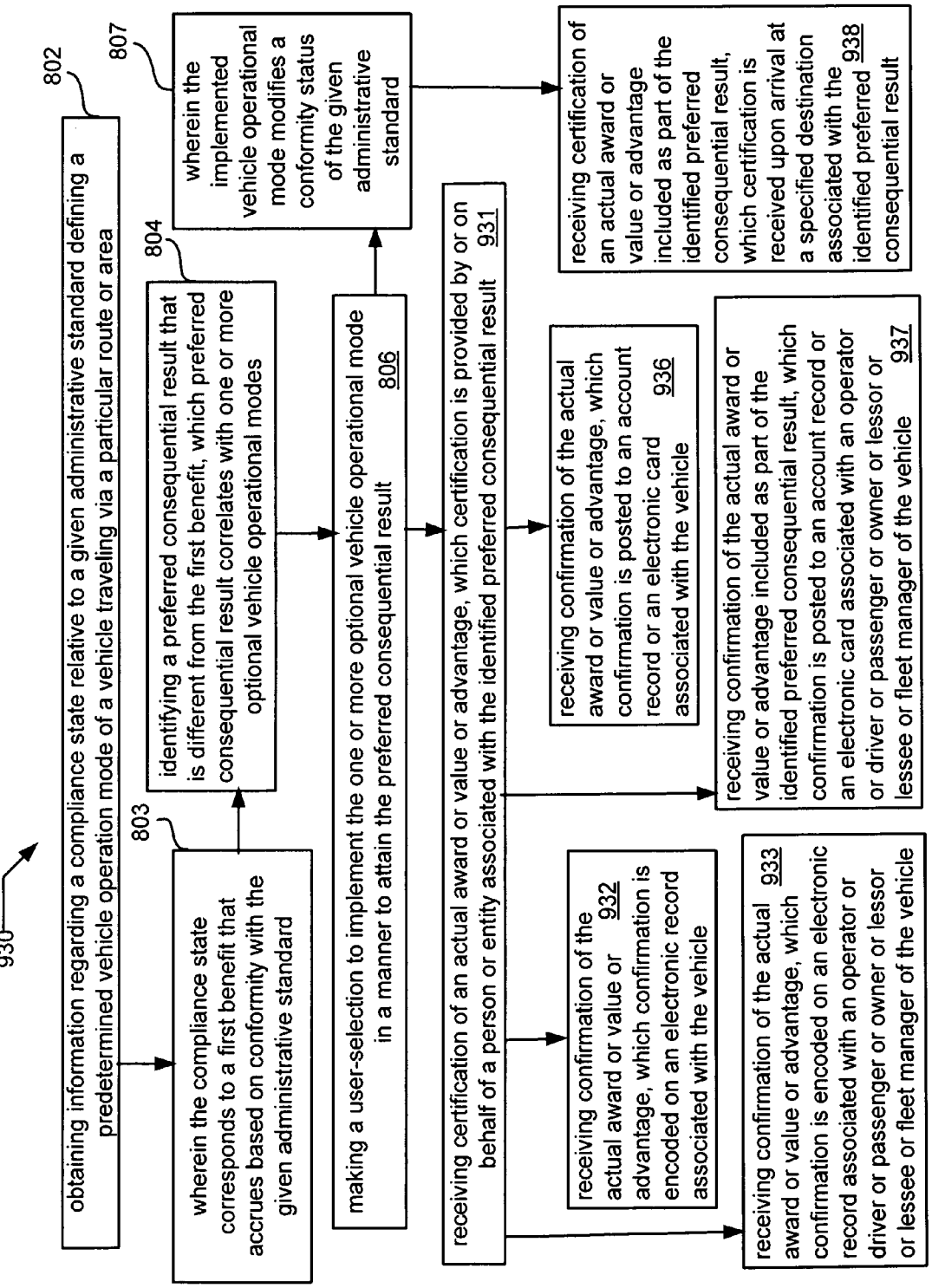

The exemplary embodiment features 930 illustrated in FIG. 22 include previously described operations 802, 803, 804, 806, 807 as well as receiving confirmation of an actual award or value or advantage, which confirmation is provided by or on behalf of a person or entity associated with the identified preferred consequential result (block 931). Additional related aspects may include receiving confirmation of an actual award or value or advantage, which confirmation is encoded on an electronic record associated with the vehicle (block 932). In some instances an exemplary process may include receiving confirmation of an actual award or value or advantage, which confirmation is encoded on an electronic record associated with an operator or driver or passenger or owner or lessor or lessee or fleet manager of the vehicle (block 933). Other possible aspects may include receiving confirmation of an actual award or value or advantage, which confirmation is posted to an account record or an electronic card associated with the vehicle (block 936).

Further possible aspect illustrated in FIG. 22 may include receiving confirmation of an actual award or value or advantage included as part of the identified preferred consequential result, wherein such confirmation posted to an account record or an electronic card associated with an operator or driver or passenger or owner or lessor or lessee or fleet manager of the vehicle (block 937). Some implementations my include receiving confirmation of an actual award or value or advantage included as part of the identified preferred consequential result, which confirmation is received upon arrival at a specified destination associated with the identified preferred consequential result (block 938).

Figure 23:
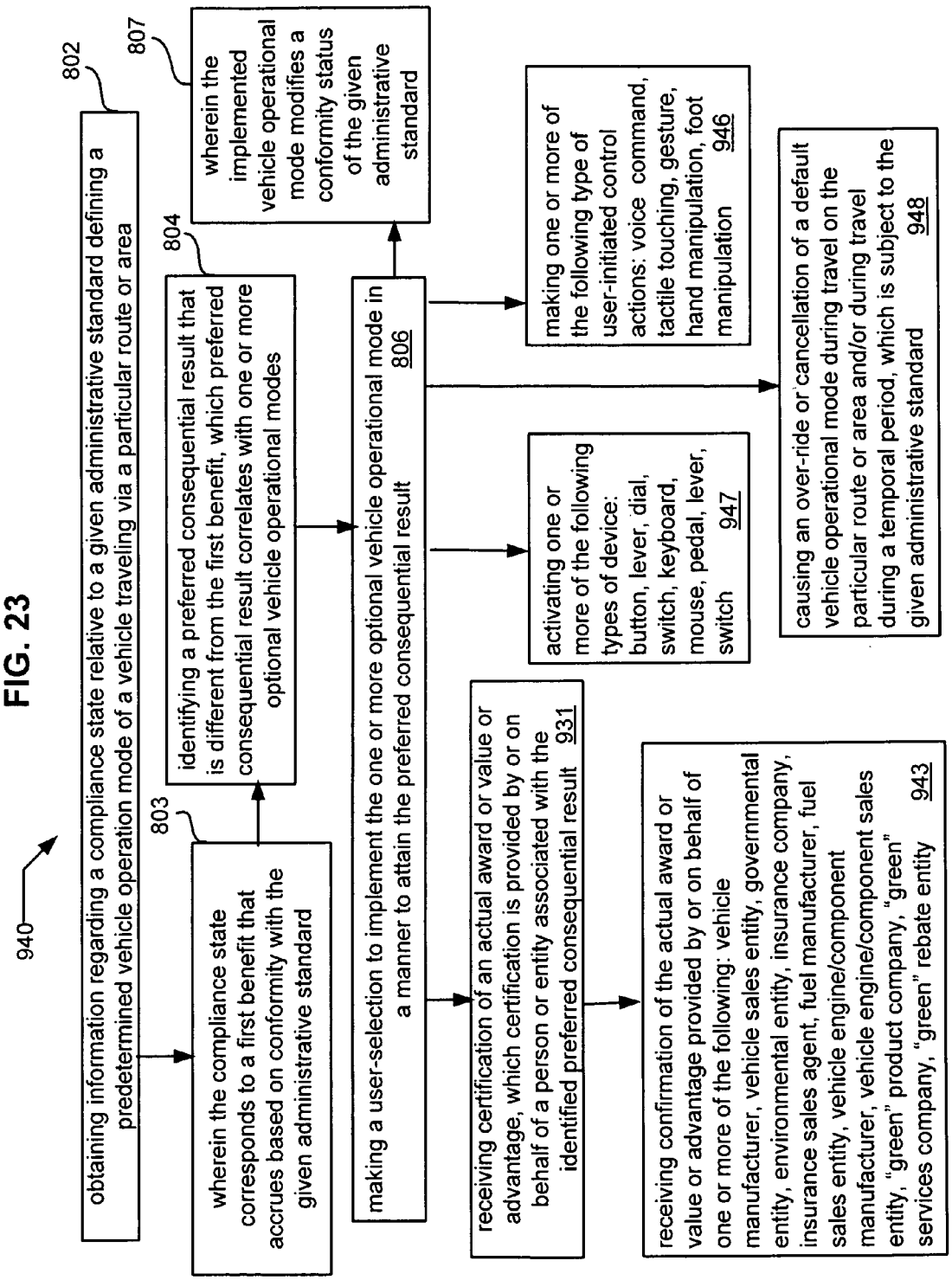

Referring to FIG. 23, various possible process features 940 are depicted including previously described components 802, 803, 804, 806, 807, 931. An additional possible process feature may include receiving confirmation of an actual award or value or advantage provided by or on behalf of one or more of the following: vehicle manufacturer, vehicle sales entity, governmental entity, environmental entity, insurance company, insurance sales agent, fuel manufacturer, fuel sales entity, vehicle engine/component manufacturer, vehicle engine/component (block 943).

Some exemplary embodiments may include making one or more of the following type of user-initiated control actions: voice command, tactile touching, gesture, hand manipulation, foot manipulation (block 946). Other possible exemplary features may include activating one or more of the following types of device: button, lever, dial, switch, keyboard, mouse, pedal, lever, switch (block 947). In some instances a process embodiment may include causing an over-ride or cancellation of a default vehicle operational mode during travel on the particular route or area and/or during travel during a temporal period, which is subject to the given administrative standard (block 948).

Figure 24:
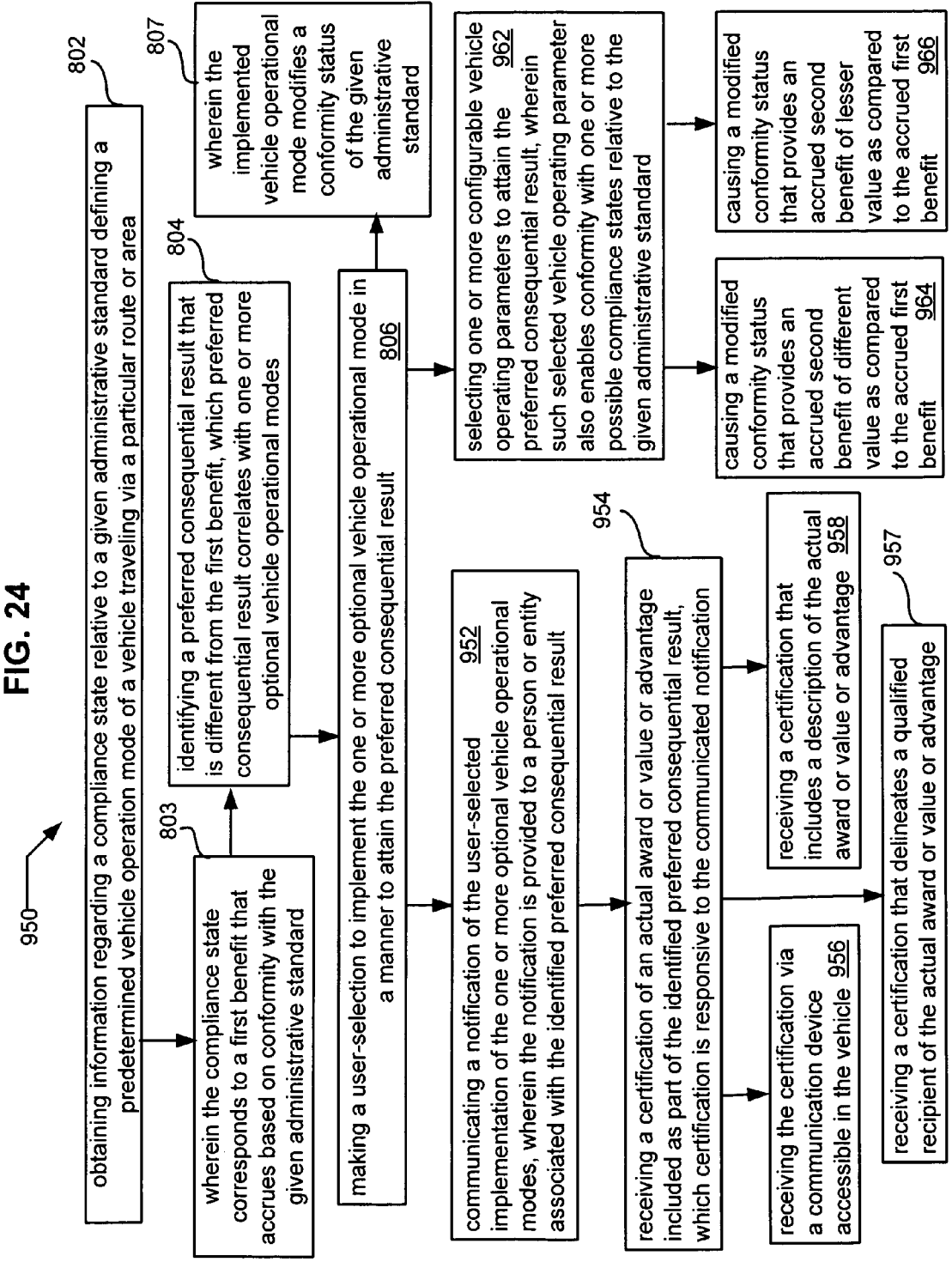

The detailed flow chart of FIG. 24 depicts various exemplary process features 950 including previously described operations 802, 803, 804, 806, 807 in combination with communicating a notification of the user-selected implementation of the one or more optional vehicle operational modes, wherein the notification is provided to a person or entity associated with the identified preferred consequential result (block 952). A further possible process features includes receiving certification of an actual award or value or advantage included as part of the identified preferred consequential result, which certification is responsive to the communicated notification (block 954).

Other possible aspects regarding certification of the identified preferred consequential result that includes an actual award or value or advantage may include receiving the certification via a communication device accessible in the vehicle (block 956), receiving the certification that delineates a qualified recipient of the award or value or advantage (block 957), and receiving the certification that includes a description of the award or value or advantage (block 958).

Also illustrated in FIG. 24 are additional exemplary process aspects including selecting one or more configurable vehicle operating parameters to attain the preferred consequential result, wherein such selected vehicle operating parameter also enables conformity with one or more possible compliance states relative to the given administrative standard (block 962). Further possible process aspects may include causing a modified conformity status that provides an accrued second benefit of different value as compared to the accrued first benefit (block 964), and causing a modified conformity status that provides an accrued second benefit of lesser value as compared to the accrued first benefit (block 966).

Figure 25:
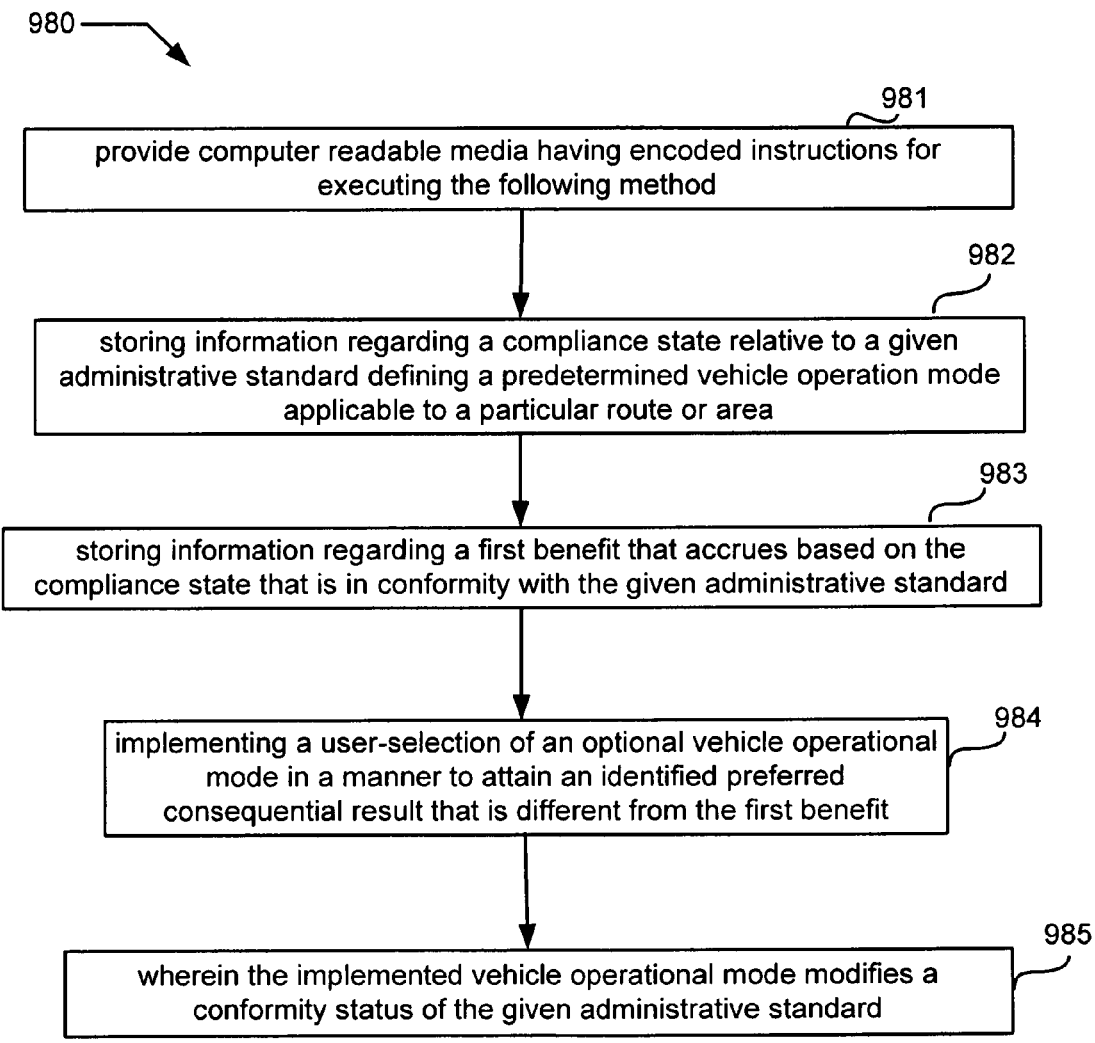
FIG. 25 is a diagrammatic flow chart for an exemplary computer program product embodiment for selective control of one or more vehicle operational modes.

FIG. 25 is a diagrammatic flow chart for an exemplary computer program product 980 that provides computer readable media having encoded instructions for executing a method (block 981) that may include storing information regarding a compliance state relative to a given administrative standard defining a predetermined vehicle operation mode applicable to a particular route or area (block 982): storing information regarding a first benefit that accrues based on the compliance state that is in conformity with the given administrative standard (block 983); and implementing a user-selection of an optional vehicle operational mode in a manner to attain an identified preferred consequential result that is different from the first benefit (block 984), wherein the implemented vehicle operational mode modifies a conformity status of the given administrative standard (block 985).

Figure 26:
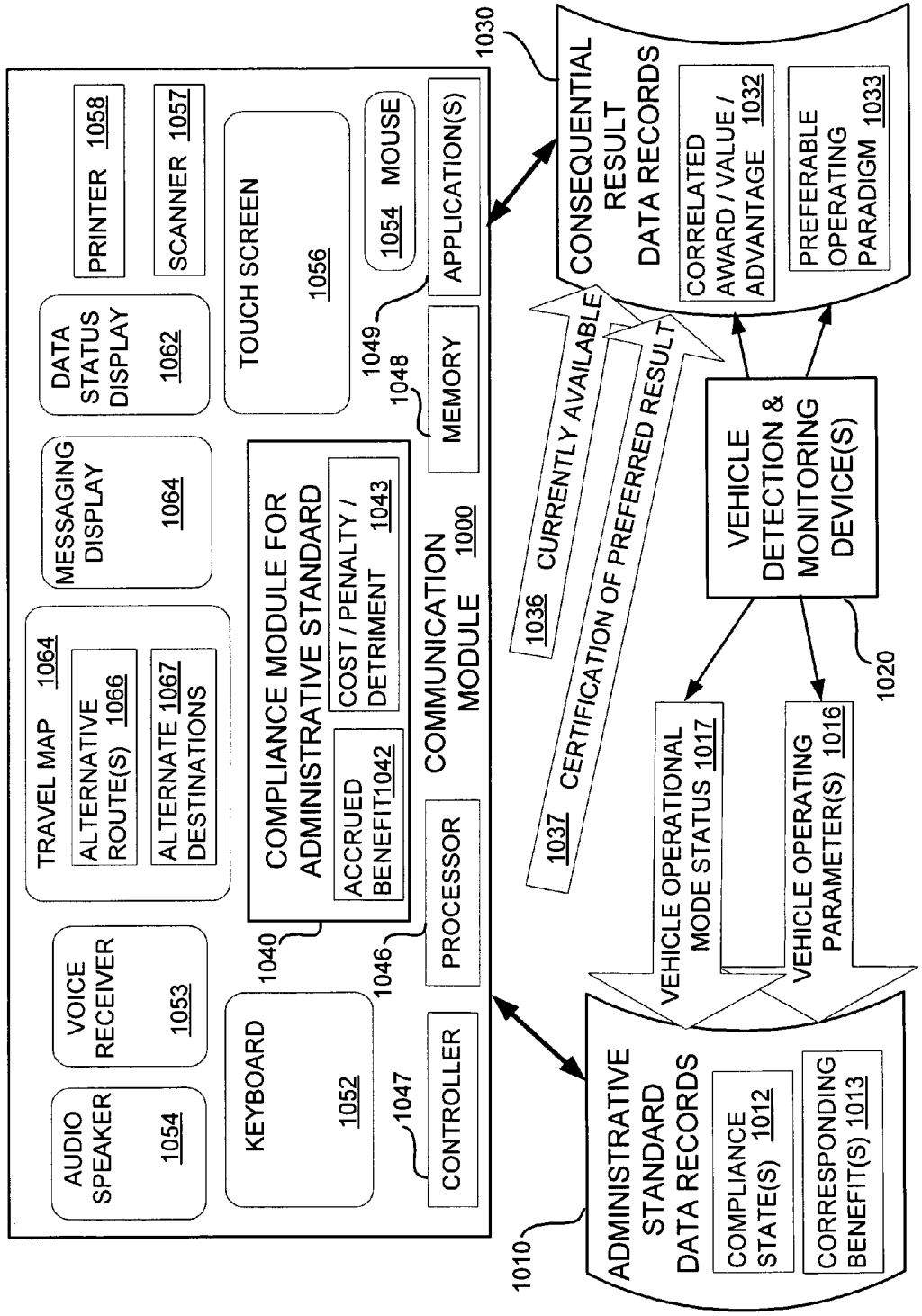
FIG. 26 is a schematic block diagram illustrating an exemplary vehicle system for varied compliance benefits.

Referring to the schematic block diagram of FIG. 26, an exemplary vehicle system for varied compliance benefits may include communication module 1000 having processor 1046, controller 1047, memory 1048, and one or more applications 1049. The communication module 1000 may be incorporated in or as part of a vehicle (e.g., see unit 52 in FIG. 1) or be available away from the vehicle (e.g., see mobile unit 56 in FIG. 1). Various types of user interfaces may be incorporated in or operably coupled with the communication module 1000 including but not limited to keyboard 1052, voice receiver 1053, audio speaker 1054, touch screen 1056, data status display 1062 and messaging display 1064 to facilitate interactive communications by various types of users associated with the vehicle such as a driver, operator, owner, passenger, lessor, lessee, or fleet manager. Additional input devices such as scanner 1057 and/or output devices such as printer 1058 may also be provided, as well as travel map 1064 linked with a GPS (e.g., see GPS 82 in FIG. 1) to provide helpful user-guidance regarding one or more alternative routes 1066 subject to various administrative standards. Additional data may be accessible regarding alternate destinations 1067 associated with possible consequential results correlated with one or more optional vehicle operational modes.

A compliance module 1040 for a given administrative vehicle standard may be located onboard the vehicle (e.g., see compliance unit 275 in FIG. 4) or remotely from the vehicle (e.g., see remote compliance unit 280 in FIG. 4), and configured with circuitry and/or application programs to process user-selected vehicle modes associated with appropriate accrued benefits 1042 as well as associated with any cost or penalty or detriment based on a compliance state of the vehicle.

In some exemplary embodiments, administrative standard data records 1010 may be located remotely from the vehicle (e.g., see remote data records 290, 310 in FIG. 4). Such administrative standard data records 1010 may include informational data regarding one or more applicable compliance states 1012 and their respective corresponding benefits 1013 regarding a travel route or travel area or temporal travel period subject to the administrative standard. Data inputs that include a vehicle operational mode status 1017 and one or more vehicle operating parameters may be provided via communication links with various types of vehicle detection and monitoring devices 1020 (e.g., see FIG. 2).

In certain exemplary embodiments, consequential result data records 1030 may be located separately from the vehicle (e.g., see external data records 340, 360 in FIG. 4), and may include informational data regarding a correlated award or value or advantage 1032 available to a qualified recipient based on notification from the vehicle detection and monitoring devices 1020. The consequential result data records 1030 may also include additional informational data received via notification from the vehicle detection and monitoring devices 1020 regarding a preferable vehicle operating paradigm. It will be understood that in some instances a user-selected optional vehicle operational mode 1017 and/or implementation of certain vehicle operating parameters 1016 may cause a deviated compliance status for a vehicle, in order to attain a preferable consequential result that is different from an accrued benefit available pursuant to a given administrative standard.

Additional types of data input to the consequential result data records 1030 may include listings of consequential results that are currently available 1036 as well as certification of preferred consequential results 1037 for qualified recipients.

Various types of transmission links (e.g., wireless, wired) may be provided between the consequential result data records 1030 and the communication module 1000. Similarly various types of transmission links (e.g., wireless, wired) may be provided between the administrative standard data records 1010 and the compliance module for administrative standard 1043, as well as between the administrative standard data records 1010 and the communication module 1000.

Figure 27:
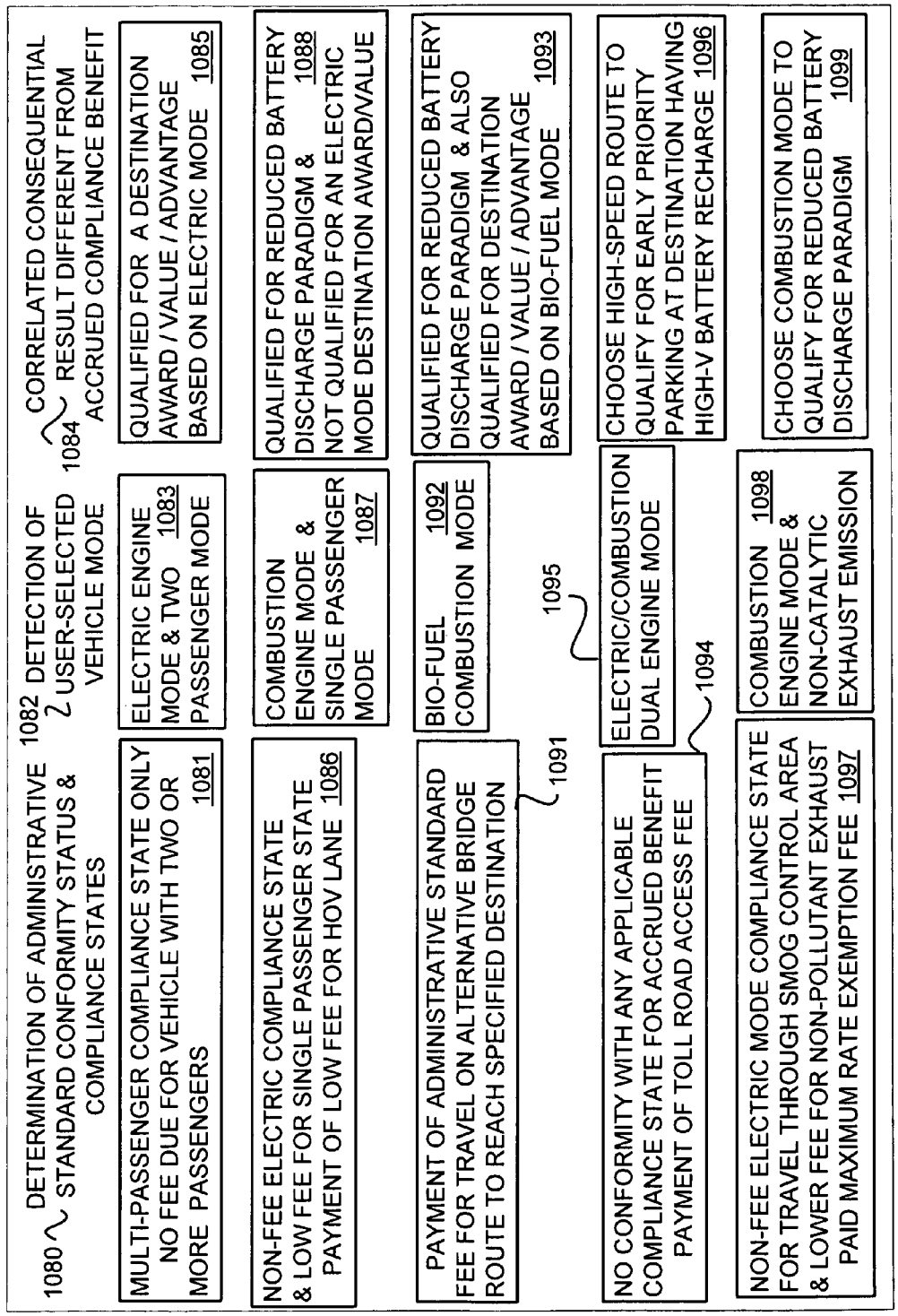
FIG. 27 is a depiction of an exemplary display of a data table for comparative vehicle modes.

The embodiment depicted in FIG. 27 illustrates an exemplary display of a processed matrix data table for comparative vehicle modes 1075. The exemplary data entries are provided for purposes of illustration only and are not intended to be limiting. For example, a central data column indicates a detection of user-selected vehicle mode 1082; a corresponding left column indicates a determination of administrative standard conformity status and compliance states 1080; and a corresponding right column indicates a correlated consequential result different from accrued compliance benefit 1084.

In one example, a particular travel route 1081 for a vehicle may include a "multi-passenger compliance state only" wherein an accrued benefit may include "no fee due for vehicle with two or more passengers" based on the following monitored and/or detected vehicle modes: electric engine mode & two passenger mode 1083. Such vehicle modes may entitle a recipient to be "qualified for a destination award or value or advantage based on electric mode" 1085.

In another example, a particular travel route 1086 for a vehicle may include a "non-fee electric compliance state" as well as a "low fee for single passenger state" wherein an accrued benefit may include "payment of low fee for HOV lane" based on the following monitored and/or detected vehicle modes: combustion engine mode & single passenger mode 1087. Such vehicle modes may entitle a recipient to be "qualified for reduced battery discharge paradigm" as well as "not qualified for an electric mode destination award or value" 1088.

As a further example, a particular travel route 1091 for a vehicle may include a "payment of administrative standard fee for travel on alternative bridge route to reach specified destination" wherein an accrued benefit may include access to such bridge route without any required vehicle mode. Nevertheless a user-selected "bio-fuel combustion mode" 1092 may entitle a recipient to be "qualified for reduced battery discharge paradigm" as well as "qualified for destination award or value or advantage based on bio-fuel mode" 1093.

As an additional example, a particular travel route 1094 for a vehicle may include "no conformity with any applicable compliance state for accrued benefit" wherein an accrued benefit of access to a toll road is based on an exemption that provides "payment of toll road access fee". Nevertheless a user-selected "electric/combustion dual engine mode" 1095 may entitle a recipient to "choose high-speed route to qualify for early priority parking at destination having high-voltage battery recharge" 1096.

As yet another example, a particular travel area 1097 for a vehicle may include a "non-fee electric mode compliance state for travel through smog control area" as well as "lower fee for non-pollutant exhaust" wherein there is no accrued benefit other than access to the area based on a "paid maximum rate exemption fee". Nevertheless a user-selected "combustion engine mode" 1098 may entitle a recipient to "choose combustion mode to qualify for reduced battery discharge paradigm" 1099 despite having a user-selected "non-catalytic exhaust emission" 1098.

Figure 28:
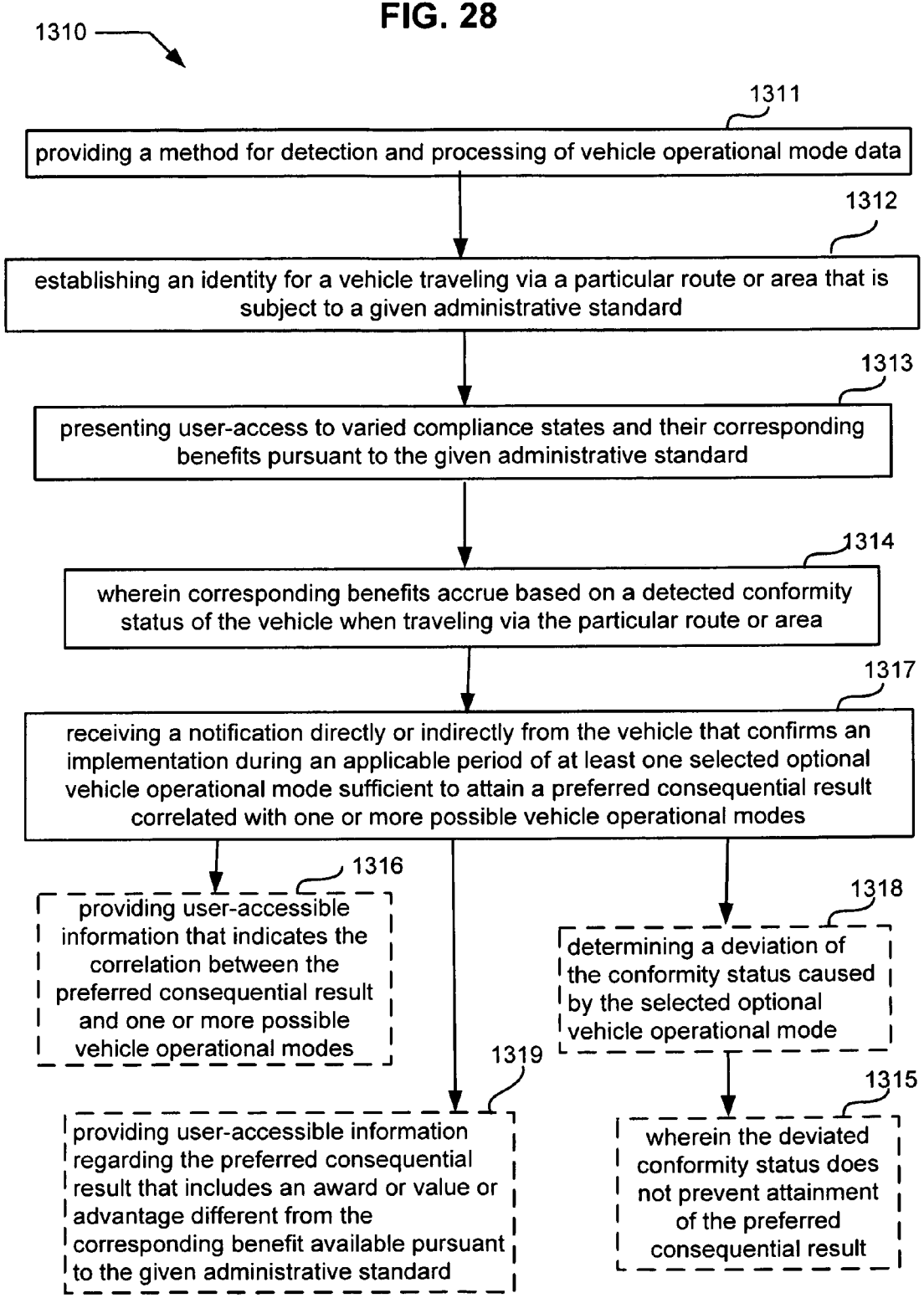
FIG. 28 is a high level flow chart for an exemplary method for managing vehicle operation mode data.

Referring to the high level flow chart of FIG. 28, an exemplary process embodiment may provide a method for detection and processing of vehicle operation mode data (block 1311), including establishing an identity for a vehicle traveling via a particular route or area that is subject to a given administrative standard (block 1312), and presenting user-access to varied compliance states and their corresponding benefits pursuant to the given administrative standard (block 1313), wherein the corresponding benefits accrue to a qualified recipient based on a detected conformity status of the vehicle when traveling via the particular route or area (block 1314). An additional aspect may include receiving a notification directly or indirectly from the vehicle that confirms an implementation during an applicable period of at least one selected optional vehicle operational mode sufficient to attain the preferred consequential result correlated with one or more possible vehicle operational modes (block 1317).

Other possible process features may include providing user-accessible information that indicates the correlation between the preferred consequential result and one or more possible vehicle operational modes (block 1316), and determining a deviation of the conformity status caused by the selected optional vehicle operational mode (block 1318), wherein the deviated conformity status does not prevent attainment of the preferred consequential result (bloc 1315).

In some instances another process aspect may include providing user-accessible information regarding the preferred consequential result that includes an award or value or advantage different from the corresponding benefit available pursuant to the given administrative standard (block 1319).

Figure 29:
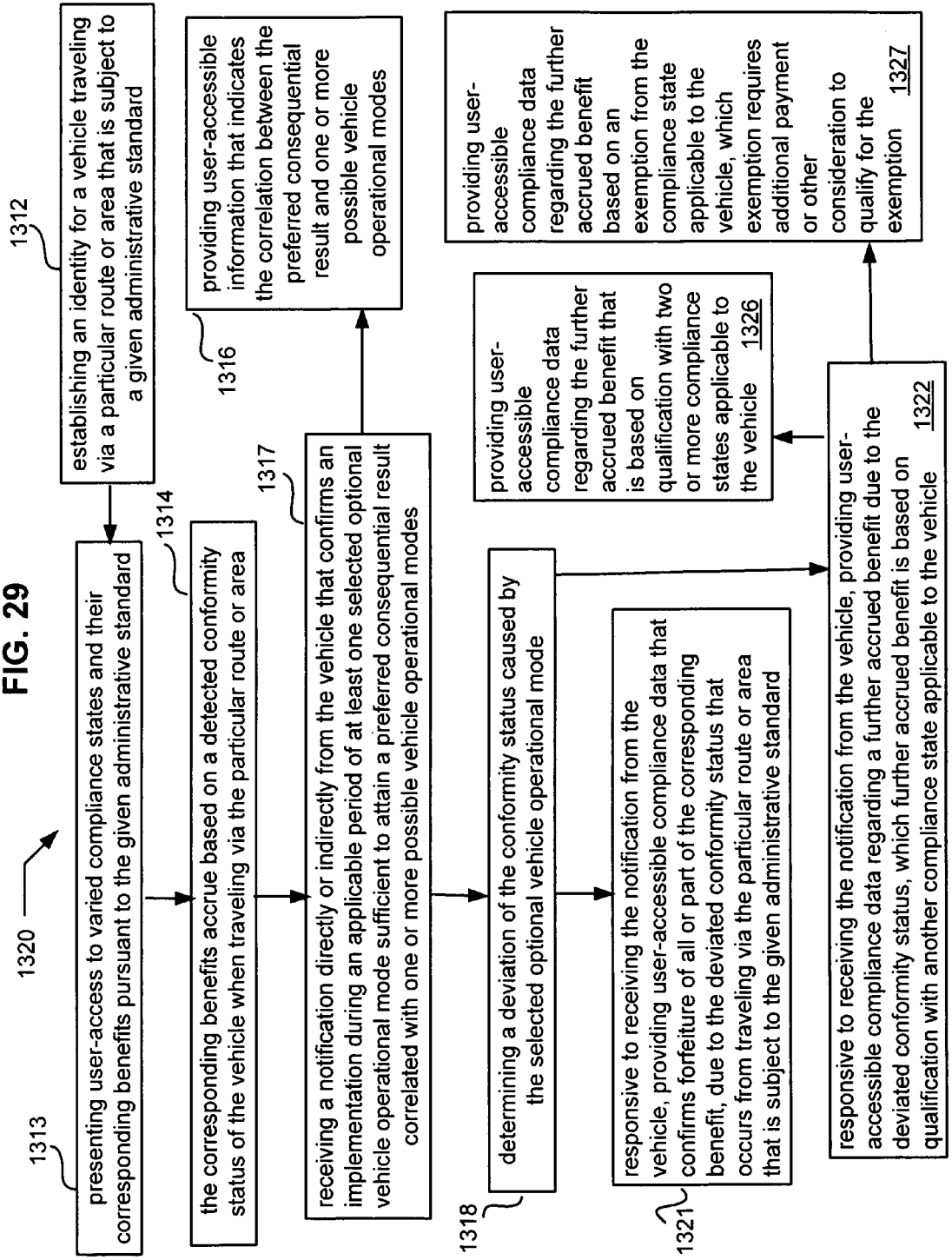
FIGS. 29-45 are more detailed flow charts illustrating additional exemplary process features that may be incorporated in vehicle management system embodiments.

Additional exemplary embodiment aspects 1320 are illustrated in the flow chart of FIG. 29 including previously described operations 1312, 1313, 1314, 1316, 1317, 1318 as well further possible features such as responsive to receiving the notification from the vehicle, providing a remote data record including user-accessible information that confirms forfeiture of all or part of the corresponding benefit, due to the deviated conformity status that occurs from traveling via the particular route or area that is subject to the given administrative standard (block 1321). Other possible process aspects may include responsive to receiving the notification from the vehicle, providing user-accessible compliance data regarding a further accrued benefit due to the deviated conformity status, which further accrued benefit is based on qualification with another compliance state applicable to the vehicle (block 1322).

Other exemplary process features may include providing the user-accessible compliance data regarding the further accrued benefit that is based on qualification with two or more compliance states applicable to the vehicle (block 1326); and may further include providing user-accessible compliance data regarding the further accrued benefit based on an exemption from the compliance state applicable to the vehicle, which exemption requires additional payment or other consideration to qualify for the exemption (block 1327).

Figure 30:
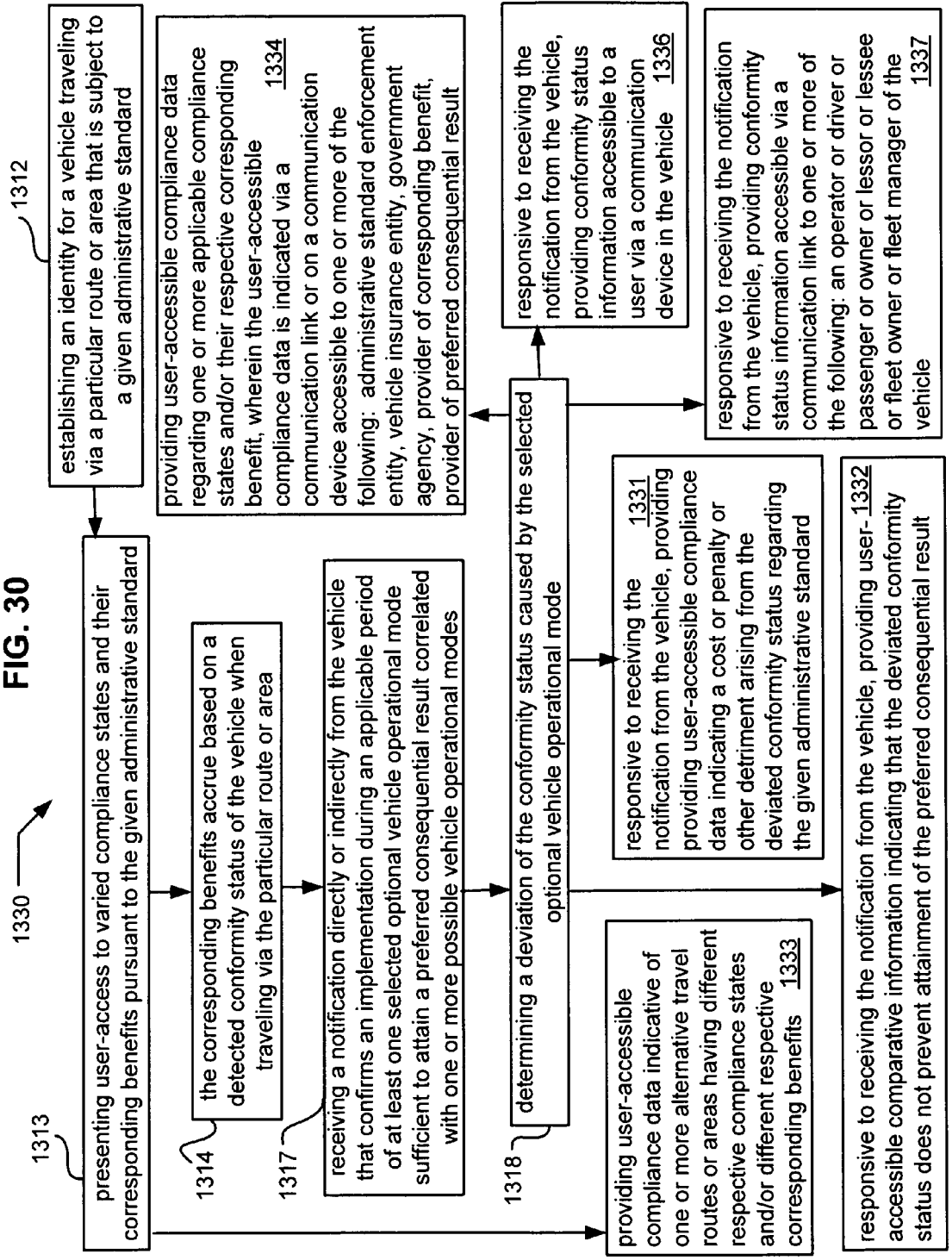

Referring to FIG. 30, some exemplary embodiment features 1330 may include previously described aspects 1312, 1313, 1314, 1317, 1318 in combination with providing user-accessible compliance data indicative of one or more alternative travel routes or areas having different respective compliance states and/or different respective corresponding benefits (block 1333). Other possible aspects may include responsive to receiving the notification from the vehicle, providing user-accessible compliance data indicating a cost or penalty or other detriment arising from the deviated conformity status regarding the given administrative standard (block 1331). Another exemplary feature may include responsive to receiving the notification from the vehicle, providing user-accessible comparative information indicating that the deviated conformity status does not prevent attainment of the preferred consequential result (block 1332).

Also depicted in the flow chart of FIG. 30 is a possible process aspect that includes providing user-accessible compliance data regarding one or more applicable compliance states and/or their respective corresponding benefit, wherein the user-accessible compliance data is indicated via a communication link or on a communication device accessible to one or more of the following: administrative standard enforcement entity, vehicle insurance entity, government agency, provider of corresponding benefit, provider of preferred consequential result (block 1334).

Additional possible process aspects may include responsive to receiving the notification from the vehicle, providing conformity status information accessible to a user via a communication device in the vehicle (block 1336). A further aspect may include responsive to receiving the notification from the vehicle, providing conformity status information accessible via a communication link to one or more of the following: an operator or driver or passenger or owner or lessor or lessee or fleet owner or fleet manager of the vehicle (block 1337).

Figure 31:
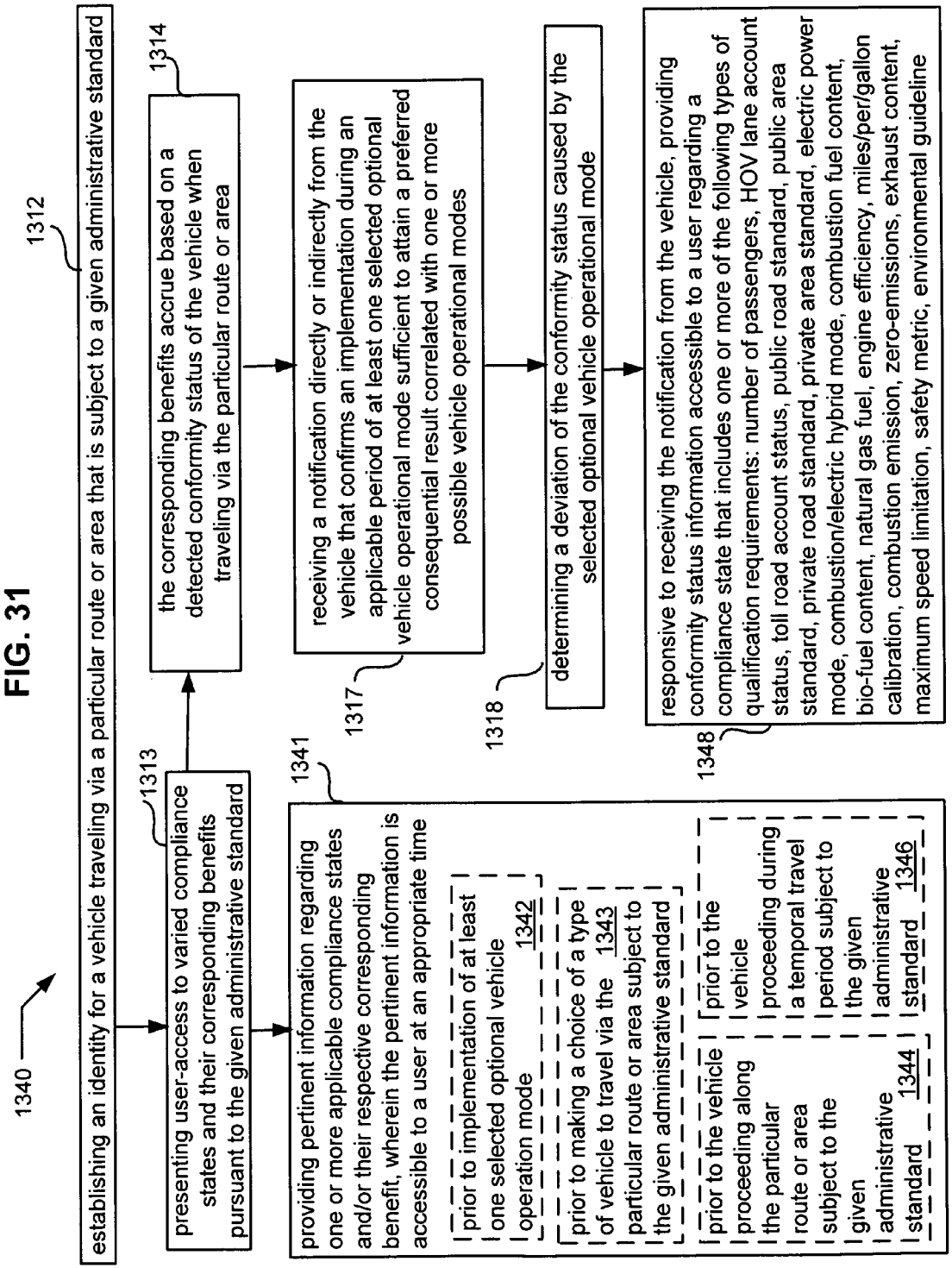

The detailed flow chart of FIG. 31 depicts various exemplary embodiment features 1340 including previously described aspects 1312, 1313, 1314, 1317, 1318 as well as a possible feature that includes responsive to receiving the notification from the vehicle, providing, providing conformity status information accessible to a user regarding a compliance state that includes one or more of the following types of qualification requirements: number of passengers, HOV lane account status, toll road account status, public road standard, public area standard, private road standard, private area standard, electric power mode, combustion/electric hybrid mode, combustion fuel content, bio-fuel content, natural gas fuel, engine efficiency, miles/per/gallon calibration, combustion emission, zero-emissions, exhaust content, maximum speed limitation, safety metric, environment guideline (block 1348).

Some exemplary process embodiments may further provide a remote data record including pertinent information regarding one or more applicable compliance states and/or their respective corresponding benefit, wherein the pertinent information is accessible to a user at an appropriate time (block 1341). Such accessibility may, for example, be available prior to implementation of at least one selected optional vehicle operation mode (block 1342), and in some instances prior to making a choice of a type of vehicle to travel via the particular route or area subject to the given administrative standard (block 1343), or in a further instance prior to the vehicle proceeding along the particular route or area subject to the given administrative standard (block 1344), or in yet another instance prior to the vehicle proceeding during a temporal travel period subject to the given administrative standard (block 1346).

Figure 32:
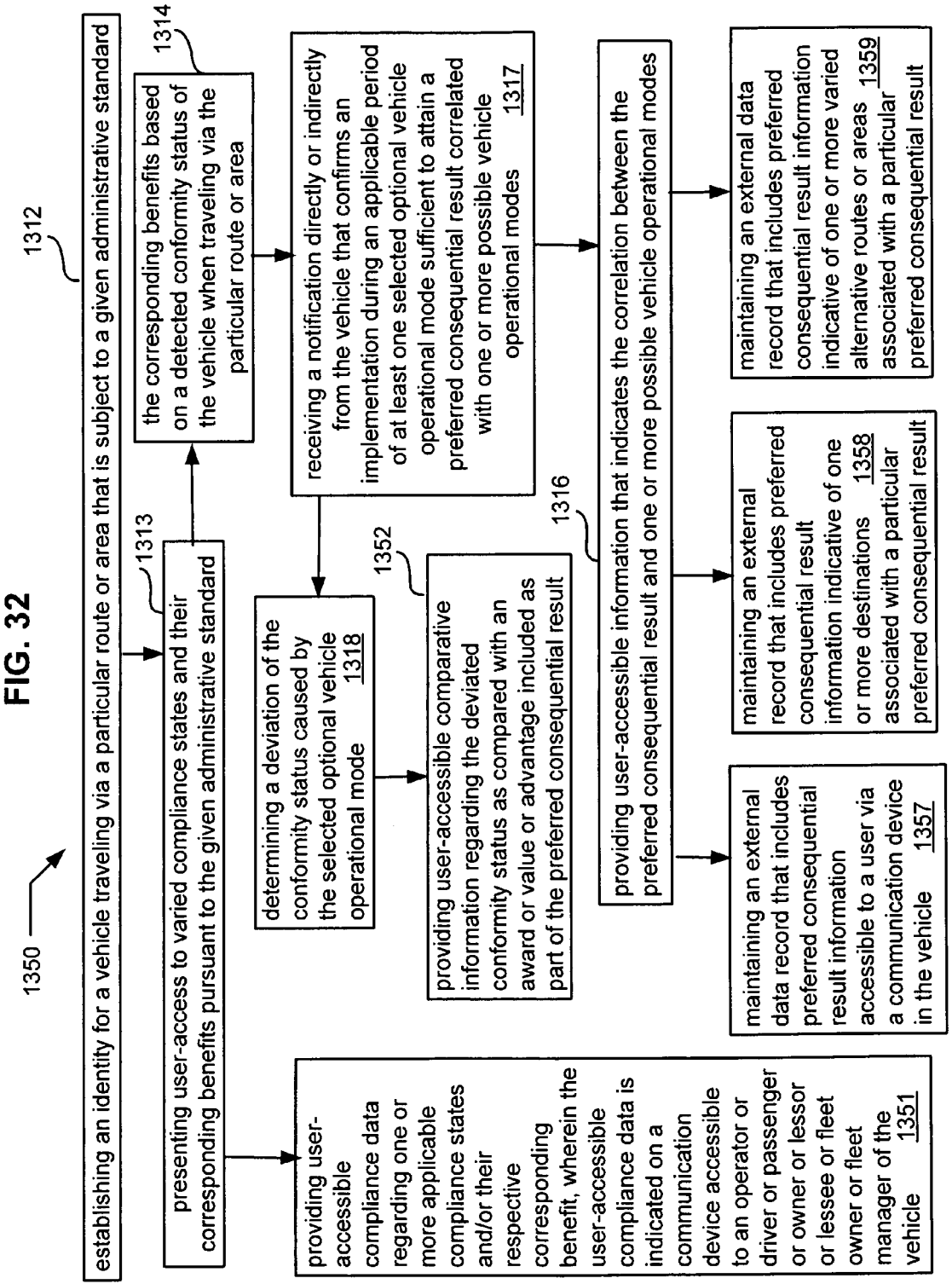

The detailed flow chart of FIG. 32 illustrates various exemplary process features 1350 that include previously described aspects 1312, 1313, 1314, 1316, 1317, 1318 in combination with providing user-accessible compliance data regarding one or more applicable compliance states and/or their respective corresponding benefit, wherein the user-accessible compliance data is indicated on a communication device accessible to an operator or driver or passenger or owner or lessor or lessee or fleet owner or fleet manager of the vehicle (block 1351). Another possible process feature may include providing user-accessible comparative information regarding the deviated conformity status as compared with an award or value or advantage included as part of the consequential result (block 1352).

Additional exemplary process features may include maintaining an external data record that includes preferred consequential result information accessible to a user via a communication device in the vehicle (block 1357). Additional exemplary features may include maintaining an external data record that includes preferred consequential result information indicative of one or more destinations associated with a particular preferred consequential result (block 1358); and may in some instances include maintaining an external data record that includes preferred consequential result information indicative of one or more varied alternative routes or areas associated with a particular preferred consequential result (block 1359).

Figure 33:
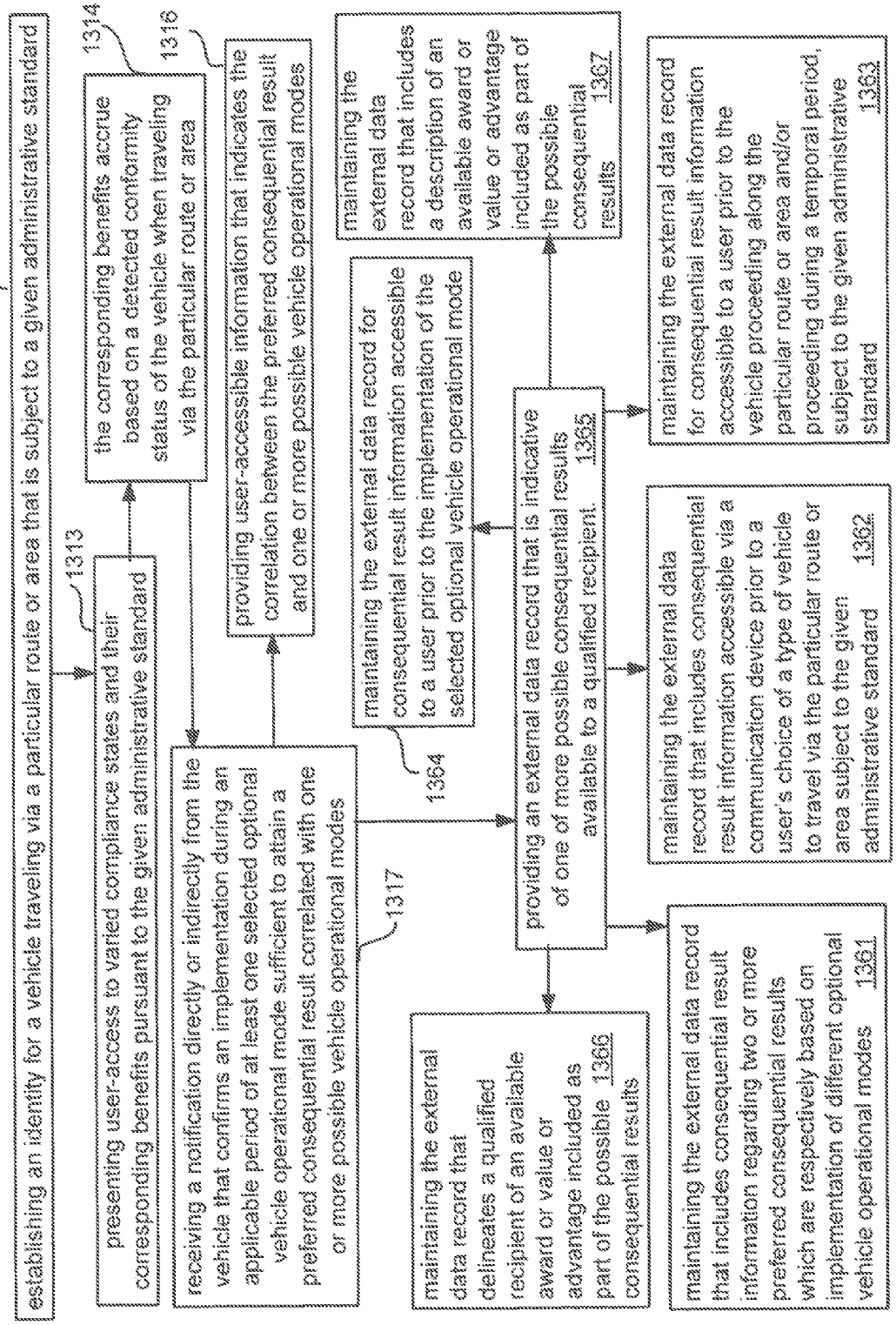

Referring to the detailed flow chart of FIG. 33, exemplary embodiment features 1360 may include previously described aspects 1312, 1313, 1314, 1316, 1317 as well as providing an external data record that is indicative of one or more possible consequential results available to a qualified recipient (block 1365). In some instances a process aspect may include maintaining an external data record for consequential result information accessible to a user prior to the implementation of the selected optional vehicle operational mode (block 1364).

Other possible process aspects may include maintaining the external data record that includes information regarding two or more preferred consequential results which are respectively based on implementation of different optional vehicle operational modes (block 1361); and possibly maintaining the external data record that includes consequential result information accessible via a communication device prior to a user's choice of a type of vehicle to travel via the particular route or area subject to the given administrative standard (block 1362).

Another possible process feature may include maintaining an external data record located separate from the vehicle, which external data record includes consequential result information accessible to a user prior to the vehicle proceeding along the particular route or area or proceeding during a temporal travel period, subject to the given administrative standard (block 1363). Some process embodiments may include, for example, maintaining the external record that delineates a qualified recipient of an available award or value or advantage included as part of the possible consequential results (block 1366). A further exemplary process feature may include maintaining the external data record that includes a description of an available award or value or advantage included as part of the possible consequential results (block 1367).

Figure 34:
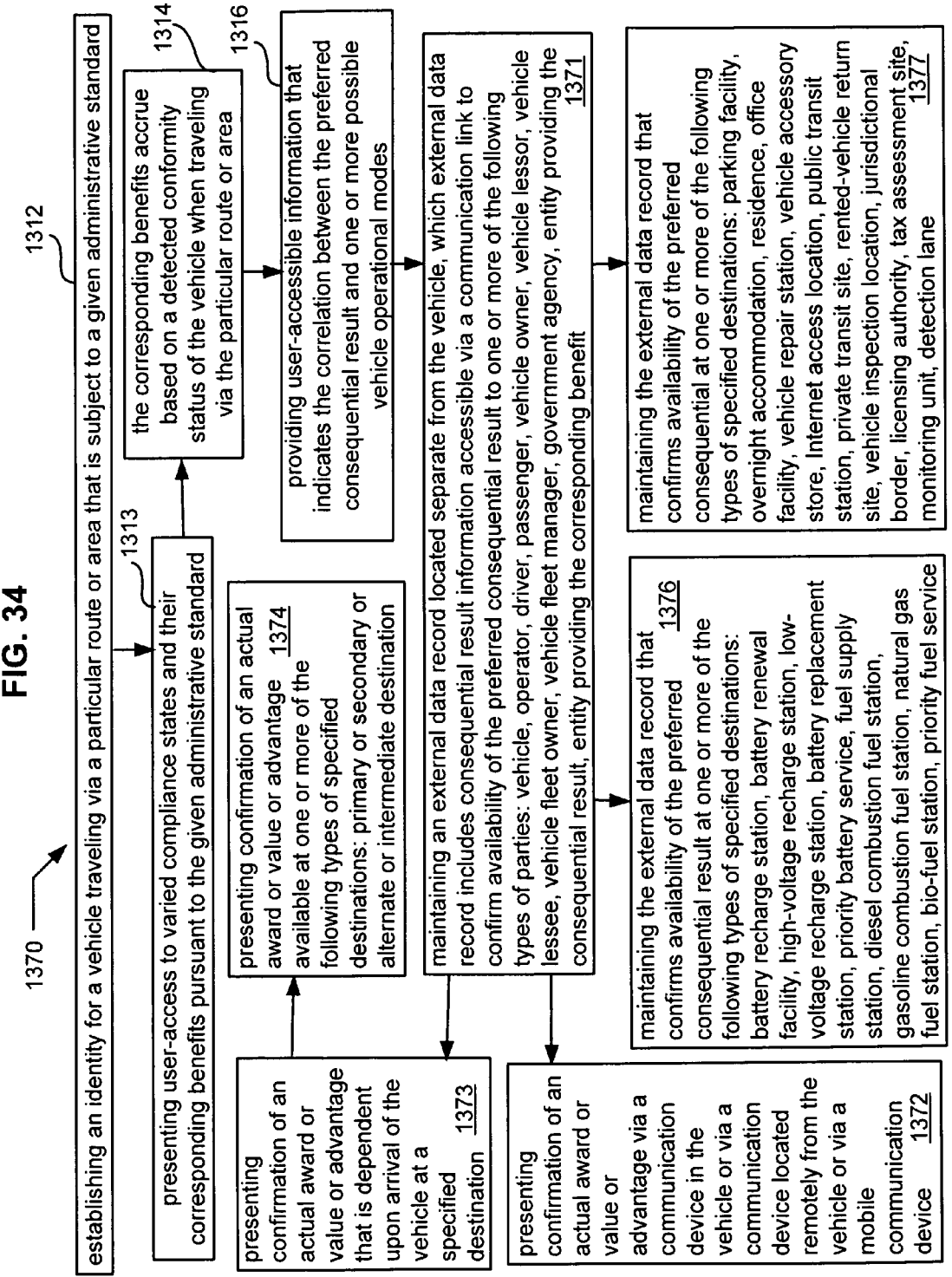

Additional exemplary embodiment features 1370 shown in FIG. 34 include previously described aspects 1312, 1313, 1314, 1316 in combination with maintaining an external data record located separate from the vehicle, which external data record includes consequential result information accessible via a communication link to confirm availability of the preferred consequential result to one or more of the following types of parties: vehicle, operator, driver, passenger, vehicle owner, vehicle lessor, vehicle lessee, vehicle fleet owner, vehicle fleet manager, government agency, entity providing the consequential result, entity providing the corresponding benefit (block 1371).

Other process features may include presenting confirmation of an actual award or value or advantage via a communication device in the vehicle or via a communication device located remotely from the vehicle or via a mobile communication device (block 1372). A further possible process feature may include presenting confirmation of an actual award or value or advantage that is dependent upon arrival of the vehicle at a specified destination (block 1373).

Further exemplary aspects may include presenting confirmation of the actual award or value or advantage available to the qualified recipient at one or more of the following types of specified destinations: primary destination, secondary destination, alternate destination, intermediate destination (block 1374). In some instances a process embodiment may include maintaining the external data record that confirms availability of the preferred consequential result at one or more of the following types of specified destinations: battery recharge station, battery renewal facility, high-voltage recharge station, low-voltage recharge station, battery replacement station, priority battery service, fuel supply station, diesel combustion fuel station, gasoline combustion fuel station, natural gas fuel station, bio-fuel station, priority fuel service (block 1376).

Yet another exemplary process feature may include maintaining the external data record that confirms availability of the preferred consequential at one or more of the following types of specified destinations: parking facility, overnight accommodation, residence, office facility, vehicle repair station, vehicle accessory store, Internet access location, public transit station, private transit site, rented-vehicle return site, vehicle inspection location, jurisdictional border, licensing authority, tax assessment site, monitoring unit, detection lane (block 1377).

Figure 35:
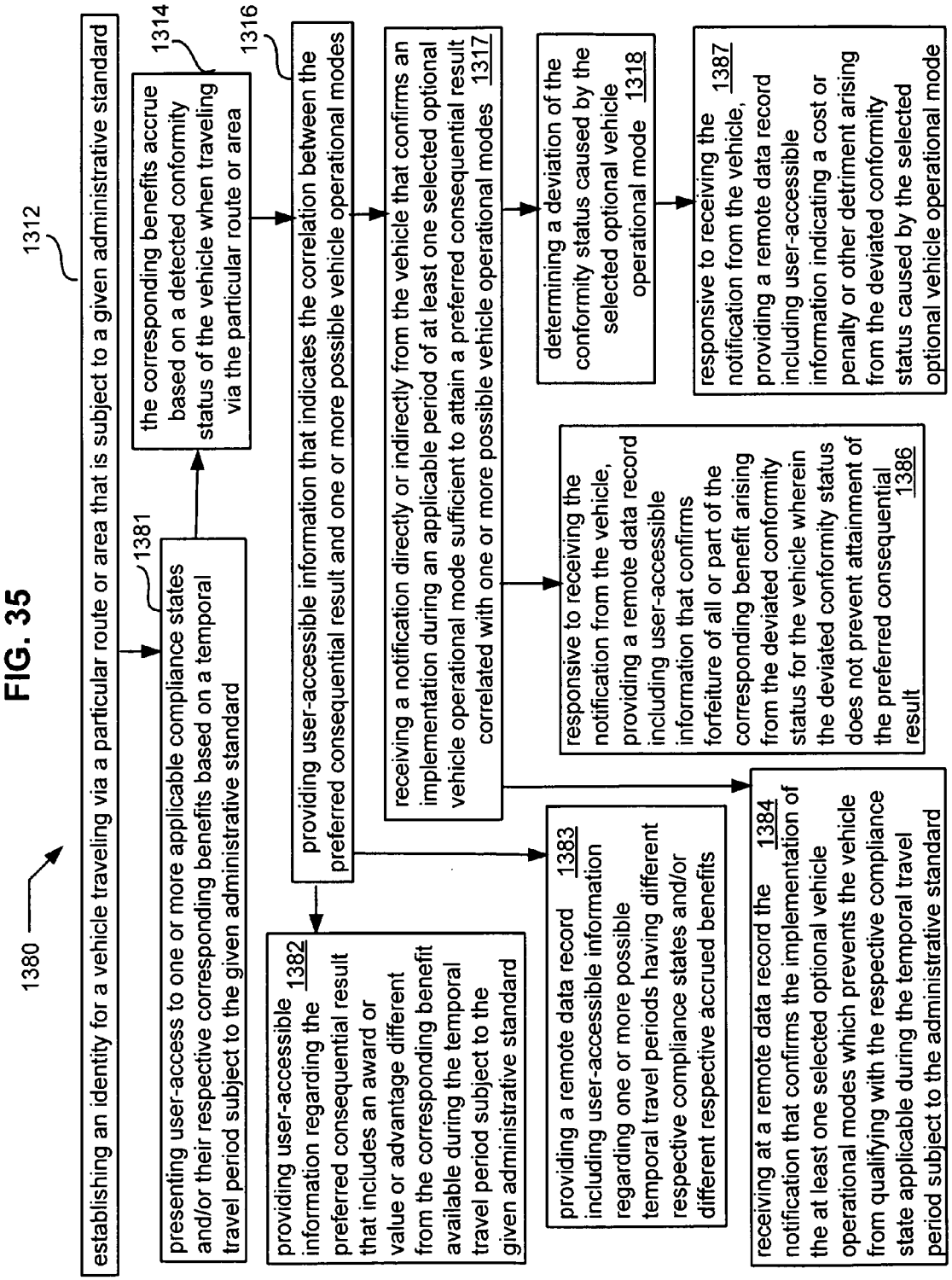

Referring to the exemplary embodiments 1380 depicted in FIG. 35, possible aspects may include previously described process features 1312, 1314, 1316, 1317, 1318 along with other aspects including presenting user-access to one or more applicable compliance states and/or their respective corresponding benefits based on a temporal travel period subject to the given administrative standard (block 1381). Related possible process aspects may include providing user-accessible information regarding the preferred consequential result that includes an award or value or advantage different from the corresponding benefit available during the temporal travel period subject to the given administrative standard (block 1382). A further possible process aspect may include providing a remote data record including user-accessible information regarding one or more possible temporal travel periods having different respective compliance states and/or different respective accrued benefits (block 1383).

Some exemplary embodiments may include receiving at a remote data record the notification that confirms the implementation of the at least one selected optional vehicle operational modes which prevents the vehicle from qualifying with the respective compliance state applicable during the temporal travel period subject to the administrative standard (block 1384). Other possible process aspects may include responsive to receiving the notification from the vehicle, providing a remote data record including user-accessible information that confirms forfeiture of all or part of the corresponding benefit arising from the deviated conformity status for the vehicle, wherein the deviated conformity status does not prevent attainment of the preferred consequential result (block 1386). A further exemplary aspect may include responsive to receiving the notification from the vehicle, providing a remote data record including user-accessible information indicating a cost or penalty or other detriment arising from the deviated conformity status caused by the selected optional vehicle operational mode (block 1387).

Figure 36:
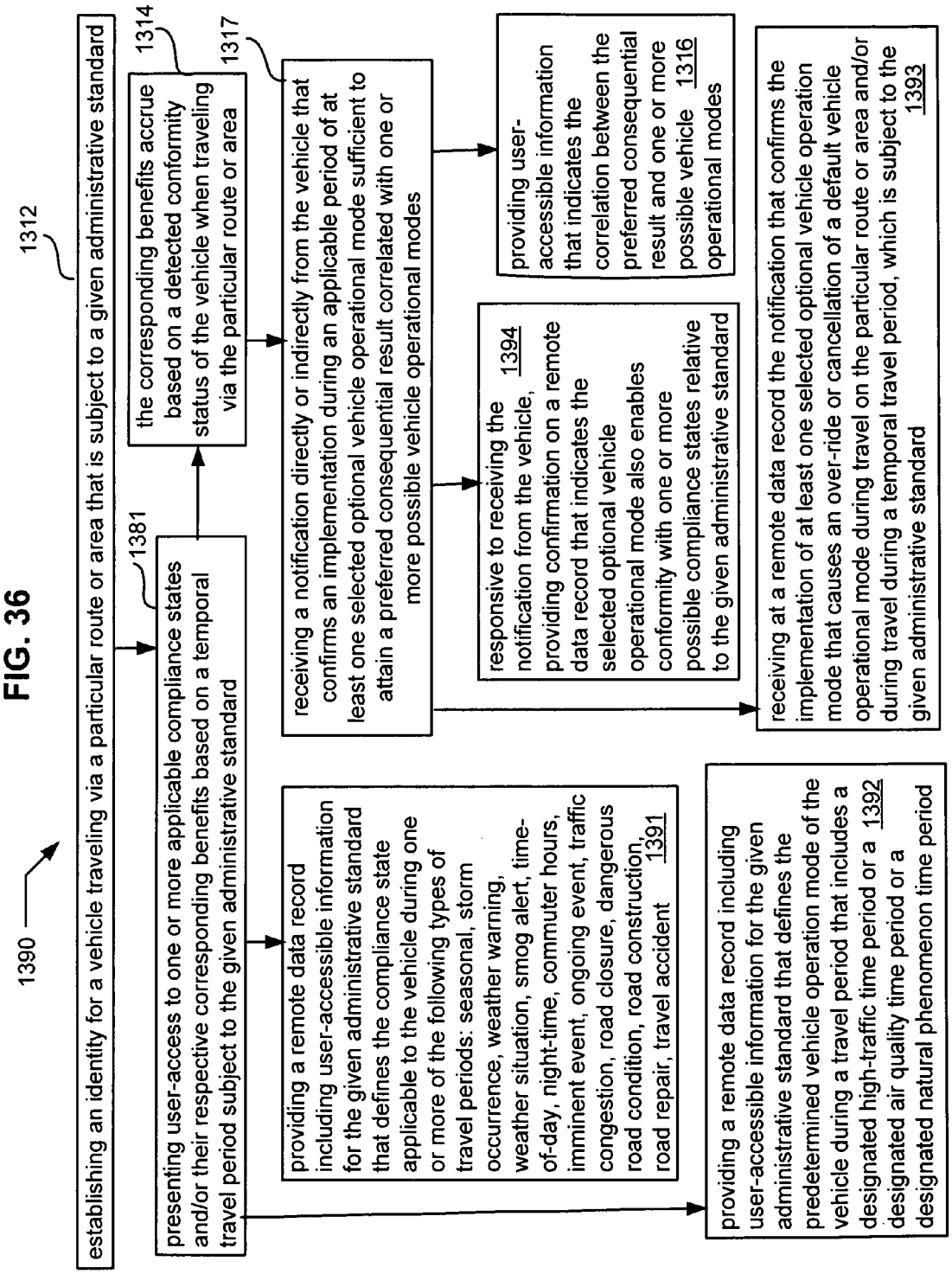

\The detailed flow chart of FIG. 36 illustrates exemplary embodiment features 1390 that include previously described process aspects 1312, 1314, 1316, 1317, 1381 along with providing a remote data record including user-accessible information for the given administrative standard that defines the compliance state applicable to the vehicle during one or more of the following types of travel periods: seasonal, storm occurrence, weather warning, weather situation, smog alert, time-of-day, night-time, commuter hours, imminent event, ongoing event, traffic congestion, road closure, dangerous road condition, road construction, road repair, travel accident (block 1391).

In some instances a further exemplary process feature may include providing a remote data record including user-accessible information for the given administrative standard that defines the predetermined vehicle operation mode of the vehicle during a travel period that includes a designated high-traffic time period or a designated air quality time period or a designated natural phenomenon time period (block 1392). Another possible process aspect may include receiving at a remote data record the notification that confirms the implementation of at least one selected optional vehicle operation mode that causes an over-ride or cancellation of a default vehicle operational mode during travel on the particular route or area and/or during a temporal travel period, which is subject to the given administrative standard (block 1393).

An additional exemplary embodiment feature may include responsive to receiving the notification from the vehicle, providing confirmation on a remote data record that indicates the selected optional vehicle operational mode also enables conformity with one or more possible compliance states relative to the given administrative standard (block 1394).

Figure 37:
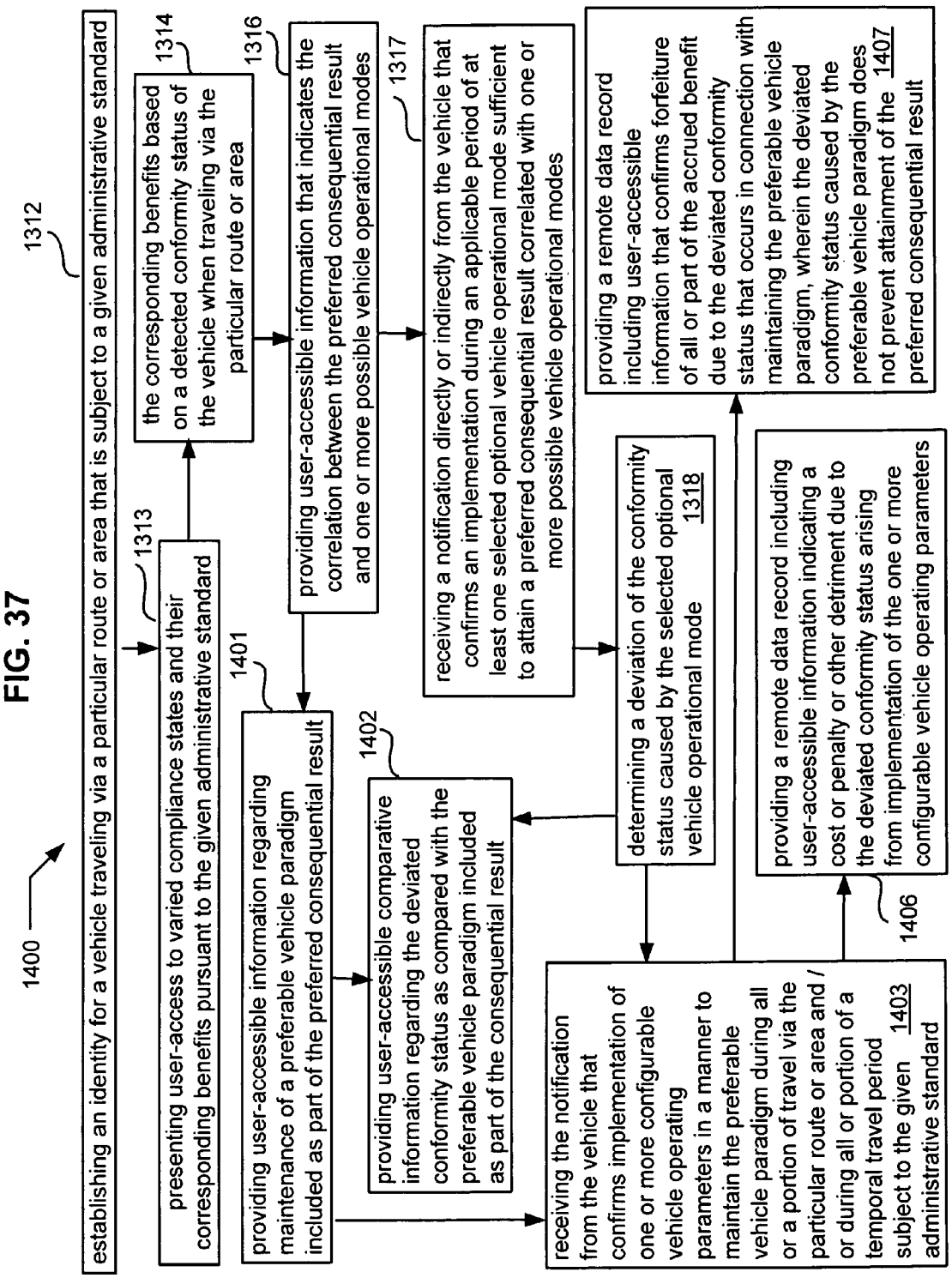

Referring to FIG. 37, various exemplary process aspects 1400 are illustrated including previously described aspects 1312, 1313, 1314, 1316, 1317 in combination with providing user-accessible information regarding the maintenance of a preferable vehicle paradigm that is included as part of the preferred consequential result (block 1401). Other possible aspects may include providing user-accessible comparative information regarding the deviated conformity status as compared with the preferable vehicle paradigm included as part of the consequential result (block 1402). Additional process features may include receiving the notification from the vehicle that confirms implementation of one or more configurable vehicle operating parameters in a manner to maintain the preferable vehicle paradigm during all or a portion of travel via the particular route or area and/or during all or portion of a temporal travel period subject to the given administrative standard (block 1403).

In some instances a further process feature may include providing a remote data record including user-accessible information indicating a cost or penalty or other detriment due to the deviated conformity status arising from implementation of the one or more configurable vehicle operating parameters (block 1406). Additional exemplary aspects may include providing a remote data record including user-accessible information that confirms forfeiture of all or part of the accrued benefit due to the deviated conformity status that occurs in connection with maintaining the preferable vehicle paradigm, wherein the deviated conformity status caused by the preferable vehicle paradigm does not prevent attainment of the preferred consequential result (block 1407).

Figure 38:
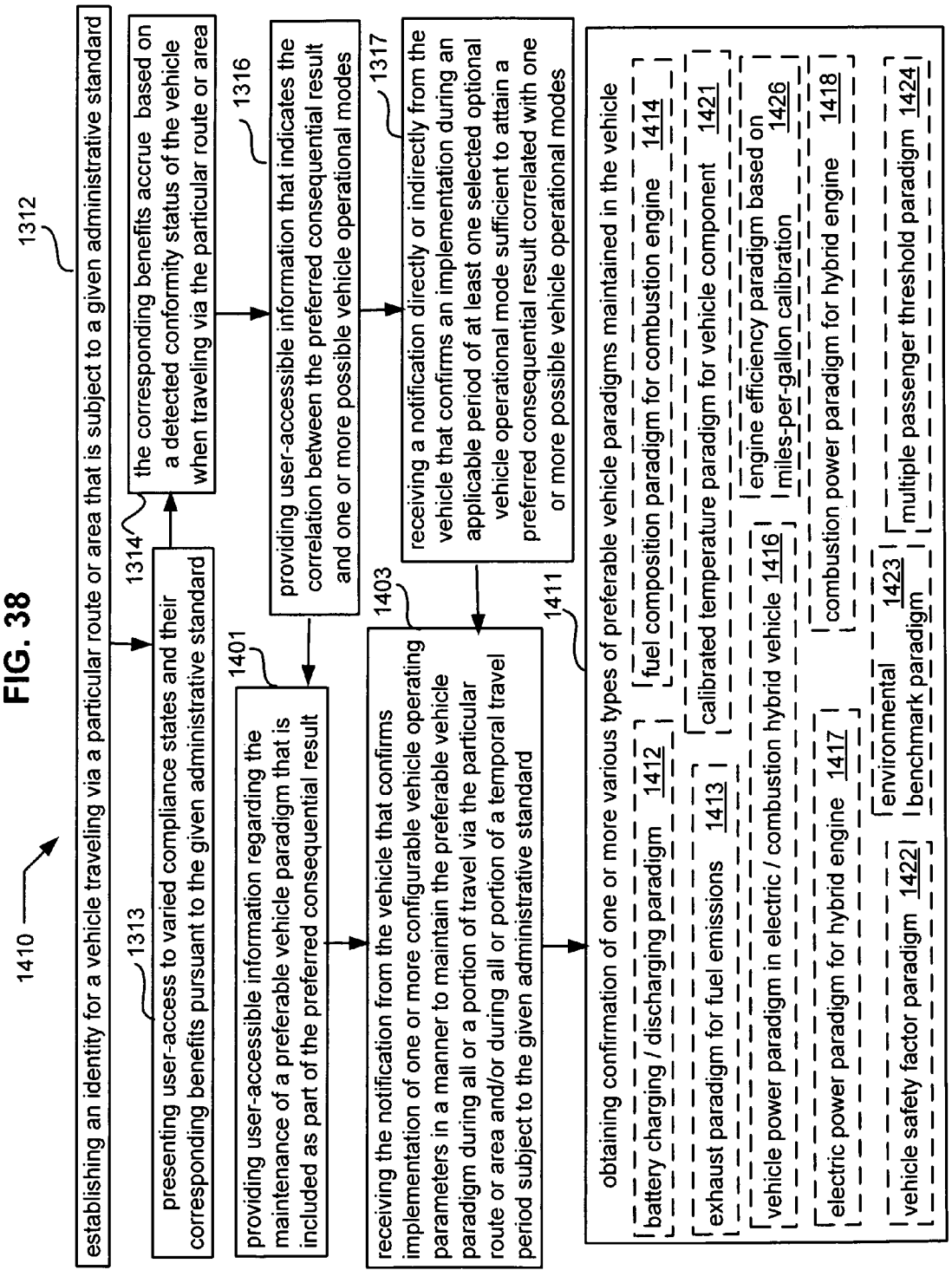

Referring to the exemplary embodiments 1410 of FIG. 38, possible aspects may include previously described process features 1312, 1313, 1314, 1316, 1317, 1401, 1403 in combination with obtaining confirmation of one or more types of preferable vehicle paradigms maintained in the vehicle (block 1411). Examples of such preferable vehicle paradigms sufficient to attain the correlated consequential result may include battery charging/discharging paradigm 1412, exhaust paradigm for fuel emissions 1413, and fuel composition paradigm for combustion engine 1414.

Additional examples may include vehicle power paradigm in electric/combustion hybrid vehicle 1416, electric power paradigm for hybrid engine 1417, and combustion power paradigm for hybrid engine 1418. Further possible examples may include calibrated temperature paradigm for vehicle component 1421, vehicle safety factor paradigm 1422, environmental benchmark paradigm 1423, multiple passenger threshold paradigm 1424, and engine efficiency paradigm based on miles-per-gallon calibration 1426.

Of course other types of preferable vehicle paradigms sufficient to attain the preferred consequential result may be provided depending on the circumstances. It will be understood that the examples depicted herein are only for purposes of illustration and are not intended to be limiting.

Figure 39:
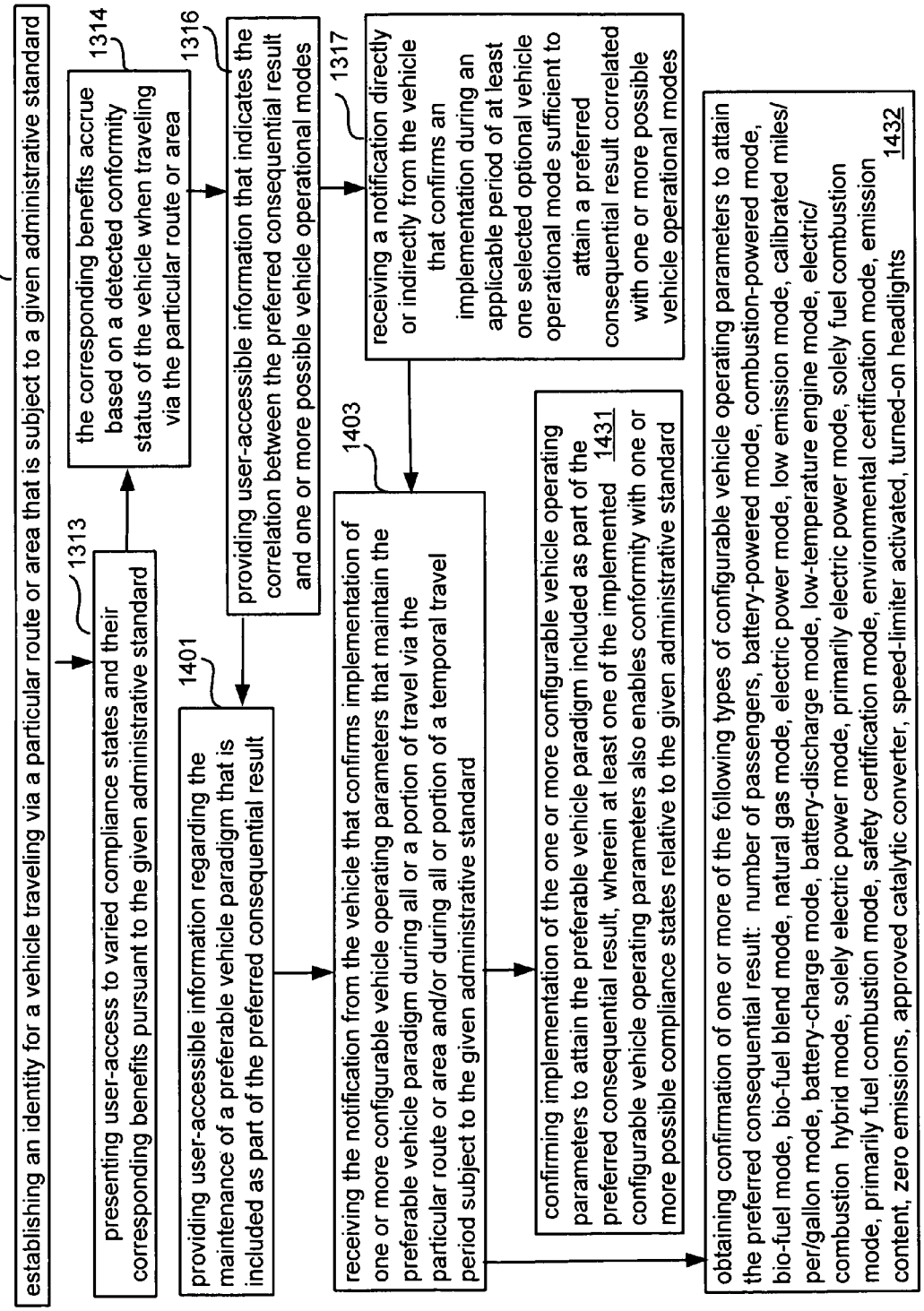

The detailed flow chart of FIG. 39 depicts other possible process features 1430 that may included previously described aspects 1312, 1313, 1314, 1316, 1317, 1401, 1403 along with confirming implementation of the one or more configurable vehicle operating parameters to attain the preferable vehicle paradigm included as part of the preferred consequential result, wherein at least one of the implemented configurable vehicle operating parameters also enables conformity with one or more possible compliance states relative to the given administrative standard (block 1431). Another possible process aspect may include obtaining confirmation of one or more of the following types of configurable vehicle operating parameters to maintain the preferable vehicle paradigm: number of passengers, battery-powered mode, combustion-powered mode, bio-fuel mode, bio-fuel blend mode, natural gas mode, electric power mode, low emission mode, calibrated miles/per/gallon mode, battery-charge mode, battery-discharge mode, low-temperature engine mode, electric/combustion hybrid mode, solely electric power mode, primarily electric power mode, solely fuel combustion mode, primarily fuel combustion mode, safety certification mode, environmental certification mode, emission content, zero emissions, approved catalytic converter, speed-limiter activated, turned-on headlights (block 1432).

Figure 40:
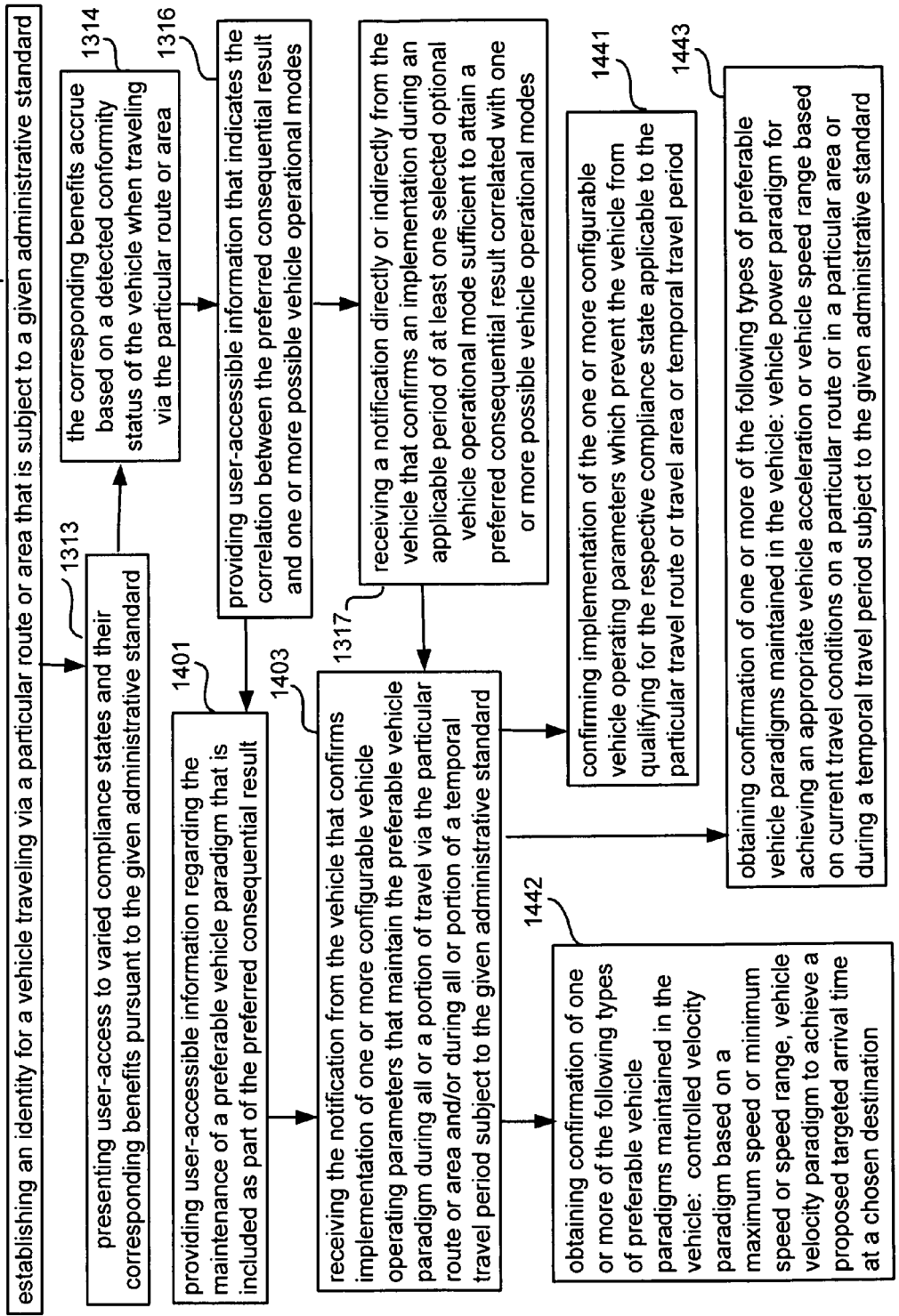

Referring to FIG. 40, the detailed flow chart shows various exemplary embodiment features 1440, including previously described aspects 1312, 1313, 1314, 1316, 1317, 1401, 1403 in combination with confirming implementation of the one or more configurable vehicle operating parameters which prevent the vehicle from qualifying for the respective compliance state applicable to the particular travel route or travel area or temporal travel period (block 1441).

Additional process features may include obtaining confirmation of one or more of the following types of preferable vehicle paradigms maintained in the vehicle: controlled velocity paradigm based on a maximum speed or minimum speed or speed range, vehicle velocity paradigm to achieve a proposed targeted arrival time at a chosen destination (block 1442). In some instances a further aspect may include obtaining confirmation of one or more of the following types of preferable vehicle paradigms maintained in the vehicle: vehicle power paradigm for achieving an appropriate vehicle acceleration or vehicle speed range based on current travel conditions on a particular route or in a particular area or during a temporal travel period subject to the given administrative standard (block 1443).

Figure 41:
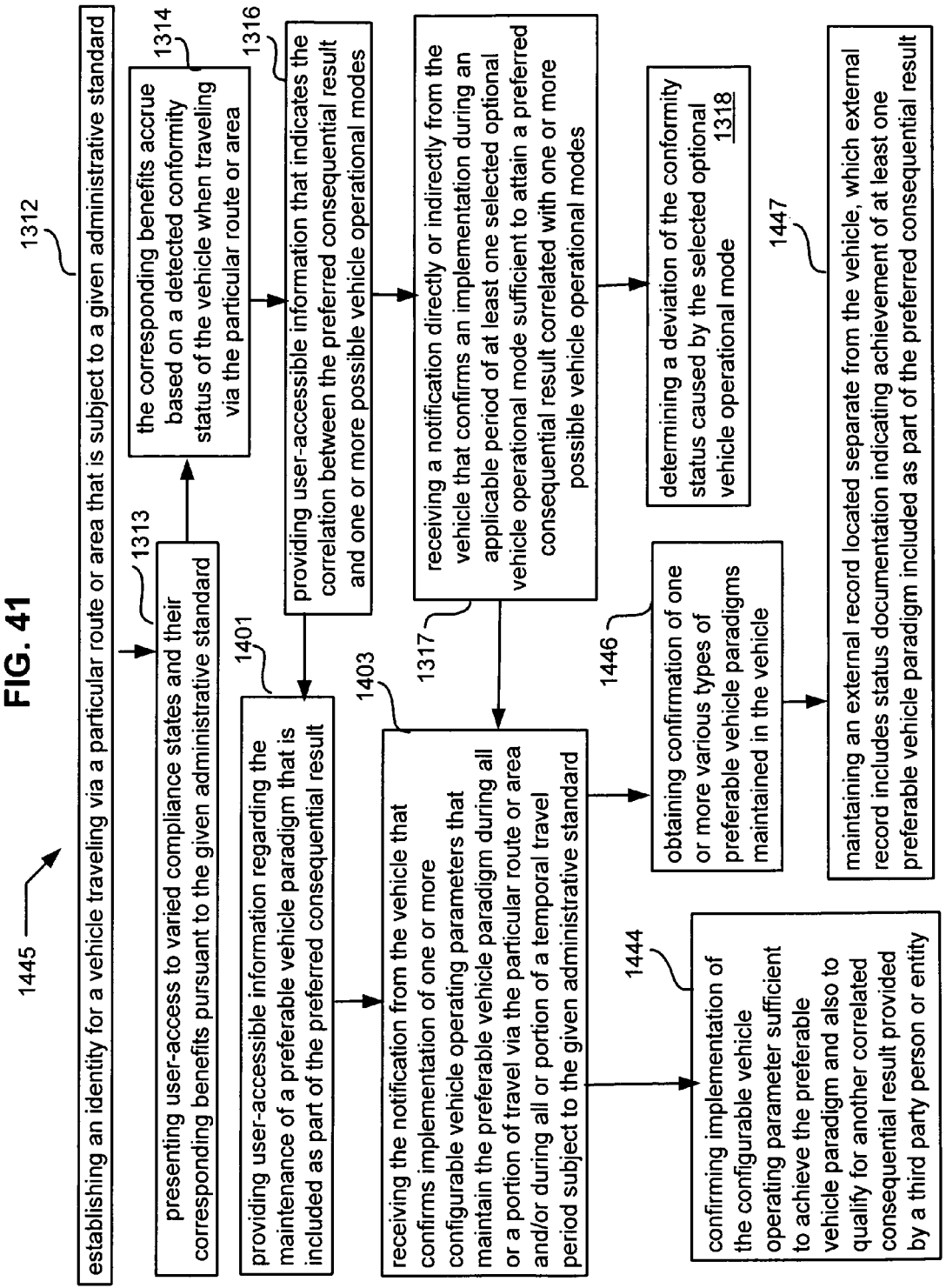

FIG. 41 is a detailed flow chart depicting various exemplary process embodiment features 1445 including previously described process aspects 1312, 1313, 1314, 1316, 1317, 1318, 1401, 1403 along with confirming implementation of the configurable vehicle operating parameter sufficient to achieve the preferable vehicle paradigm and also to qualify for another correlated consequential result provided by a third party person or entity (block 1444). Further possible process aspects may include obtaining confirmation of one or more various types of preferable vehicle paradigms maintained in the vehicle (block 1446); and may further include maintaining an external record located separate from the vehicle, which external record includes status documentation indicating achievement of at least one preferable vehicle paradigm included as part of the preferred consequential result (block 1447).

Figure 42:
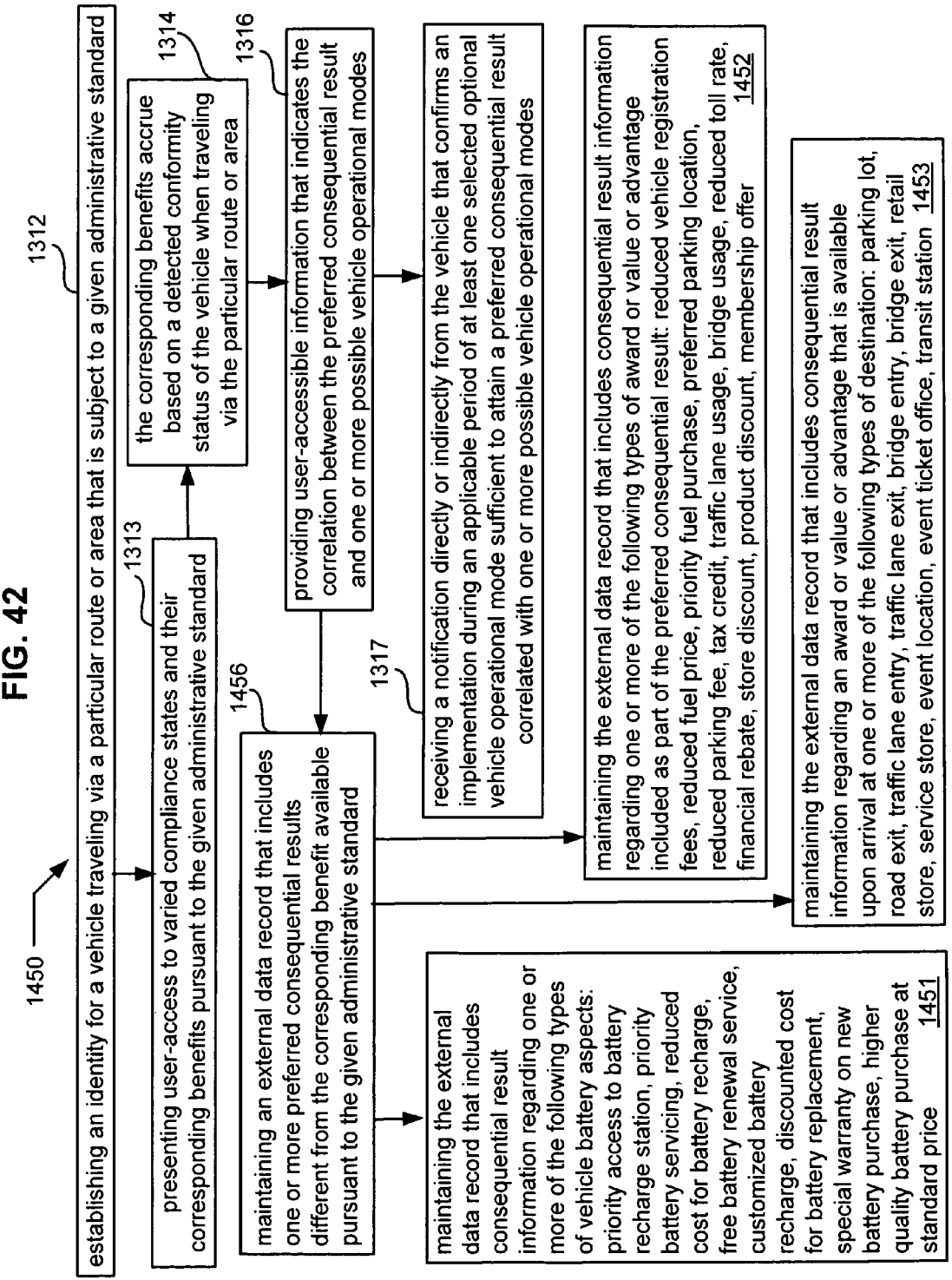

The detailed flow chart of FIG. 42 shows possible process features 1450 that may include previously describe aspects 1312, 1313, 1314, 1316, 1317 in combination with maintaining an external data record that includes one or more preferred consequential results different from the corresponding benefit available pursuant to the given administrative standard (block 1456).

Another possible process feature may include maintaining the external data record that includes consequential result information regarding one or more of the following types of vehicle battery aspects: priority access to battery recharge station, priority battery servicing, reduced cost for battery recharge, free battery renewal service, customized battery recharge, discounted cost for battery replacement, special warranty on new battery purchase, higher quality battery purchase at standard price (block 1451).

Additional exemplary features may include maintaining the external data record that includes consequential result information regarding one or more of the following types of award or value or advantage included as part of the preferred consequential result: reduced vehicle registration fees, reduced fuel price, priority fuel purchase, preferred parking location, reduced parking fee, tax credit, traffic lane usage, bridge usage, reduced toll rate, financial rebate, store discount, product discount, membership offer (block 1452).

In some instances a further process aspect may include maintaining the external data record that includes consequential result information regarding an award or value or advantage that is available upon arrival at one or more of the following types of destination: parking lot, road exit, traffic lane entry, traffic lane exit, bridge entry, bridge exit, retail store, service store, event location, event ticket office, transit station (block 1453).

Figure 43:
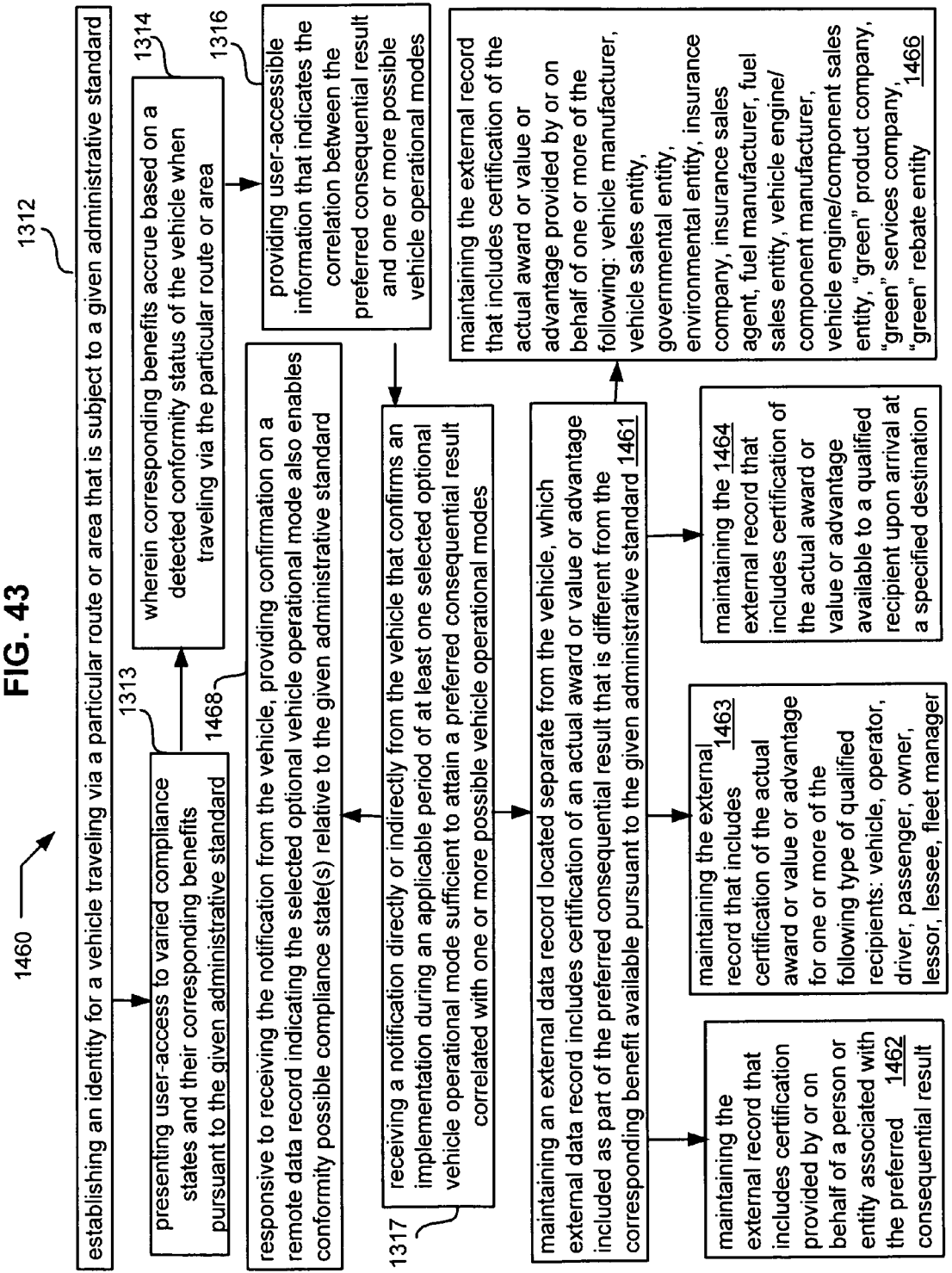

The detailed flow chart of FIG. 43 illustrates possible embodiment features 1460 that may include previously described aspects 1312, 1313, 1314, 1316 as well as maintaining an external data record located separate from the vehicle, which external data record includes certification of an actual award or value or advantage included as part of the preferred consequential result that is different from the corresponding benefit available pursuant to the given administrative standard (block 1461). Further process aspects may include maintaining the external record that includes certification provided by or on behalf of a person or entity associated with the preferred consequential result (block 1462); and in some instances maintaining the external record that includes certification of the actual award or value or advantage for one or more of the following type of qualified recipients: vehicle, operator, driver, passenger, owner, lessor, lessee, fleet manager (block 1463). Yet another possible aspect may include maintaining the external record that includes certification of the actual award or value or advantage available to a qualified recipient upon arrival at a specified destination (block 1464)

Some process embodiments may include maintaining the external record that includes certification of the actual award or value or advantage provided by or on behalf of one or more of the following: vehicle manufacturer, vehicle sales entity, governmental entity, environmental entity, insurance company, insurance sales agent, fuel manufacturer, fuel sales entity, vehicle engine/component manufacturer, vehicle engine/component sales entity, "green" product company, "green" services company, "green" rebate entity (block 1466).

A further possible process aspect may include responsive to receiving the notification from the vehicle, providing confirmation on a remote data record indicating the selected optional vehicle operational mode also enables conformity with one or more possible compliance states relative to the given administrative standard (block 1468).

Figure 44:
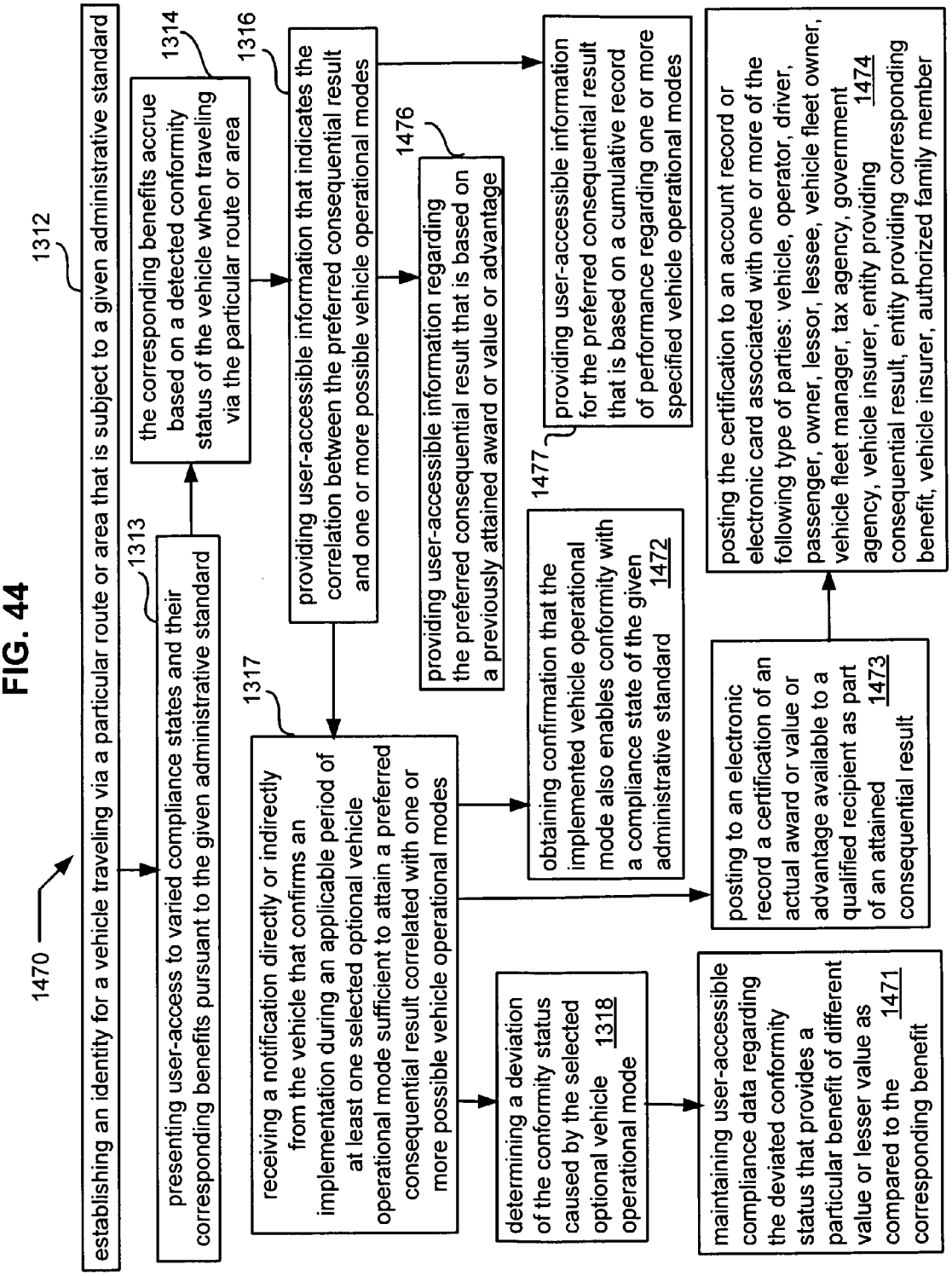

The detailed flow chart of FIG. 44 depicts exemplary process features 1470 that include previously described aspects 1312, 1313, 1314, 1316, 1317, 1318 in combination with maintaining user-accessible compliance data regarding the deviated conformity status that provides a particular benefit of different value or lesser value as compared to the corresponding benefit (block 1471). In some instances a possible process feature may include obtaining confirmation that the implemented vehicle operational mode also enables conformity with a compliance state of the given administrative standard (block 1472).

In some circumstances an exemplary process embodiment may additionally include posting to an electronic record a certification of an actual award or value or advantage available to a qualified recipient as part of the attained consequential result (block 1473). In some embodiments another possible process aspect may include posting the certification to an account record or electronic card associated with one or more of the following type of parties: vehicle, operator, driver, passenger, owner, lessor, lessee, vehicle fleet owner, vehicle fleet manager, tax agency, government agency, vehicle insurer, entity providing consequential result, entity providing corresponding benefit, authorized family member (block 1474).

Other exemplary process features depicted in FIG. 44 include providing user-accessible information regarding the preferred consequential result that is based on a previously attained award or value or advantage (block 1476). In some instances a possible process feature may include providing user-accessible information for the preferred consequential result that is based on a cumulative record of performance regarding one or more specified vehicle operational modes (block 1477).

Figure 45:
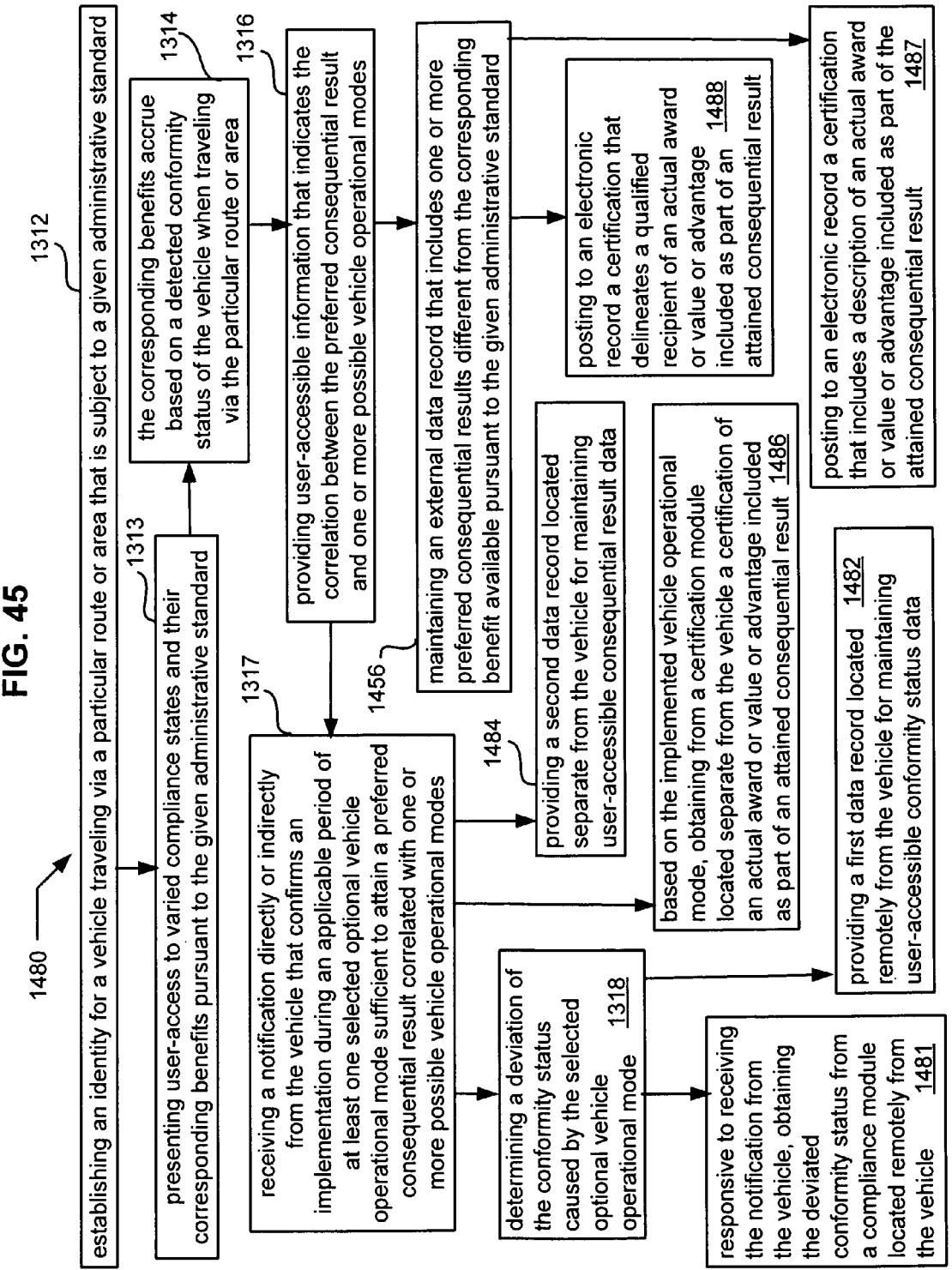

FIG. 45 illustrates various process embodiment features 1480 that include previously described elements 1312, 1313, 1314, 1316, 1317, 1318, 1456 along with responsive to receiving the notification from the vehicle, obtaining the deviated conformity status from a compliance module located remotely from the vehicle (block 1481). Other possible process features may include providing a first data record located remotely from the vehicle for maintaining user-accessible conformity status data (block 1482), and in some instances providing a second data record located separate from the vehicle for maintaining user-accessible consequential result data (block 1484).

Some exemplary process features may include based on the implemented vehicle operational mode, obtaining from a certification module located separate from the vehicle a certification of an actual award or value or advantage included as part of an attained consequential result (block 1486). Another possible aspect may include posting to an electronic record a certification that includes a description of an actual award or value or advantage included as part of the attained consequential result (block 1487). A further possible feature may include posting to an electronic record a certification that delineates a qualified recipient of an actual award or value or advantage included as part of an attained consequential result (block 1488).

Figure 46:
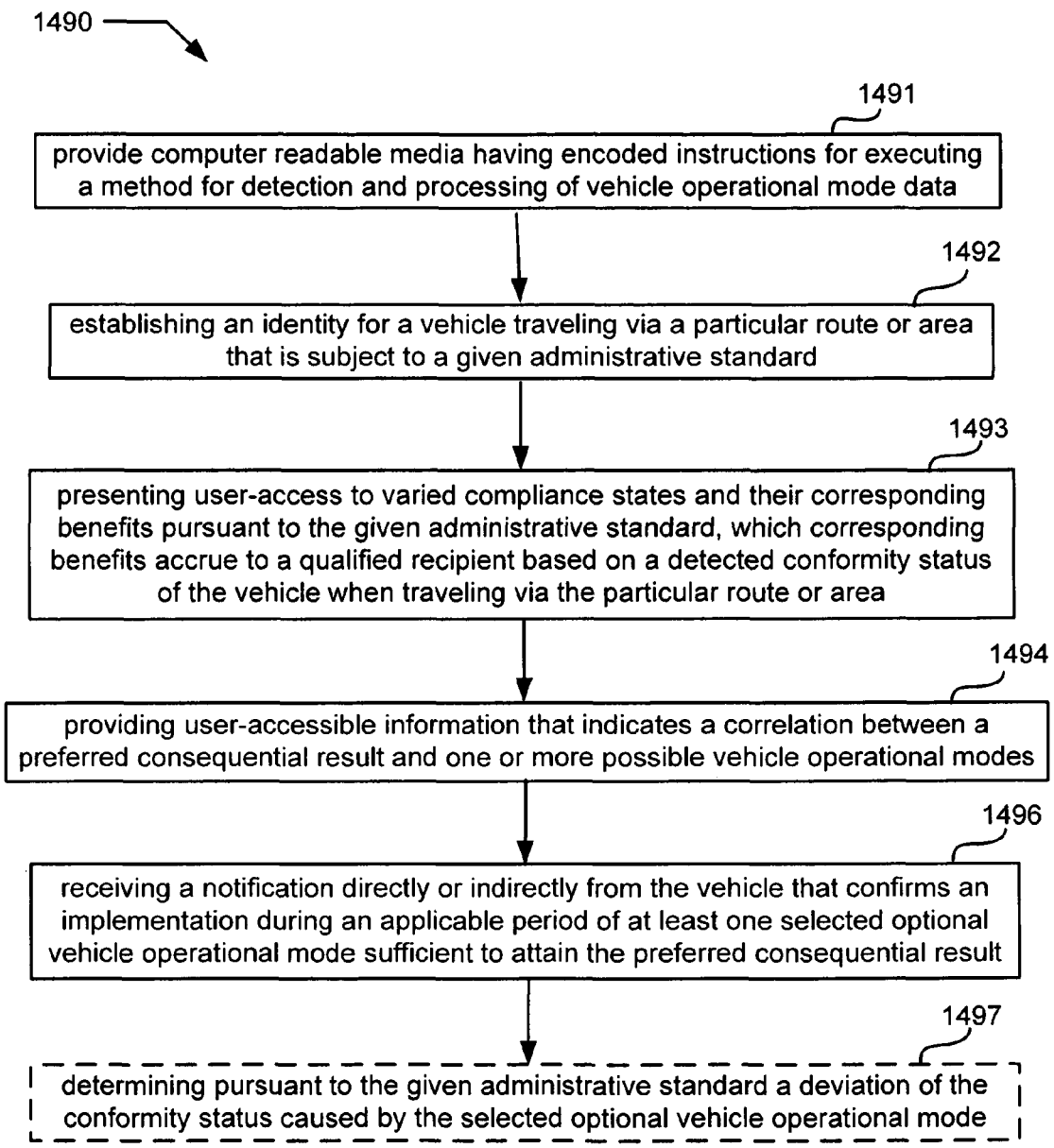
FIG. 46 is a diagrammatic flow chart for an exemplary computer program product embodiment for managing various vehicle operational modes.

The diagrammatic flow chart of FIG. 46 illustrates exemplary features of a computer program product (1490) that includes computer readable media having encoded instructions for executing a method for detection and processing of vehicle operational mode data (block 1491). Exemplary method features executable by computerized apparatus may include establishing an identity for a vehicle traveling via a particular route or area that is subject to a given administrative standard (block 1492); presenting user-access to varied compliance states and their corresponding benefits pursuant to the given administrative standard, which corresponding benefits accrue to a qualified recipient based on a detected conformity status of the vehicle when traveling via the particular route or area (block 1493); and providing user-accessible information that indicates a correlation between a preferred consequential result and one or more possible vehicle operational modes (block 1494).

Additional possible method features incorporated as instructions on the computer readable media may include receiving a notification directly or indirectly from the vehicle that confirms an implementation during an applicable period of at least one selected optional vehicle operational mode sufficient to attain the preferred consequential result (block 1496). A further aspect may include instructions for determining pursuant to the given administrative standard a deviation of the conformity status caused by the selected optional vehicle operational mode (block 1497).

Figure 47:
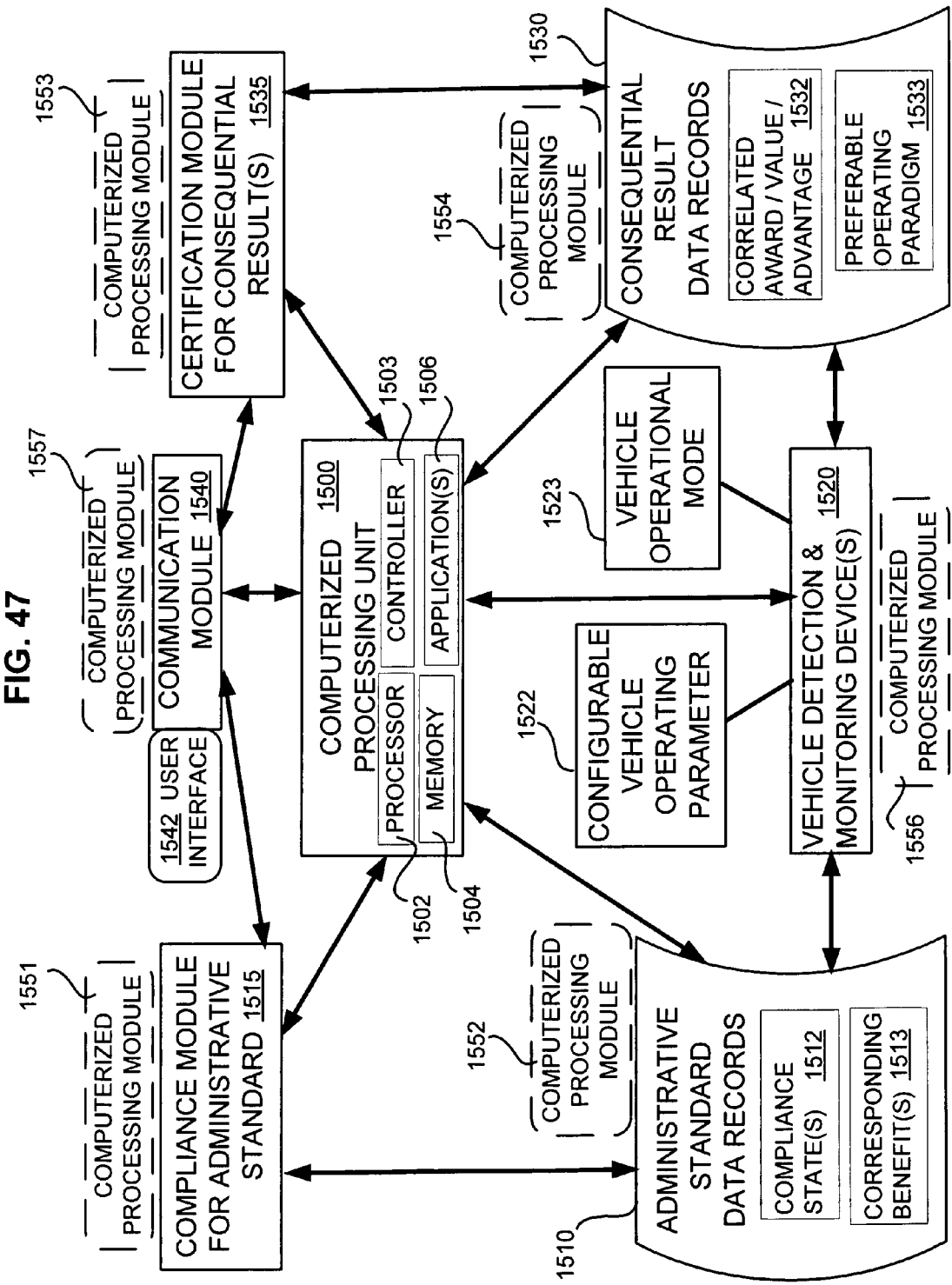
FIG. 47 is a schematic block diagram illustrating an exemplary system for managing and processing vehicle operation mode data.

The schematic block diagram of FIG. 47 illustrates an exemplary system for managing and processing vehicle operation mode data. Such an exemplary system may include a computerized processing unit 1500 with processor 1502, controller 1503, memory 1504 and one or more applications 1506. Access to such an exemplary system may be provided through a user interface 1543 with a communication module 1540.

Various possible communication links with computerized processing unit 1550 may include a link with administrative standard data records 1510, another link with compliance module for administrative standard 1515, still another link with one or more vehicle detection and monitoring devices 1520, a further link with consequential result data records 1530, yet a further link with certification module for one or more consequential results 1535, and an additional link with communication module 1540.

Administrative standard data records 1510 may include informational data regarding one or more compliance states 1512 as well as their corresponding benefits 1513. Consequential result data records may include informational data regarding a preferable operating paradigm 1533 for a vehicle, as well as a correlated award or value or advantage 1532 that may be available to a qualified recipient. Of course other types of information may be maintained to facilitate the management and processing of vehicle mode data, including additional information regarding the vehicle conformity status pursuant to the administrative standard as well as additional information regarding qualification for a preferred consequential result based on a correlated vehicle mode.

Depending on the circumstances, the various components 1510, 1515, 1520, 1530, 1535, 1540 may be located on a vehicle traveling via a route or area subject to an administrative standard and/or located externally (e.g., remotely) from the vehicle. In some instances such components may be located at a facility associated with providing the preferred consequential result, and/or located at a monitoring facility associated with supervision of the administrative standard. Other locations are possible, and various types of communication links may be provided including but not limited to wireless, cable, satellite, Internet, public networks, private networks, and the like.

It will be understood from the various embodiment features disclosed herein that certain exemplary data processing functions involving components 1510, 1515, 1520, 1530, 1535, 1540 may be carried out at a central location by computerized processing unit 1500, and other specified exemplary processing functions may be carried out by separate computerized processing modules. For example, compliance module for administrative standard 1515 may also include or be operatively coupled with computerized processing module 1551; administrative standard data records 1510 may also include or be operatively coupled with computerized processing module 1552; certification module for consequential results 1535 may also include or be operatively coupled with computerized processing module 1553; consequential result data records 1530 may also include or be operatively coupled with computerized processing module 1554; vehicle detection and monitoring devices 1520 may also include or be operatively coupled with computerized processing module 1556; and communication module 1540 may also include or be operatively coupled with computerized processing module 1557.

In accordance with the disclosures herein, an exemplary vehicle system embodiment for varied operational modes may include a communication unit operably coupled to a first data record listing one or more available compliance states for a vehicle traveling via a particular route or area that is subject to a given administrative standard, wherein the one or more compliance states correspond to respective benefits available to a qualified recipient. Related system features may further include a second data record operably coupled to the communication unit and configured to maintain information regarding a preferred consequential result that correlates with one or more optional vehicle operational modes.

Another related system feature may include a user interface linked to the communication unit to provide access to information regarding a benefit corresponding to vehicle compliance state as compared to a preferred consequential result based on a selected vehicle operational mode detected by one or more vehicle monitoring devices configured to transmit updated vehicle operational mode data to the communication unit. Additional possible user interface features may include one or more of the following type of elements: keyboard, voice receiver, audio speaker, mouse, touch screen, scanner, printer, data status display, messaging display, GPS travel map.

A further exemplary system component may include a compliance module having a communication link to the first data record and to the communication unit, wherein the compliance module is configured to process updated vehicle operational mode data to establish a conformity status based on a vehicle compliance state pursuant to the given administrative standard. Another possible system component may include a certification module having a communication link to the first data record and to the communication unit, wherein the compliance module is configured to process updated vehicle operational mode data to establish qualification for a preferred consequential result available to a qualified recipient associated with the vehicle.

Further exemplary system aspects disclosed herein may provide for promotional correlation with selective vehicle modes, wherein possible system components may include a vehicle identifier record for an identified vehicle traveling via a particular route or area that is subject to a given administrative standard that includes a first data record indicative of one or more compliance states corresponding to respective benefits available to a qualified recipient, and a second data record listing one or more preferred promotional results that correlate with one or more optional vehicle operational modes. A further possible component may include a computerized processing unit operably coupled to the second data record and having a link to one or more monitoring or detection devices on the vehicle, wherein the computerized processing unit is configured to determine qualification for the one or more preferred promotional results based on a selected vehicle operational mode detected during an applicable travel period by the one or more vehicle monitoring or detection devices.

In some instances the computerized processing unit is configured to receive updated vehicle operational mode data from the one or more monitoring or detection devices on the vehicle, and may also be configured to transmit to a vehicle communication unit updated conformity status information based on a vehicle compliance state pursuant to the given administrative standard. A further system component may include a certification module having a communication link to the second data record and to a vehicle communication unit, wherein the certification module is configured to process updated vehicle operational mode data to establish qualification for a preferred promotional result available to a qualified recipient associated with the vehicle.

It will be understood that the technical capabilities for detecting and/or monitoring vehicle operation modes may include on-board vehicle components as well as external components, and the examples disclosed herein are for purposes of illustration and are not intended to be limiting. Similarly, the technical capabilities for obtaining vehicle identification data as well as identity data for qualified recipients of a preferred promotional result may include on-board vehicle components as well as external components (e.g., scanner units adjacent a travel route or travel area), and the examples disclosed herein are for purposes of illustration and are not intended to be limiting.

Figure 48:
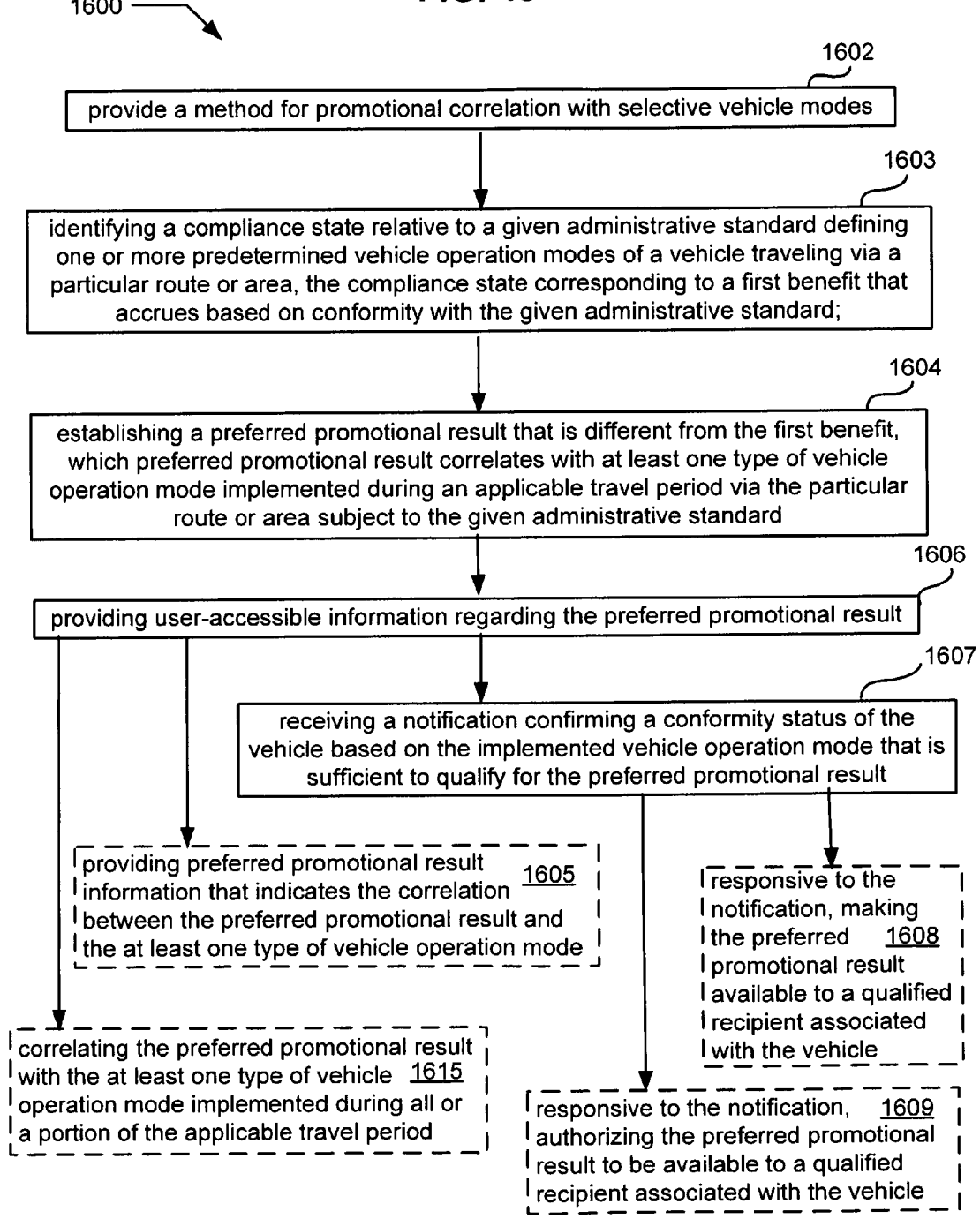
FIG. 48 is a high level flow chart for exemplary method embodiments for promotional correlation with various vehicle modes.
Figure 49:
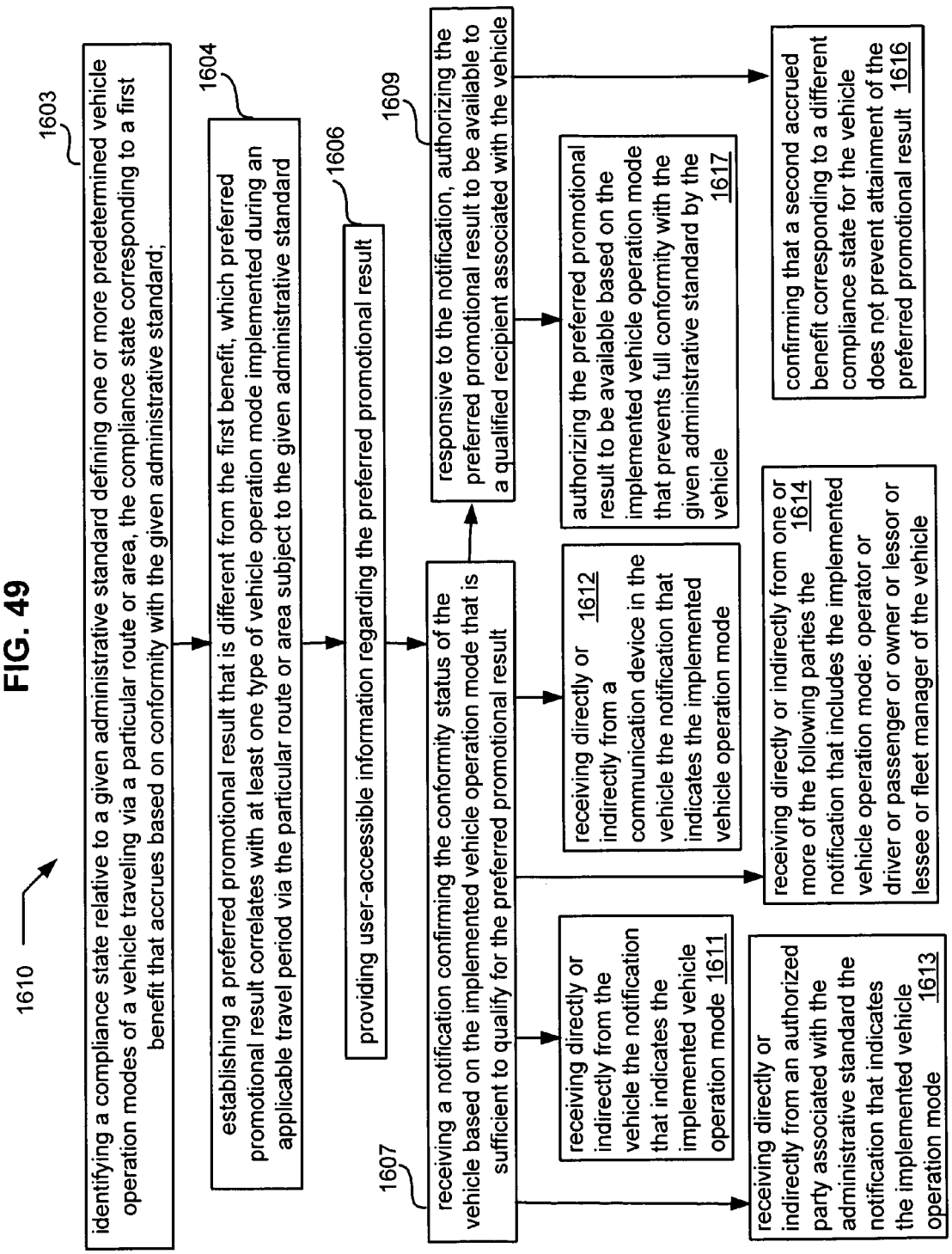
FIGS. 49-60 are more detailed flow charts illustrating additional exemplary process features regarding possible promotional results correlated with one or more vehicle operation modes.

The high level flow chart of FIG. 48 illustrates exemplary process features 1600 that may provide a method for promotional correlation with selective vehicle modes (block 1602), wherein possible method features may include identifying a compliance state relative to a given administrative standard defining one or more predetermined vehicle operation modes of a vehicle traveling via a particular route or area, the compliance state corresponding to a first benefit that accrues based on conformity with the given administrative standard (block 1603); and establishing a preferred promotional result that is different from the first benefit, which preferred promotional result correlates with at least one type of vehicle operation mode implemented during an applicable travel period via the particular route or area subject to the given administrative standard (block 1604).

Additional possible process features may include providing user-accessible information regarding the preferred promotional result (block 1606), and receiving a notification confirming a conformity status of the vehicle based on the implemented vehicle operation mode that is sufficient to qualify for the preferred promotional result (block 1607). In some instances further features may include providing preferred promotional result information that indicates the correlation between the preferred promotional result and the at least one type of vehicle operation mode (block 1605), and correlating the preferred promotional result with the at least one type of vehicle operation mode implemented during all or a portion of the applicable travel period (block 1615).

Other possible aspects may include features responsive to the notification confirming the conformity status of the vehicle, including making the preferred promotional result available to a qualified recipient associated with the vehicle (block 1608), and authorizing the preferred promotional result to be available to a qualified recipient associated with the vehicle (block 1609).

Additional exemplary embodiment features 1610 depicted in the flow chart of FIG. 29 include previously described aspects 1603, 1604, 1606, 1607, 1609 along with receiving directly or indirectly from the vehicle the notification that indicates the implemented vehicle operation mode (block 1611). Further possible aspects may include receiving directly or indirectly from a communication device in the vehicle the notification that indicates the implemented vehicle operation mode (block 1612), and receiving directly or indirectly from an authorized party associated with the administrative standard the notification that indicates the implemented vehicle operation mode (block 1613).

Further possible aspects may include receiving directly or indirectly from one or more of the following parties the notification that includes the implemented vehicle operation mode: operator or driver or passenger or owner or lessor or lessee or fleet manager of the vehicle (block 1614). Other exemplary aspects may include authorizing the preferred promotional result to be available based on the implemented vehicle operation mode that prevents full conformity with the given administrative standard by the vehicle (block 1617). In some instances a possible feature may include confirming that a second accrued benefit corresponding to a different compliance state for the vehicle does not prevent attainment of the preferred promotional result (block 1616).

Figure 50:
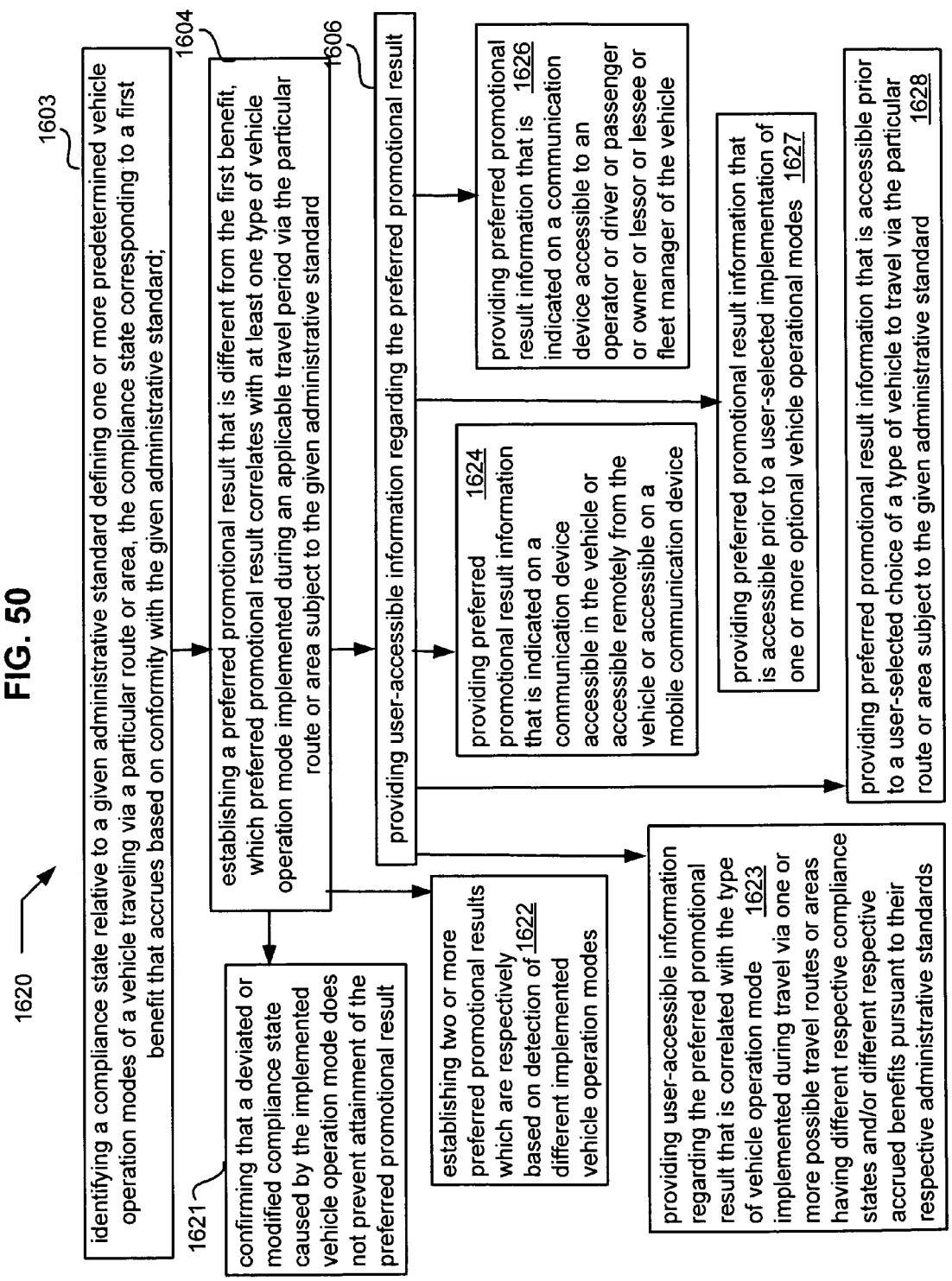

The detailed flow chart of FIG. 50 illustrates further exemplary aspects 1620 that include previously described process features 1603, 1604, 1606 in combination with confirming that a deviated or modified conformity status caused by the implemented vehicle operation mode does not prevent attainment of the preferred promotional result (block 1621). Additional possible process features may include establishing two or more preferred promotional results which are respectively based on detection of different implemented vehicle operation modes (block 1622), and providing user-accessible information regarding the preferred promotional result that is correlated with the type of vehicle operation mode implemented during travel via one or more possible travel routes or areas having different respective compliance states and/or different respective accrued benefits pursuant to their respective administrative standards (block 1623).

Other illustrated aspects may include providing preferred promotional result information that is indicated on a communication device accessible in the vehicle or accessible remotely from the vehicle or accessible on a mobile communication device (block 1624), and in some instances may include providing preferred promotional result information that is indicated on a communication device accessible to an operator or driver or passenger or owner or lessor or lessee or fleet manager of the vehicle (block 1626).

Further possible process features may include providing preferred promotional result information that is accessible prior to a user-selected implementation of one or more optional vehicle operational modes (block 1627), and providing promotional result information that is accessible prior to a user-selected choice of a type of vehicle to travel via the particular route or area subject to the given administrative standard (block 1628).

Figure 51:
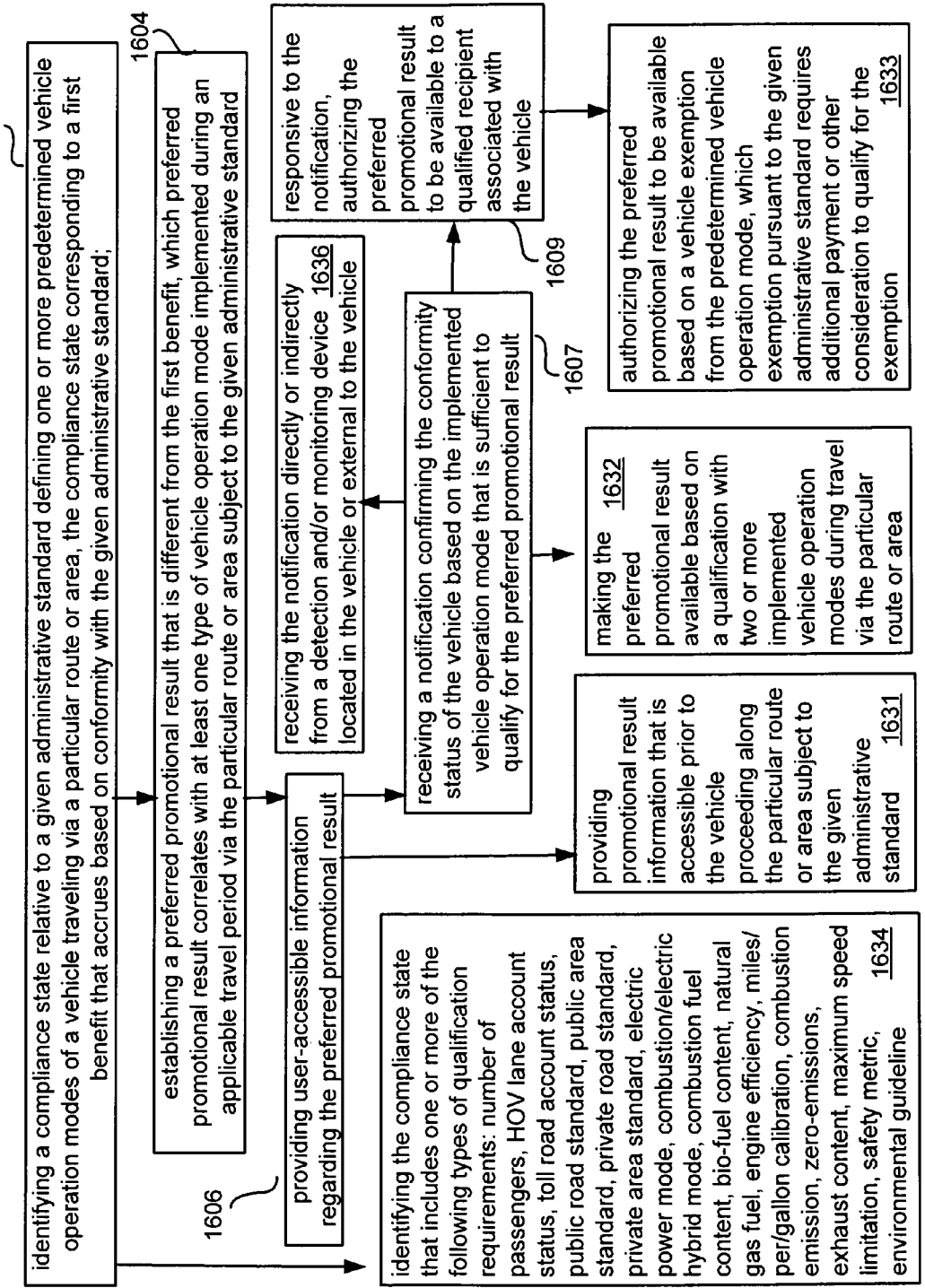

The detailed flow chart of FIG. 51 shows exemplary aspects 1630 that include previously described features 1603, 1604, 1606, 1607, 1609 as well as providing promotional result information that is accessible prior to the vehicle proceeding along the particular route or area subject to the given administrative standard (block 1631). Other aspects may include making the preferred promotional result available based on a qualification with two or more implemented vehicle operation modes during travel via the particular route or area (block 1632). Further possible aspects may include authorizing the preferred promotional result to be available based on a vehicle exemption from the predetermined vehicle operation mode, which exemption pursuant to the given administrative standard requires additional payment or other consideration to qualify for the exemption (block 1633).

FIG. 51 also illustrates exemplary aspects that may include identifying the compliance state that includes one or more of the following types of qualification requirements: number of passengers, HOV lane account status, toll road account status, public road standard, public area standard, private road standard, private area standard, electric power mode, combustion/electric hybrid mode, combustion fuel content, bio-fuel content, natural gas fuel, engine efficiency, miles/per/gallon calibration, combustion emission, zero-emissions, exhaust content, maximum speed limitation, safety metric, environmental guideline (block 1634).

Figure 52:
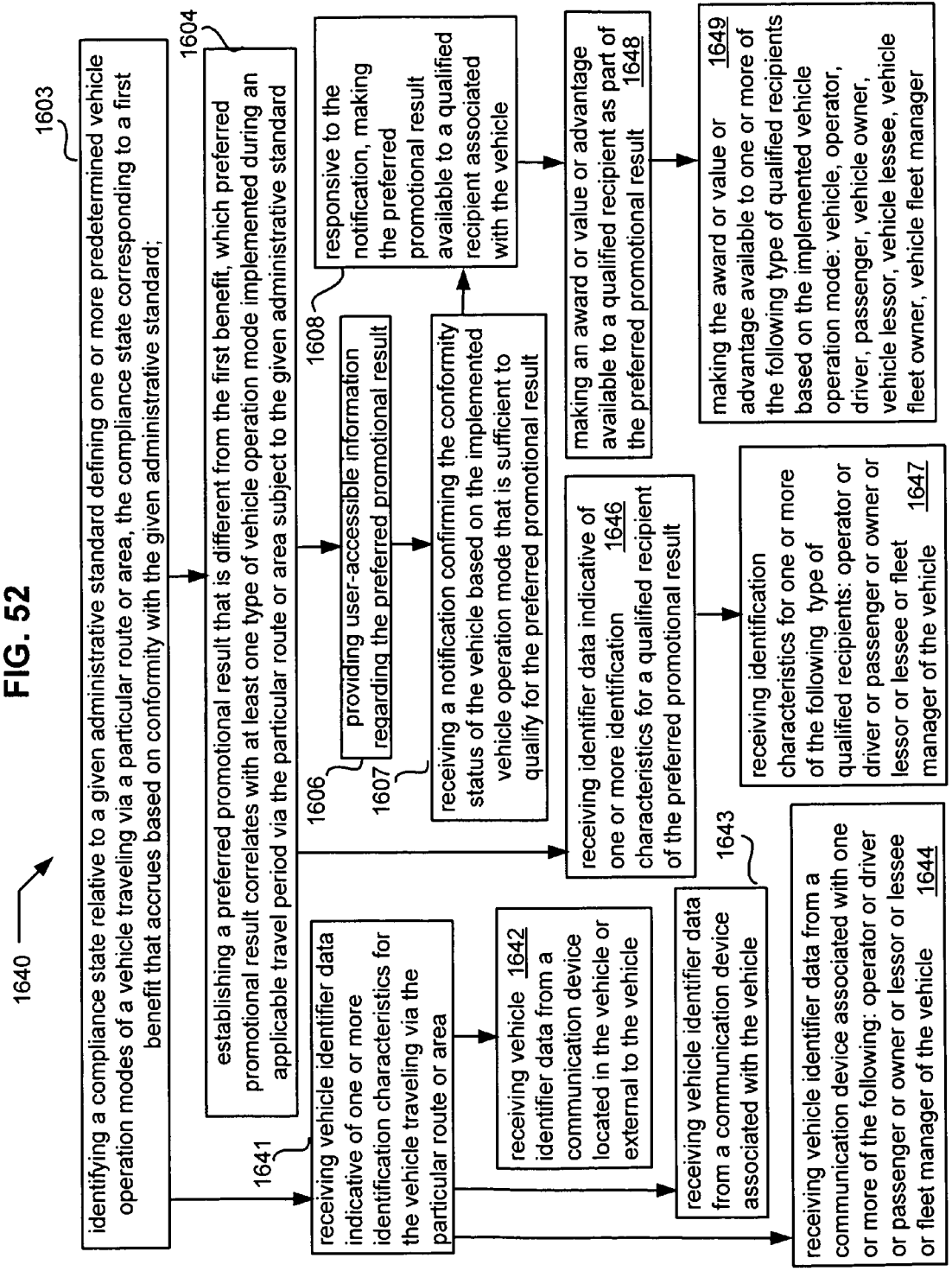

Referring to the exemplary illustrated features 1640 of FIG. 52, possible aspects may include previously described process elements 1603, 1604, 1606, 1607, 1608 in combination with making an award or value or advantage available to a qualified recipient as part of the preferred promotional result (block 1648), and in some instances making an award or value or advantage available to one or more of the following type of qualified recipients based on the implemented vehicle operation mode: vehicle, operator, driver, passenger, vehicle owner, vehicle lessor, vehicle lessee, vehicle fleet owner, vehicle fleet manager (block 1649).

Additional process aspects may include receiving vehicle identifier data indicative of one or more identification characteristics for the vehicle traveling via the particular route or area (block 1641), and may further include receiving vehicle identifier data from a communication device located in the vehicle or external to the vehicle (block 1642). Other possibilities may include receiving vehicle identifier data from a communication device associated with the vehicle (block 1643), and in some instances may include receiving vehicle identifier data from a communication device associated with one or more of the following: operator or driver or passenger or owner or lessor or lessee or fleet manager of the vehicle (block 1644).

Further exemplary aspects may include receiving identifier data indicative of one or more identification characteristics for a qualified recipient of the preferred promotional result (block 1646), and well as receiving identification characteristics for one or more of the following type of qualified recipients: operator or driver or passenger or owner or lessor or lessee or fleet manager of the vehicle (block 1647).

Figure 53:
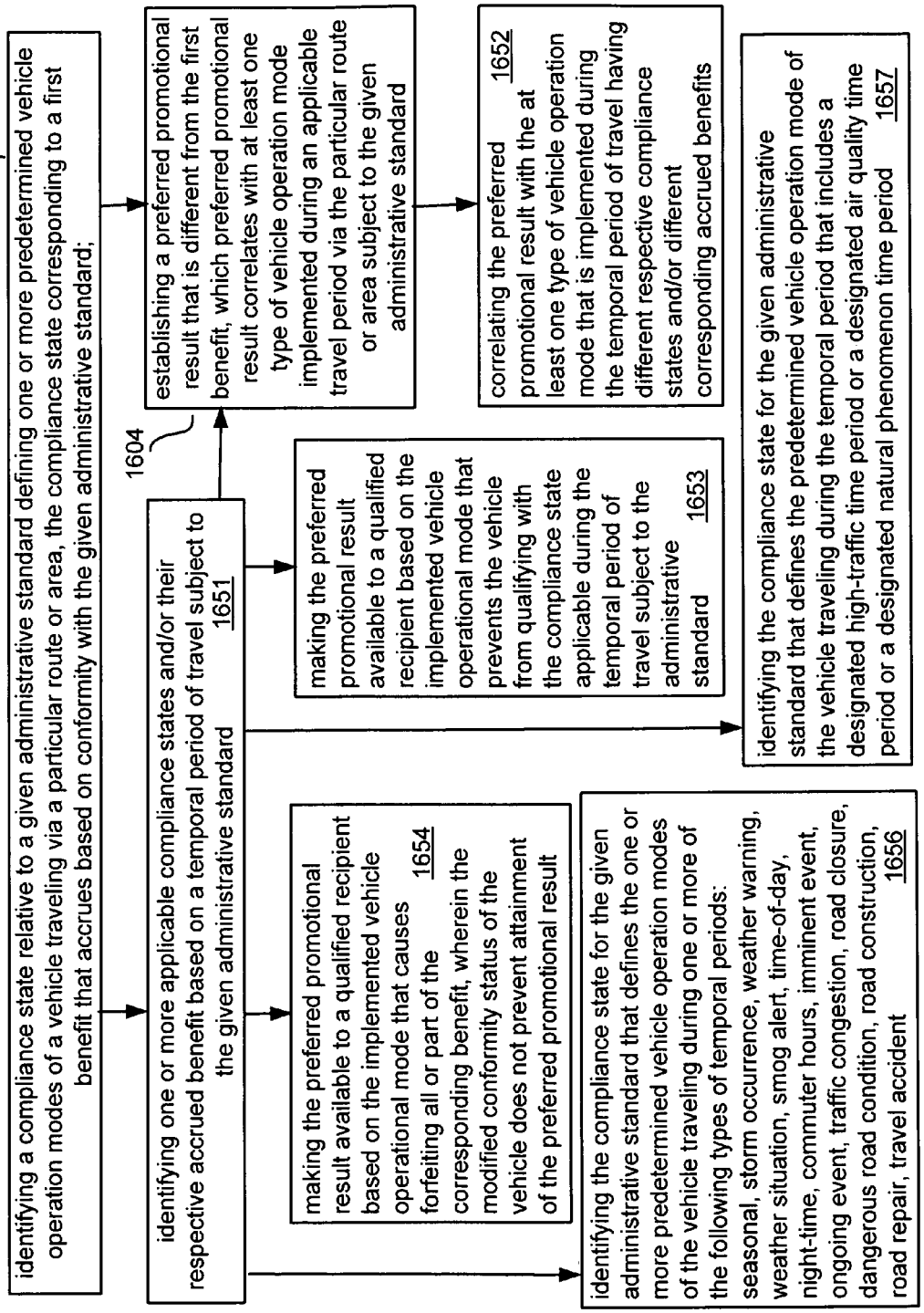

The detailed flow chart of FIG. 53 depicts various exemplary process features 1650 that include previously described aspects 1603, 1604 as well as identifying one or more applicable compliance states and/or their respective accrued benefit based on a temporal period of travel subject to the given administrative standard (block 1651). Other related aspects may include correlating the preferred promotional result with the at least one predetermined vehicle operation mode that is implemented during the temporal period of travel having different respective compliance states and/or different corresponding accrued benefits (block 1652). Further possibilities may include making the preferred promotional result available to a qualified recipient based on the implemented vehicle operational mode that prevents the vehicle from qualifying with the compliance state applicable during the temporal period of travel subject to the administrative standard (block 1653).

Further possible process features illustrated in FIG. 53 include making the preferred promotional result available to a qualified recipient based on the implemented vehicle operational mode that causes forfeiting all or part of the corresponding benefit, wherein the modified conformity status of the vehicle does not prevent attainment of the preferred promotional result (block 1654). Other exemplary features may include identifying the compliance state for the given administrative standard that defines the one or more predetermined vehicle operation modes of the vehicle traveling during one or more of the following types of temporal periods: seasonal, storm occurrence, weather warning, weather situation, smog alert, time-of-day, night-time, commuter hours, imminent event, ongoing event, traffic congestion, road closure, dangerous road condition, road construction, road repair, travel accident (block 1656).

Additional aspects may include identifying the compliance state for the given administrative standard that defines the predetermined vehicle operation mode of the vehicle traveling during the temporal time period that includes a designated high-traffic time period or a designated air quality time period or a designated natural phenomenon time period (block 1657).

Figure 54:
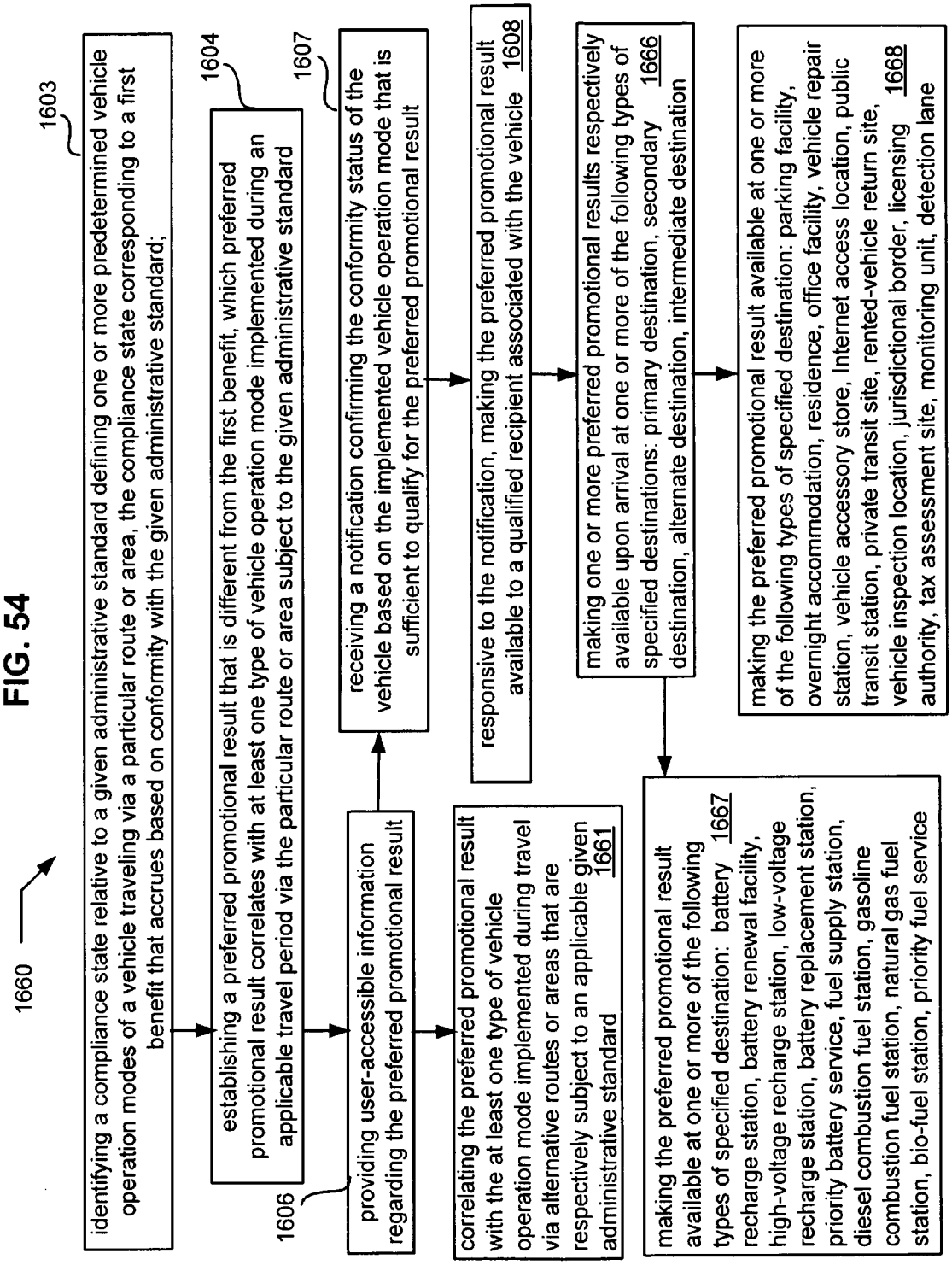

FIG. 54 illustrates various exemplary aspects 1660 including previously described features 1603, 1604, 1606, 1607, 1608 as well as correlating the preferred promotional result with the at least one predetermined vehicle operation mode implemented during travel via alternative routes or areas that are respectively subject to an applicable given administrative standard (block 1661).

Additional possibilities may include making one or more preferred promotional results respectively available upon arrival at one or more of the following types of specified destinations: primary destination, secondary destination, alternate destination, intermediate destination (block 1666). Another exemplary aspect may include making the preferred promotional result available at one or more of the following types of specified destination: battery recharge station, battery renewal facility, high-voltage recharge station, low-voltage recharge station, battery replacement station, priority battery service, fuel supply station, diesel combustion fuel station, gasoline combustion fuel station, natural gas fuel station, bio-fuel station, priority fuel service (block 1667).

In some instances other possible process features may include making the preferred promotional result available at one or more of the following types of specified destination: parking facility, overnight accommodation, residence, office facility, vehicle repair station, vehicle accessory store, Internet access location, public transit station, private transit site, rented-vehicle return site, vehicle inspection location, jurisdictional border, licensing authority, tax assessment site, monitoring unit, detection lane (block 1668).

Figure 55:
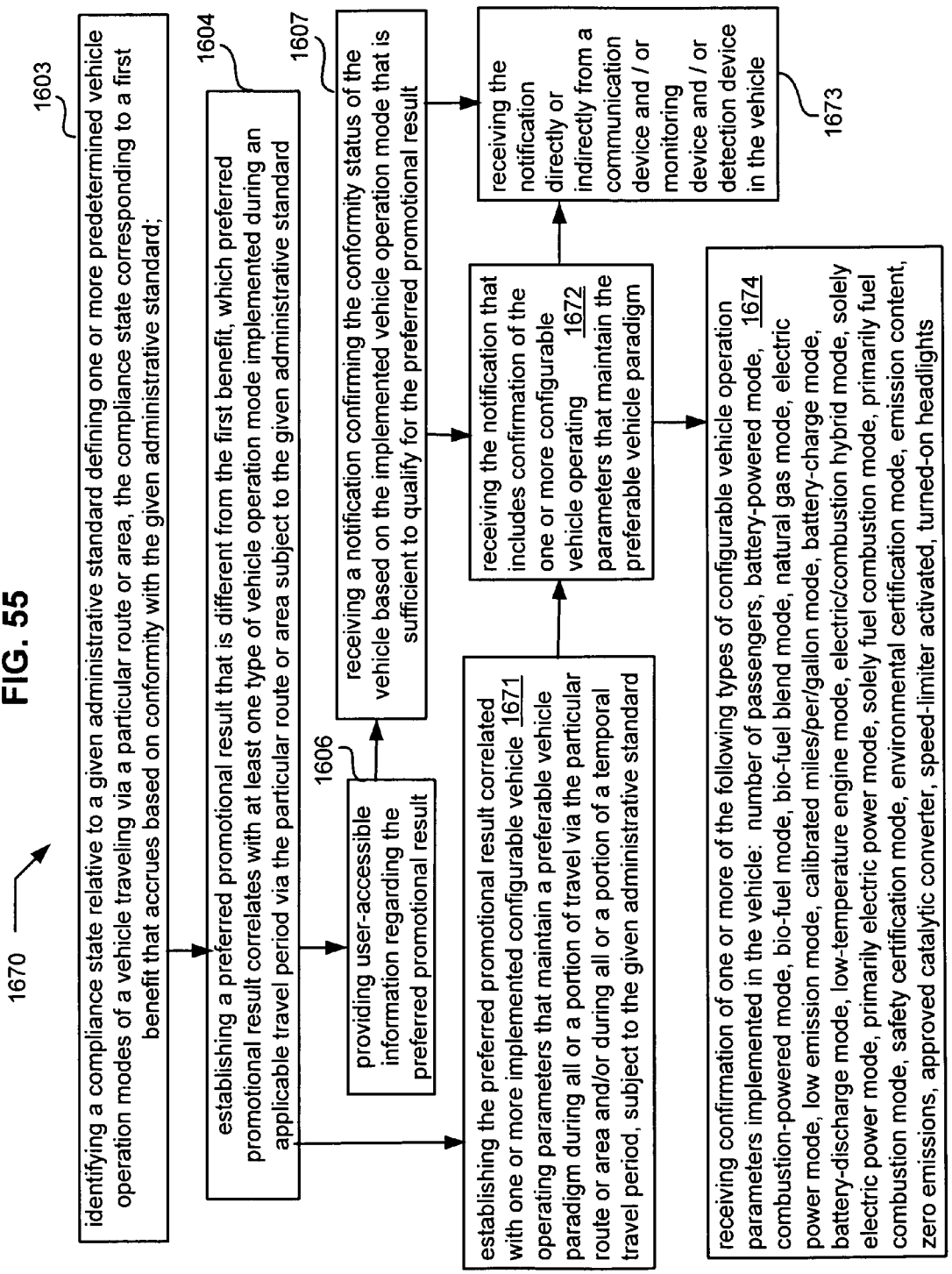

Referring to the detailed embodiment features 1670 illustrated in FIG. 55, possible process aspects may include previously described elements 1603, 1604, 1606, 1607 in combination with establishing the preferred promotional result correlated with one or more implemented configurable vehicle operating parameters that achieve a preferable vehicle paradigm during all or a portion of travel via the particular route or area and/or during all or a portion of a temporal travel period, subject to the given administrative standard (block 1671). Additional possible aspects may include receiving the notification that includes confirmation of the one or more configurable vehicle operating parameters that maintain the preferable vehicle paradigm (block 1672), and in some instances may further include receiving the notification directly or indirectly from a communication device and/or monitoring device and/or detection device in the vehicle (block 1673).

Some embodiment features may include receiving confirmation of one or more of the following types of configurable vehicle operation parameters implemented in the vehicle: number of passengers, battery-powered mode, combustion-powered mode, bio-fuel mode, bio-fuel blend mode, natural gas mode, electric power mode, low emission mode, calibrated miles/per/gallon mode, battery-charge mode, battery-discharge mode, low-temperature engine mode, electric/combustion hybrid mode, solely electric power mode, primarily electric power mode, solely fuel combustion mode, primarily fuel combustion mode, safety certification mode, environmental certification mode, emission content, zero emissions, approved catalytic converter, speed-limiter activated, turned-on headlights (block 1674).

Figure 56:
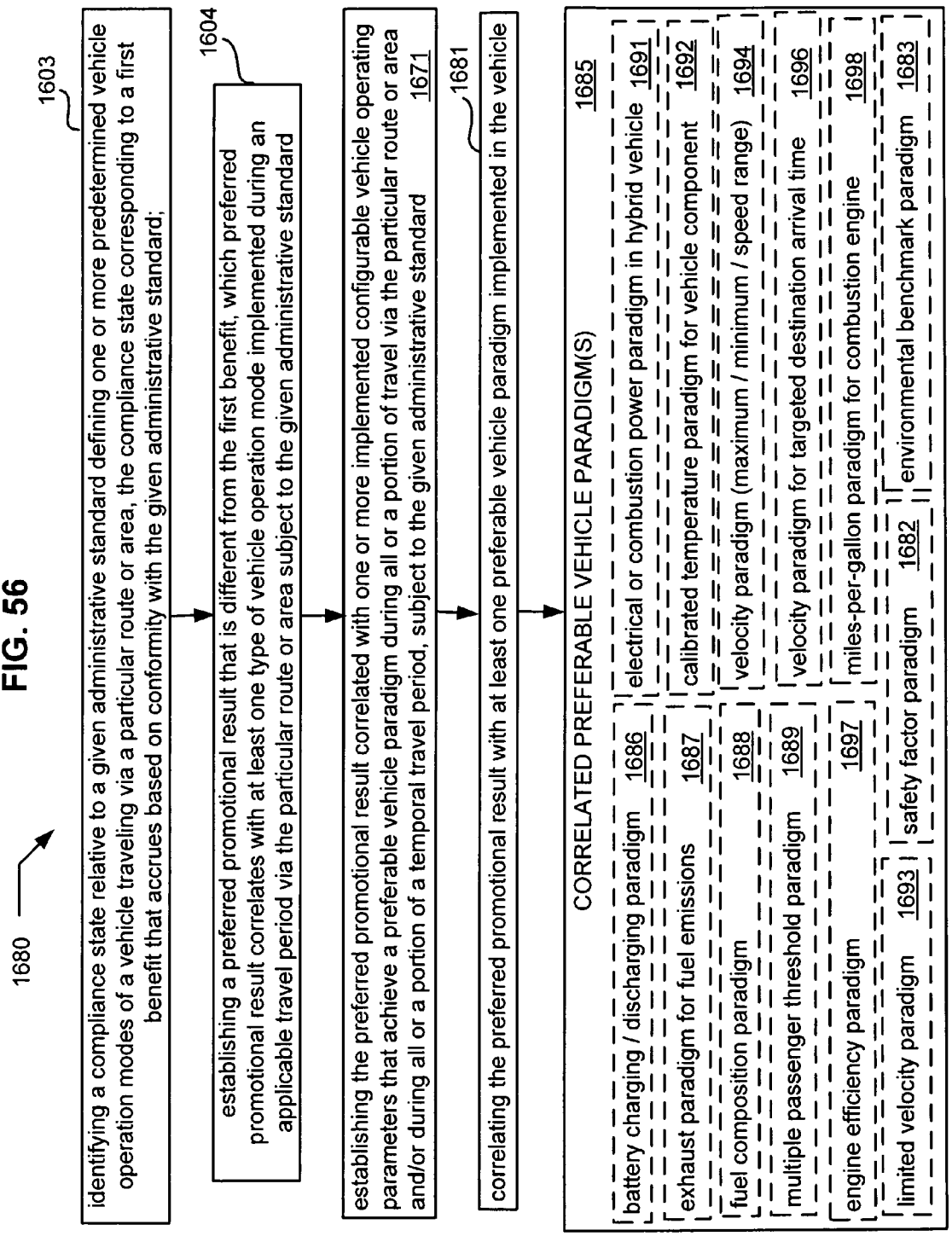

FIG. 56 shows various possible features 1680 that may include previously described aspects 1603, 1604, 1671 in combination with correlating the preferred promotional result with at least one preferable vehicle paradigm implemented in the vehicle (block 1681). Also depicted are examples of one or more types of correlated preferable vehicle paradigms (block 1685), including a safety factor paradigm 1682, environmental benchmark paradigm 1683, battery charging/discharging paradigm 1686, exhaust paradigm for fuel emissions 1687, fuel composition paradigm 1688, and multiple passenger threshold paradigm 1689.

Other exemplary types of correlated preferable vehicle paradigms may include an electrical or combustion power paradigm in hybrid vehicle 1691, calibrated temperature paradigm for vehicle component 1692, limited velocity paradigm 1693, velocity paradigm that may include maximum or minimum or speed ranges paradigms 1694. Further possible correlated preferable vehicle paradigms may include a velocity paradigm for targeted destination arrival time 1696, and a miles-per-gallon energy efficiency paradigm for combustion engine 1698.

Figure 57:
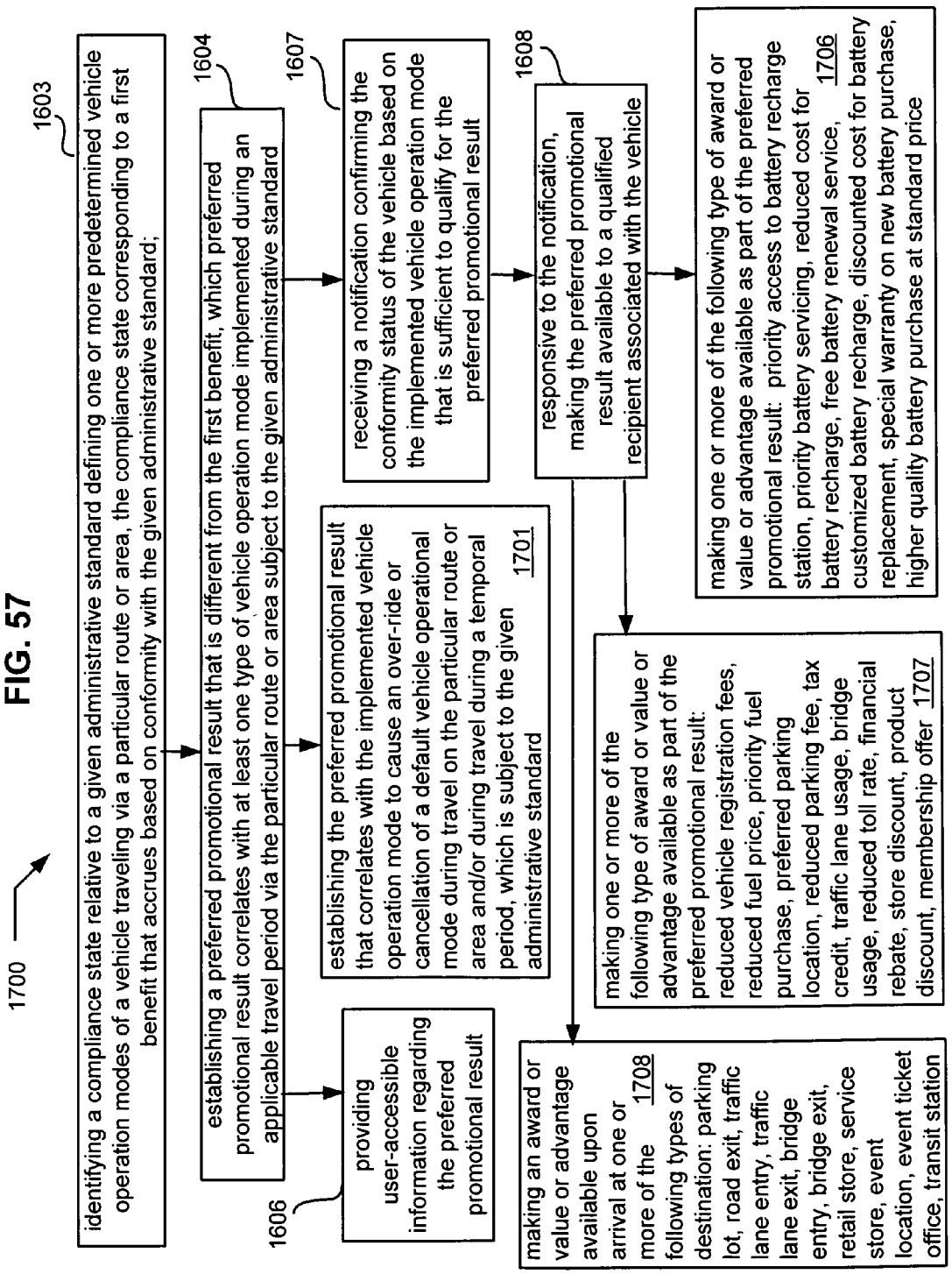

Referring to the detailed flow chart of FIG. 57, various exemplary aspects 1700 may include previously described aspects 1603, 1604, 1606, 1607, 1608 along with establishing the preferred promotional result that correlates with the implemented vehicle operation mode to cause an over-ride or cancellation of a default vehicle operational mode during travel on the particular route or area and/or during travel during a temporal period, which is subject to the given administrative standard (block 1701).

Additional process features may include making one or more of the following type of award or value or advantage available as part of the preferred promotional result: priority access to battery recharge station, priority battery servicing, reduced cost for battery recharge, free battery renewal service, customized battery recharge, discounted cost for battery replacement, special warranty on new battery purchase, higher quality battery purchase at standard price (block 1706).

Another possible process feature may include making one or more of the following type of award or value or advantage available as part of the preferred promotional result: reduced vehicle registration fees, reduced fuel price, priority fuel purchase, preferred parking location, reduced parking fee, tax credit, traffic lane usage, bridge usage, reduced toll rate, financial rebate, store discount, product discount, membership offer (block 1707). In some instances a further aspect may include making an award or value or advantage available upon arrival at one or more of the following types of destination: parking lot, road exit, traffic lane entry, traffic lane exit, bridge entry, bridge exit, retail store, service store, event location, event ticket office, transit station (block 1708).

Figure 58:
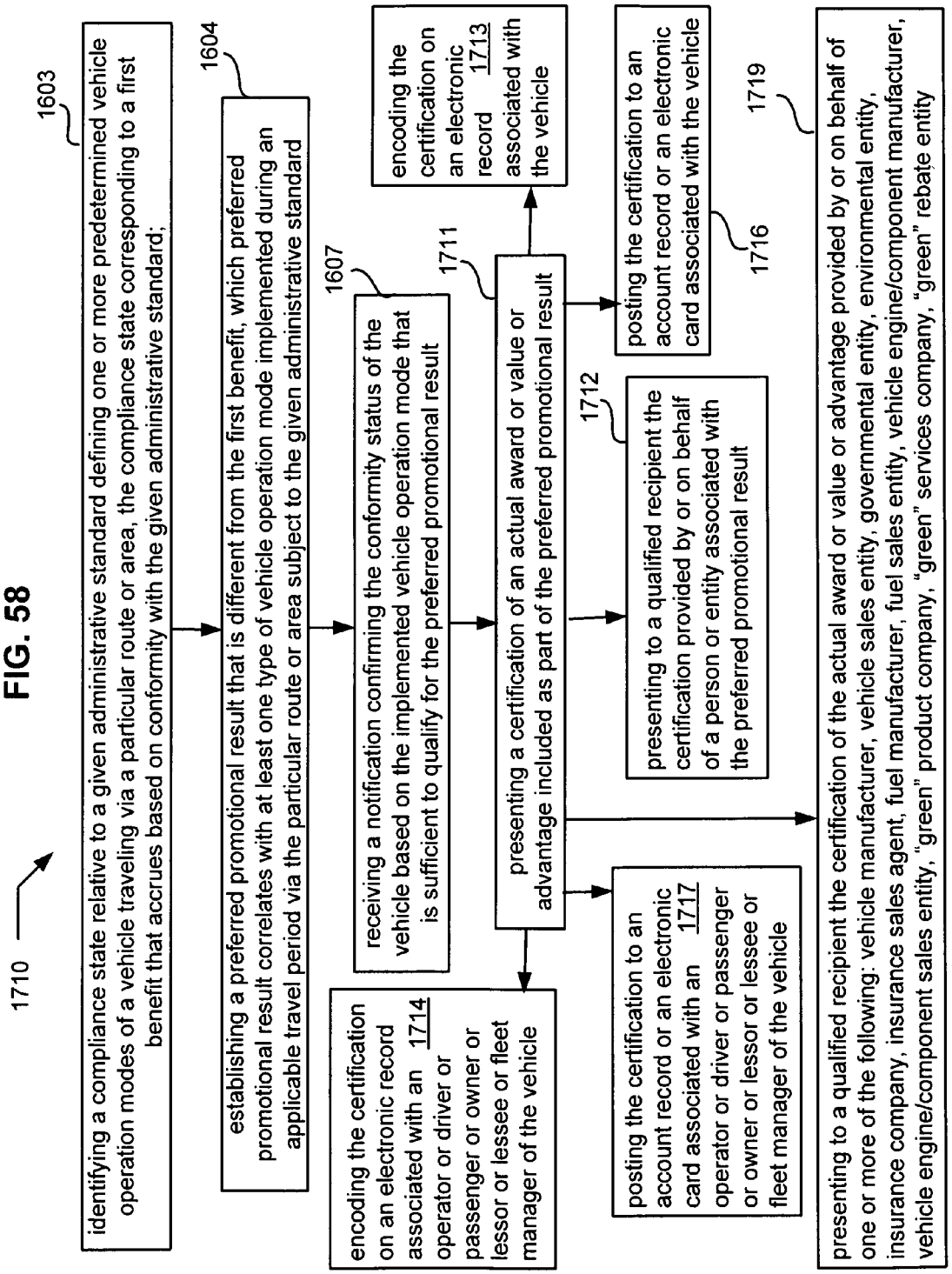

FIG. 58 illustrates further possible process aspects 1710 that may include previously described aspects 1603, 1604, 1607 along with presenting a certification of an actual award or value or advantage included as part of the preferred promotional result (block 1712), and in some instances presenting to a qualified recipient the certification provided by or on behalf of a person or entity associated with the preferred promotional result (block 1712).

Additional related aspects may include encoding the certification on an electronic record associated with the vehicle (block 1713), and may further include encoding the certification on an electronic record associated with an operator or driver or passenger or owner or lessor or lessee or fleet manager of the vehicle (block 1714), and in some instances may include posting the certification to an account record or an electronic card associated with the vehicle (block 1716). Further possible process features may include posting the certification to an account record or an electronic card associated with an operator or driver or passenger or owner or lessor or lessee or fleet manager of the vehicle (block 1717).

Also illustrated in FIG. 58 are possible aspects that may include presenting to a qualified recipient the certification of the actual award or value or advantage provided by or on behalf of one or more of the following: vehicle manufacturer, vehicle sales entity, governmental entity, environmental entity, insurance company, insurance sales agent, fuel manufacturer, fuel sales entity, vehicle engine/component manufacturer, vehicle engine/component sales entity, "green" product company, "green" services company, "green" rebate entity (block 1719).

Figure 59:
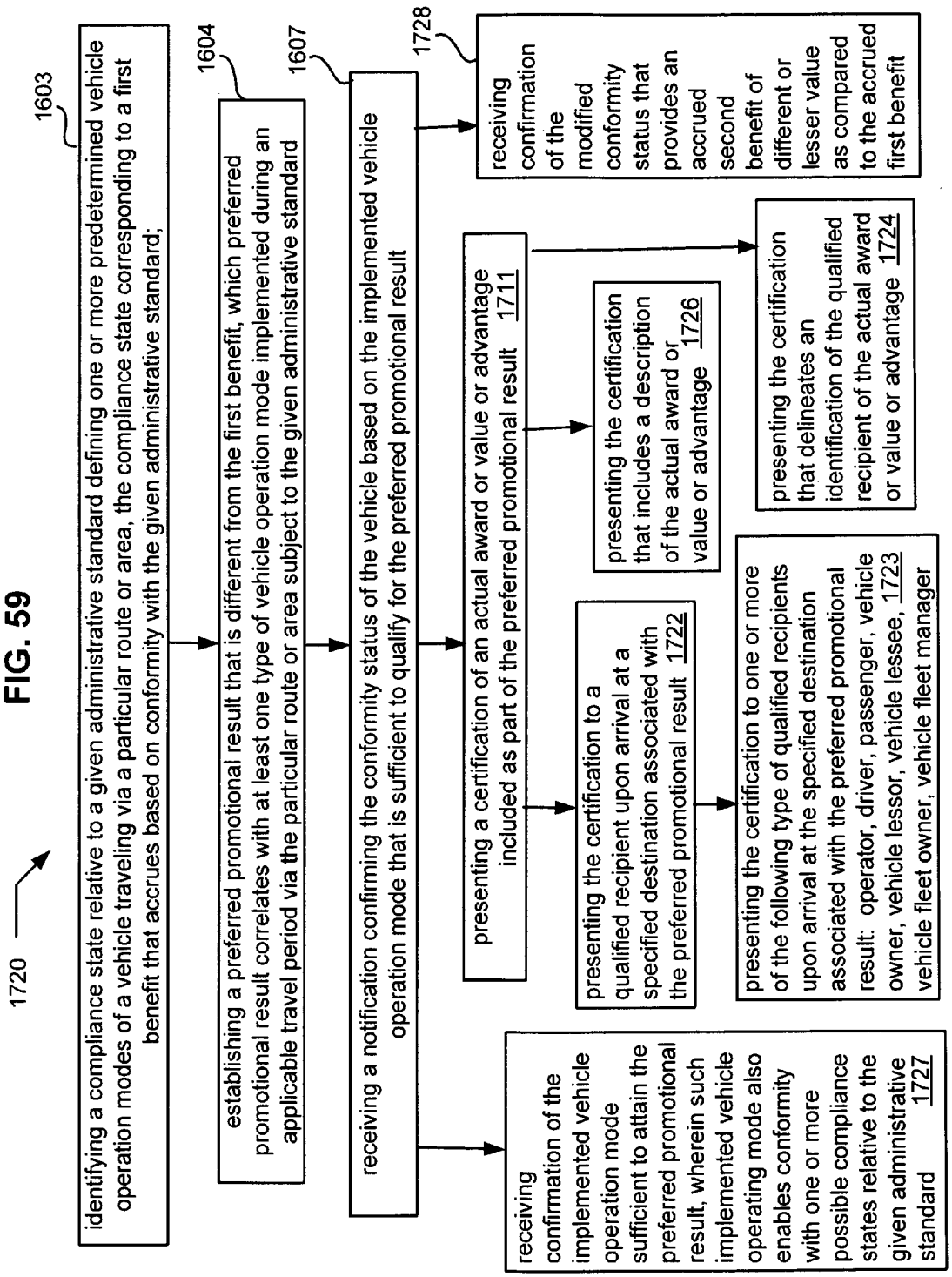

The detailed flow chart of FIG. 59 illustrates various exemplary process aspects 1720 including previously described elements 1603, 1604, 1607, 1711 along with presenting the certification to a qualified recipient upon arrival at a specified destination associated with the preferred promotional result (block 1712), and in some instances presenting the certification to one or more of the following type of qualified recipients upon arrival at the specified destination associated with the preferred promotional result: operator, driver, passenger, vehicle owner, vehicle lessor, vehicle lessee, vehicle fleet owner, vehicle fleet manager (block 1713).

Further exemplary process features may include presenting the certification that delineates an identification of the qualified recipient of the actual award or value or advantage (block 1714). Another aspect may include presenting the certification that includes a description of the actual award or value or advantage (block 1716).

Figure 60:
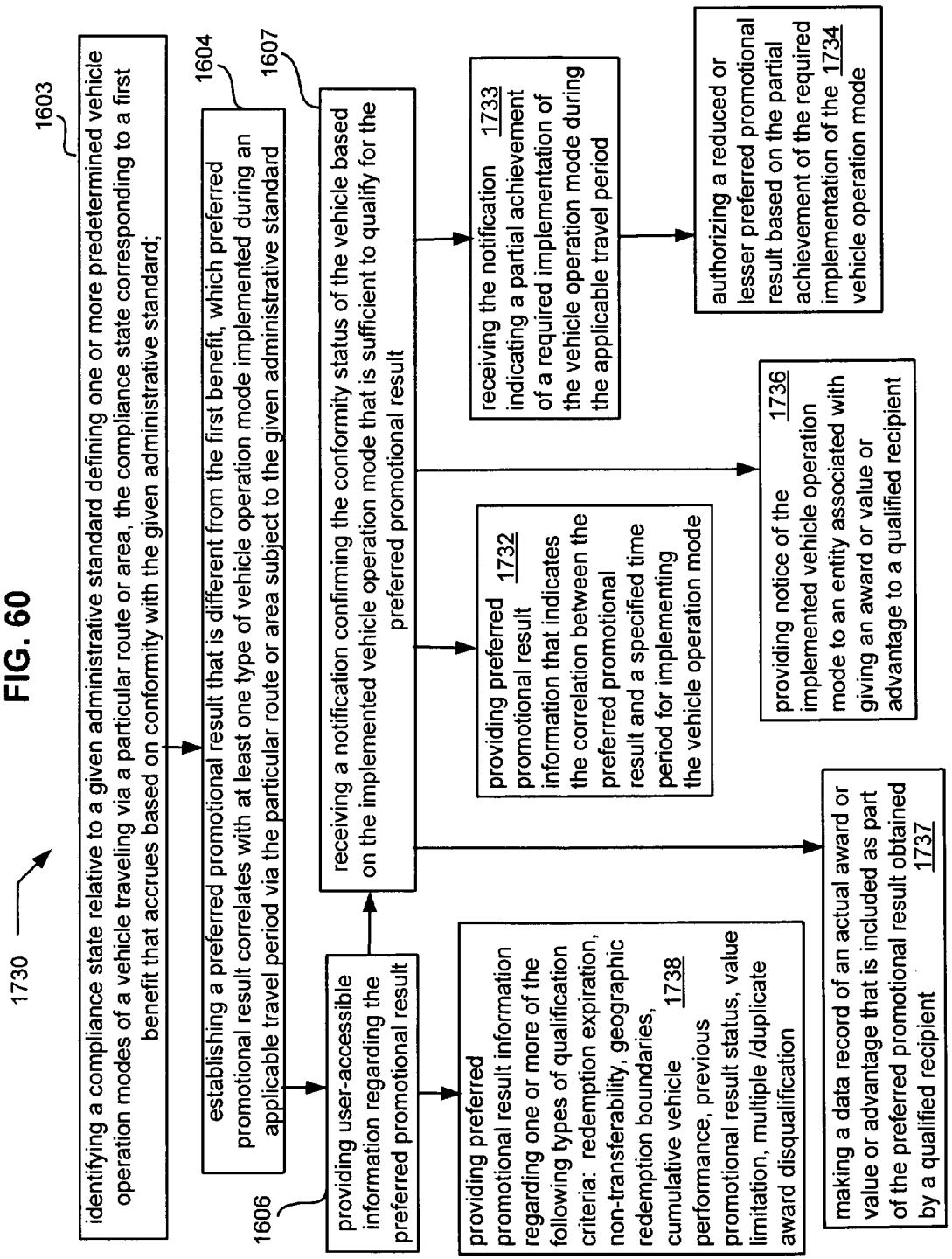

Referring to FIG. 60, various possible process aspects 1730 may include previously described features 1603, 1604, 1606, 1607 in combination with providing preferred promotional result information that indicates the correlation between the preferred promotional result and a specified time period for implementing the vehicle operation mode (block 1732). Other exemplary aspects may include providing notice of the implemented vehicle operation mode to an entity associated with giving an award or value or advantage to a qualified recipient (block 1736).

Further possible process features may include receiving the notification indicating a partial achievement of a required implementation of the vehicle operation mode during the applicable travel period (block 1733). A related possible feature may include authorizing a reduced or lesser preferred promotional result based on the partial achievement of the required implementation of the vehicle operation mode (block 1734).

Some additional aspects may in some instances include making a data record of an actual award or value or advantage that is included as part of the preferred promotional result obtained by a qualified recipient (block 1737). Other exemplary aspects may include providing preferred promotional result information regarding one or more of the following types of qualification criteria: redemption expiration, non-transferability, geographic redemption boundaries, cumulative vehicle performance, previous promotional result status, value limitation, multiple/duplicate award disqualification (block 1738).

It will be understood that data records and user-accessible information regarding preferred promotional results, as well relating to an award or value or advantage included as part of such preferred promotional results, may be maintained at various locations relative to an identified vehicle traveling during an applicable travel period and/or traveling via an applicable route or area. Similarly access to such records and information may be provided via communication devices and user-interfaces at various locations, depending on the circumstances. Accordingly the exemplary embodiment features disclosed herein are for purposes of illustration and are not intended to be limiting.

Figure 61:
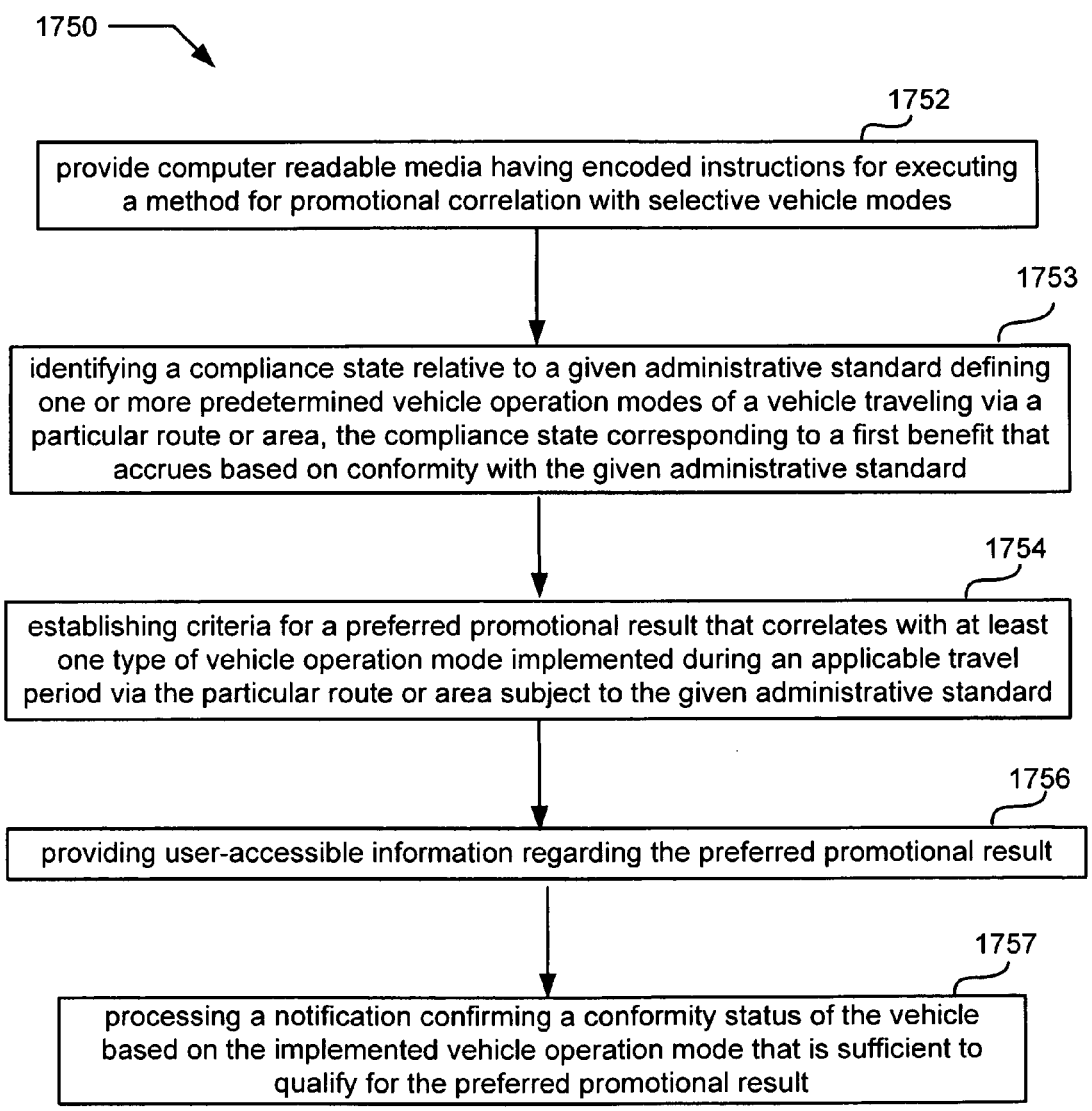
FIG. 61 is a diagrammatic flow chart depicting exemplary computer program product features for promotional correlation with selected vehicle operation modes.

The diagrammatic illustration of FIG. 61 depicts exemplary features 1750 incorporated in an article of manufacture which provides computer-readable media having encoded instructions for executing a method for promotional correlation with selective vehicle modes (block 1752). Possible aspects of an exemplary method may include identifying a compliance state relative to a given administrative standard defining one or more predetermined vehicle operation modes of a vehicle traveling via a particular route or area, the compliance state corresponding to a first benefit that accrues based on conformity with the given administrative standard (block 1753); and may further include establishing criteria for a preferred promotional result that correlates with at least one type of vehicle operation mode implemented during an applicable travel period via the particular route or area subject to the given administrative standard (block 1754).

Other possible exemplary process features may include providing user-accessible information regarding the preferred promotional result (block 1756), and in some instances processing a notification confirming a conformity status of the vehicle based on the implemented vehicle operation mode that is sufficient to qualify for the preferred promotional result (block 1757).

It will be understood by those skilled in the art that the various components and elements disclosed in the system and schematic diagrams herein as well as the various steps and sub-steps disclosed in the flow charts herein may be incorporated together in different claimed combinations in order to enhance possible benefits and advantages.

The exemplary system, apparatus, and computer program product embodiments disclosed herein including FIGS. 1-10, FIG. 25-27, FIGS. 46-47 and FIG. 61 along with other components, devices, know-how, skill and techniques known in the art have the capability of implementing and practicing the methods and processes depicted in FIGS. 11-24, FIGS. 28-45 and FIGS. 48-60. However it is to be further understood by those skilled in the art that other systems, apparatus and technology may be used to implement and practice such methods and processes.

It will also be understood from the technical disclosure herein that exemplary methods, systems and components enable selective control of an operational mode for a vehicle that is subject to an administrative standard. In some instances a qualified person or entity may attain a preferred consequential result related to a user-selected vehicle operation mode that may involve a vehicle operation paradigm and/or a vehicle travel route and/or a vehicle travel destination. In some embodiments, implementation of the selected vehicle operation mode may modify a conformity status of the vehicle relative to the administrative standard. Various accessible records may be maintained regarding administrative compliance states and their respective benefits, as well as regarding certification of preferable consequential results available to qualified recipients based on a correlated vehicle operational mode.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for promotional correlation with selective vehicle modes, comprising:
    identifying a compliance state of a multi-mode vehicle in a user-selected first vehicle operation mode implemented via a vehicle operation control system relative to a given administrative standard established by an administrative entity, the administrative standard defining one or more predetermined vehicle operation modes of a vehicle traveling via a particular route or area, the compliance state corresponding to an extrinsic first benefit that accrues based on conformity with the given administrative standard, wherein the first benefit is provided by the administrative entity;
    establishing criteria for a preferred promotional result including an award or value or advantage that is different from the first benefit, which preferred promotional result correlates with at least one type of second vehicle operation mode that includes a configurable vehicle operating parameter implemented by a user-selection made via the vehicle operation control system of the multi-mode vehicle during an applicable travel period via the particular route or area subject to the given administrative standard; and
    receiving a notification from an on-board or remotely located communication module regarding a modified administrative conformity status of the vehicle based on confirmation of the implemented vehicle operation mode and/or the implemented vehicle operating parameter that are sufficient to qualify for the preferred promotional result.

2. The method of claim 1 further comprising:
    responsive to the notification, making the preferred promotional result available to a qualified recipient associated with the vehicle.

3. The method of claim 2 wherein said making the preferred promotional result available to the qualified recipient includes:
    making an award or value or advantage available to one or more of the following type of qualified recipients based on the implemented vehicle operation mode: vehicle, operator, driver, passenger, vehicle owner, vehicle lessor, vehicle lessee, vehicle fleet owner, vehicle fleet manager.

4. The method of claim 2 wherein said making the preferred promotional result available to the qualified recipient includes:
    making one or more of the following type of award or value or advantage available as part of the preferred promotional result: priority access to battery recharge station, priority battery servicing, reduced cost for battery recharge, free battery renewal service, customized battery recharge, discounted cost for battery replacement, special warranty on new battery purchase, higher quality battery purchase at standard price.

5. The method of claim 2 wherein said making the preferred promotional result available to the qualified recipient includes:

making one or more of the following type of award or value or advantage available as part of the preferred promotional result: reduced vehicle registration fees, reduced fuel price, priority fuel purchase, preferred parking location, reduced parking fee, tax credit, traffic lane usage, bridge usage, reduced toll rate, financial rebate, store discount, product discount, membership offer.

6. The method of claim 2 wherein said making the preferred promotional result available to the qualified recipient includes:
making an award or value or advantage available upon arrival at one or more of the following types of destination: parking lot, road exit, traffic lane entry, traffic lane exit, bridge entry, bridge exit, retail store, service store, event location, event ticket office, transit station.

7. The method of claim 1 wherein said receiving the notification includes:
receiving directly or indirectly from one or more of the following parties the notification that includes the implemented vehicle operation mode: operator or driver or passenger or owner or lessor or lessee or fleet manager of the vehicle.

8. The method of claim 1 wherein said identifying the compliance state includes:
identifying the compliance state that includes one or more of the following types of qualification requirements: number of passengers, I-10V lane account status, toll road account status, public road standard, public area standard, private road standard, private area standard, electric power mode, combustion/electric hybrid mode, combustion fuel content, bio-fuel content, natural gas fuel, engine efficiency, miles/per/gallon calibration, combustion emission, zero-emissions, exhaust content, maximum speed limitation, safety metric, environmental guideline.

9. The method of claim 1 wherein said receiving the notification includes:
receiving the notification directly or indirectly from a detection and/or monitoring device in the vehicle.

10. The method of claim 1 further comprising:
receiving vehicle identifier data indicative of one or more identification characteristics for the vehicle traveling via the particular route or area.

11. The method of claim 1 further comprising:
making the preferred promotional result available at one or more of the following types of specified destination: battery recharge station, battery renewal facility, high-voltage recharge station, low-voltage recharge station, battery replacement station, priority battery service, fuel supply station, diesel combustion fuel station, gasoline combustion fuel station, natural gas fuel station, bio-fuel station, priority fuel service.

12. The method of claim 1 further comprising: making the preferred promotional result available at one or more of the following types of specified destination: parking facility, overnight accommodation, residence, office facility, vehicle repair station, vehicle accessory store, Internet access location, public transit station, private transit site, rented-vehicle return site, vehicle inspection location, jurisdictional border, licensing authority, tax assessment site, monitoring unit, detection lane.

13. The method of claim 1 wherein said establishing criteria for the preferred promotional result includes:
establishing the criteria for the preferred promotional result correlated with one or more implemented configurable vehicle operating parameters that achieve a preferable vehicle operation during all or a portion of travel via the particular route or area and/or during all or a portion of a temporal travel period, subject to the given administrative standard.

14. The method of claim 13 further comprising:
correlating the preferred promotional result with at least one preferable vehicle operation implemented in the vehicle.

15. The method of claim 14 further comprising:
correlating the preferred promotional result with a battery charging/discharging mode implemented in the vehicle.

16. The method of claim 14 further comprising:
correlating the preferred promotional result with an exhaust mode for fuel emissions implemented in the vehicle.

17. The method of claim 14 further comprising:
correlating the preferred promotional result with a fuel composition mode implemented in the vehicle.

18. The method of claim 14 further comprising:
correlating the preferred promotional result with a multi-passenger threshold mode implemented in the vehicle.

19. The method of claim 14 further comprising:
correlating the preferred promotional result with an electrical power mode or a combustion power mode for a hybrid engine in the vehicle.

20. The method of claim 14 further comprising:
correlating the preferred promotional result with a calibrated temperature mode for a vehicle component.

21. The method of claim 14 further comprising:
correlating the preferred promotional result with a limited velocity mode based on a maximum speed or minimum speed or speed range implemented in the vehicle.

22. The method of claim 21 further comprising:
correlating the preferred promotional result with a velocity mode to achieve a targeted destination arrival time.

23. The method of claim 14 further comprising:
correlating the preferred promotional result with a safety factor mode or an environmental benchmark mode implemented in the vehicle.

24. The method of claim 14 further comprising:
correlating the preferred promotional result with an engine efficiency mode or a calibrated miles-per-gallon mode implemented in the vehicle.

25. The method of claim 1 wherein said receiving the notification includes:
receiving confirmation of one or more of the following types of configurable vehicle operation parameters implemented in the vehicle: number of passengers, battery-powered mode, combustion-powered mode, bio-fuel mode, bio-fuel blend mode, natural gas mode, electric power mode, low emission mode, calibrated miles/per/gallon mode, battery-charge mode, battery-discharge mode, low-temperature engine mode, electric/combustion hybrid mode, solely electric power mode, primarily electric power mode, solely fuel combustion mode, primarily fuel combustion mode, safety certification mode, environmental certification mode, emission content, zero emissions, approved catalytic converter, speed-limiter activated, turned-on headlights.

26. The method of claim 1 further comprising:
providing preferred promotional result information that indicates the correlation between the preferred promotional result and a specified time period for implementing the vehicle operation mode.

27. The method of claim 1 wherein said receiving the notification includes:
receiving the notification indicating a partial achievement of a required implementation of the vehicle operation mode during the applicable travel period.

28. The method of claim 27 further comprising:
authorizing a reduced or lesser preferred promotional result based on the partial achievement of the required implementation of the vehicle operation mode.

29. The method of claim 1 further comprising:
providing preferred promotional result information regarding one or more of the following types of qualification criteria: redemption expiration, non-transferability, geographic redemption boundaries, cumulative vehicle performance, previous promotional result status, value limitation, multiple/duplicate award disqualification.

30. A computer program product comprising non-transitory computer-readable media having encoded instructions for executing the following method for promotional correlation with selective vehicle modes:
identifying a compliance state of a multi-mode vehicle in a user-selected first vehicle operation mode implemented via a vehicle operation control system relative to a given administrative standard established by an administrative entity, the administrative standard defining one or more predetermined vehicle operation modes of a vehicle traveling via a particular route or area, the compliance state corresponding to an extrinsic first benefit that accrues based on conformity with the given administrative standard, wherein the first benefit is provided by the administrative entity;
establishing criteria for a preferred promotional result including an award or value or advantage that is different from the first benefit, which preferred promotional result correlates with at least one type of second vehicle operation mode that includes a configurable vehicle operating parameter implemented by a user-selection made via the vehicle operation control system of the multi-mode vehicle during an applicable travel period via the particular route or area subject to the given administrative standard; and
receiving and processing a notification from an on-board or remotely located communication module regarding a modified administrative conformity status of the vehicle based on confirmation of the implemented vehicle operation mode and/or the implemented vehicle operating parameter that are sufficient to qualify for the preferred promotional result.

31. The computer program product of claim 30 wherein the method further includes:
responsive to the notification, making the preferred promotional result available to a qualified recipient associated with the vehicle.

32. The computer program product of claim 31 wherein the method feature making the preferred promotional result available to the qualified recipient includes:
making one or more of the following type of award or value or advantage available as part of the preferred promotional result: priority access to battery recharge station, priority battery servicing, reduced cost for battery recharge, free battery renewal service, customized battery recharge, discounted cost for battery replacement, special warranty on new battery purchase, higher quality battery purchase at standard price.

33. The computer program product of claim 31 wherein the method feature making the preferred promotional result available to the qualified recipient includes:
making one or more of the following type of award or value or advantage available as part of the preferred promotional result: reduced vehicle registration fees, reduced fuel price, priority fuel purchase, preferred parking location, reduced parking fee, tax credit, traffic lane usage, bridge usage, reduced toll rate, financial rebate, store discount, product discount, membership offer.

34. The computer program product of claim 31 wherein the method feature making the preferred promotional result available to the qualified recipient includes:
making an award or value or advantage available upon arrival at one or more of the following types of destination: parking lot, road exit, traffic lane entry, traffic lane exit, bridge entry, bridge exit, retail store, service store, event location, event ticket office, transit station.

35. The computer program product of claim 30 wherein the method feature receiving and processing the notification includes:
receiving directly or indirectly from one or more of the following parties the notification that includes the implemented vehicle operation mode: operator or driver or passenger or owner or lessor or lessee or fleet manager of the vehicle.

36. The computer program product of claim 30 wherein the method feature identifying the compliance state includes:
identifying the compliance state that includes one or more of the following types of qualification requirements: number of passengers, HOV lane account status, toll road account status, public road standard, public area standard, private road standard, private area standard, electric power mode, combustion/electric hybrid mode, combustion fuel content, bio-fuel content, natural gas fuel, engine efficiency, miles/per/gallon calibration, combustion emission, zero-emissions, exhaust content, maximum speed limitation, safety metric, environmental guideline.

37. The computer program product of claim 30 wherein the method feature receiving and processing the notification includes:
receiving the notification directly or indirectly from a detection and/or monitoring device in the vehicle.

38. The computer program product of claim 30 wherein the method further includes:
processing vehicle identifier data indicative of one or more identification characteristics for the vehicle traveling via the particular route or area.

39. The computer program product of claim 31 wherein the method feature making the preferred promotional result available to the qualified recipient includes:
making an award or value or advantage available to one or more of the following type of qualified recipients based on the implemented vehicle operation mode: vehicle, operator, driver, passenger, vehicle owner, vehicle lessor, vehicle lessee, vehicle fleet owner, vehicle fleet manager.

40. The computer program product of claim 30 wherein the method further includes:
making the preferred promotional result available at one or more of the following types of specified destination: battery recharge station, battery renewal facility, high-voltage recharge station, low-voltage recharge station, battery replacement station, priority battery service, fuel supply station, diesel combustion fuel station, gasoline combustion fuel station, natural gas fuel station, bio-fuel station, priority fuel service.

41. The computer program product of claim 30 wherein the method further includes:

making the preferred promotional result available at one or more of the following types of specified destination: parking facility, overnight accommodation, residence, office facility, vehicle repair station, vehicle accessory store, Internet access location, public transit station, private transit site, rented-vehicle return site, vehicle inspection location, jurisdictional border, licensing authority, tax assessment site, monitoring unit, detection lane.

42. The computer program product of claim 30 wherein the method feature establishing criteria for the preferred promotional result includes:
   establishing the criteria for the preferred promotional result correlated with one or more implemented configurable vehicle operating parameters that achieve a preferable vehicle operation during all or a portion of travel via the particular route or area and/or during all or a portion of a temporal travel period, subject to the given administrative standard.

43. The computer program product of claim 42 wherein the method further includes:
   correlating the preferred promotional result with at least one preferable vehicle operation implemented in the vehicle.

44. The computer program product of claim 43 wherein the method further includes:
   correlating the preferred promotional result with a battery charging/discharging mode implemented in the vehicle.

45. The computer program product of claim 43 wherein the method further includes:
   correlating the preferred promotional result with an exhaust mode for fuel emissions implemented in the vehicle.

46. The computer program product of claim 43 wherein the method further includes:
   correlating the preferred promotional result with a fuel composition mode implemented in the vehicle.

47. The computer program product of claim 43 wherein the method further includes:
   correlating the preferred promotional result with a multi-passenger threshold mode implemented in the vehicle.

48. The computer program product of claim 43 wherein the method further includes:
   correlating the preferred promotional result with an electrical power mode or a combustion power mode for a hybrid engine in the vehicle.

49. The computer program product of claim 43 wherein the method further includes:
   correlating the preferred promotional result with a calibrated temperature mode for a vehicle component.

50. The computer program product of claim 43 wherein the method further includes:
   correlating the preferred promotional result with a limited velocity mode based on a maximum speed or minimum speed or speed range implemented in the vehicle.

51. The computer program product of claim 50 wherein the method further includes:
   correlating the preferred promotional result with a velocity mode to achieve a targeted destination arrival time.

52. The computer program product of claim 43 wherein the method further includes:
   correlating the preferred promotional result with a safety factor mode or an environmental benchmark mode implemented in the vehicle.

53. The computer program product of claim 43 wherein the method further includes:
   correlating the preferred promotional result with an engine efficiency mode or a calibrated miles-per-gallon mode implemented in the vehicle.

54. The computer program product of claim 30 wherein the method feature receiving and processing the notification includes:
   receiving confirmation of one or more of the following types of configurable vehicle operation parameters implemented in the vehicle: number of passengers, battery-powered mode, combustion-powered mode, bio-fuel mode, bio-fuel blend mode, natural gas mode, electric power mode, low emission mode, calibrated miles/per/gallon mode, battery-charge mode, battery-discharge mode, low-temperature engine mode, electric/combustion hybrid mode, solely electric power mode, primarily electric power mode, solely fuel combustion mode, primarily fuel combustion mode, safety certification mode, environmental certification mode, emission content, zero emissions, approved catalytic converter, speed-limiter activated, turned-on headlights.

55. The computer program product of claim 30 wherein the method further includes:
   providing preferred promotional result information that indicates the correlation between the preferred promotional result and a specified time period for implementing the vehicle operation mode.

56. The computer program product of claim 30 wherein said receiving and processing the notification includes:
   receiving the notification indicating a partial achievement of a required implementation of the vehicle operation mode during the applicable travel period.

57. The computer program product of claim 56 wherein the method further includes:
   authorizing a reduced or lesser preferred promotional result based on the partial achievement of the required implementation of the vehicle operation mode.

58. The computer program product of claim 30 wherein the method includes:
   providing preferred promotional result information regarding one or more of the following types of qualification criteria: redemption expiration, non-transferability, geographic redemption boundaries, cumulative vehicle performance, previous promotional result status, value limitation, multiple/duplicate award disqualification.

\* \* \* \* \*